United States Patent
Piao et al.

(10) Patent No.: US 11,825,117 B2
(45) Date of Patent: Nov. 21, 2023

(54) ENCODING METHOD AND APPARATUS THEREFOR, AND DECODING METHOD AND APPARATUS THEREFOR

(71) Applicant: SAMSUNG ELECTRONICS CO., LTD., Suwon-si (KR)

(72) Inventors: Yinji Piao, Suwon-si (KR); Elena Alshina, Seoul (KR); Alexander Alshin, Seoul (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/959,726

(22) PCT Filed: Jan. 7, 2019

(86) PCT No.: PCT/KR2019/000198
§ 371 (c)(1),
(2) Date: Jul. 2, 2020

(87) PCT Pub. No.: WO2019/139309
PCT Pub. Date: Jul. 18, 2019

(65) Prior Publication Data
US 2020/0374562 A1    Nov. 26, 2020

Related U.S. Application Data

(60) Provisional application No. 62/617,335, filed on Jan. 15, 2018.

(51) Int. Cl.
*H04N 19/615*    (2014.01)
*H04N 19/105*    (2014.01)
(Continued)

(52) U.S. Cl.
CPC ......... *H04N 19/615* (2014.11); *H04N 19/105* (2014.11); *H04N 19/109* (2014.11);
(Continued)

(58) Field of Classification Search
None
See application file for complete search history.

(56) References Cited

U.S. PATENT DOCUMENTS 9,071,851 B2    6/2015    Guo et al.
9,544,600 B2    1/2017    Alshina et al.
(Continued)

FOREIGN PATENT DOCUMENTS

CN    103299624 A    9/2013
CN    104067613 A    9/2014
(Continued)

OTHER PUBLICATIONS

Communication dated Apr. 12, 2019, issued by the International Searching Authority in counterpart International Application No. PCT/KR2019/000198 (PCT/ISA/210 and 237).
(Continued)

*Primary Examiner* — Michael J Hess
(74) *Attorney, Agent, or Firm* — Sughrue Mion, PLLC

(57) ABSTRACT

Provided is a video decoding method including: determining an inter prediction mode of a current block when the current block is inter-predicted; determining at least one reference sample location to be referred to by the current block, based on the inter prediction mode of the current block; determining filter information to be applied to at least one reconstructed reference sample corresponding to the at least one reference sample location, based on the inter prediction mode of the current block; performing filtering on the at least one reconstructed reference sample, based on the filter
(Continued)

information; and decoding the current block by using prediction samples generated via the filtering.

3 Claims, 46 Drawing Sheets

(51) Int. Cl.
    *H04N 19/109*     (2014.01)
    *H04N 19/117*     (2014.01)
    *H04N 19/176*     (2014.01)
    *H04N 19/423*     (2014.01)

(52) U.S. Cl.
    CPC ......... *H04N 19/117* (2014.11); *H04N 19/176* (2014.11); *H04N 19/423* (2014.11)

(56) References Cited

U.S. PATENT DOCUMENTS

| | | | |
|---|---|---|---|
| 9,807,424 | B2 | 10/2017 | Guo et al. |
| 10,986,365 | B2 | 4/2021 | Chen et al. |
| 2012/0177114 | A1 | 7/2012 | Guo et al. |
| 2014/0050270 | A1 | 2/2014 | Lim et al. |
| 2015/0139317 | A1* | 5/2015 | Lee .................. H04N 19/46 375/240.12 |
| 2016/0241858 | A1* | 8/2016 | Li .................. H04N 19/176 |
| 2018/0098066 | A1* | 4/2018 | Lee .................. H04N 19/176 |
| 2018/0184126 | A1* | 6/2018 | Zhang .............. H04N 19/137 |
| 2018/0199057 | A1* | 7/2018 | Chuang ............ H04N 19/573 |
| 2018/0220138 | A1* | 8/2018 | He .................. H04N 19/182 |
| 2019/0268594 | A1* | 8/2019 | Lim .................. H04N 19/46 |
| 2019/0320199 | A1* | 10/2019 | Chen ................ H04N 19/176 |
| 2019/0335191 | A1* | 10/2019 | Kondo .............. H04N 19/543 |
| 2020/0077089 | A1* | 3/2020 | Lee .................. H04N 19/176 |
| 2020/0244986 | A1 | 7/2020 | Chen et al. |
| 2020/0288146 | A1* | 9/2020 | Jeon ................ H04N 19/593 |

FOREIGN PATENT DOCUMENTS

| | | |
|---|---|---|
| CN | 106464863 A | 2/2017 |
| GB | 2501554 A | 10/2013 |
| GB | 2510759 A9 | 8/2014 |
| KR | 10-2013-0050899 A | 5/2013 |
| KR | 10-1540167 B1 | 8/2015 |
| KR | 10-1569725 B1 | 11/2015 |
| KR | 10-2017-0085612 A | 7/2017 |
| KR | 10-2017-0125086 A | 11/2017 |
| KR | 10-1794199 B1 | 11/2017 |
| TW | I554088 B | 10/2016 |
| WO | 2015/149699 A1 | 10/2015 |

OTHER PUBLICATIONS

Communication dated Dec. 1, 2020, issued by the Korean Intellectual Property Office in Korean Patent Application No. 10-2020-7008385.

Communication dated Oct. 8, 2021, from the European Patent Office in European Application No. 19738750.9.

Communication dated Jan. 14, 2022 issued by the State Intellectual Property Office of P.R. China in counterpart Chinese application No. 201980008315.1.

Communication dated Feb. 18, 2022 issued by the European Patent Office in counterpart European Application No. 19738750.9.

Kemal Ugur et al., "CE3: Interpolation filter with shorter tap-length for small PU's", Joint Collaborative Team on Video Coding (JCT-VC) of ITU-T SG16 WP3 and ISO/IEC JTC1/SC29/WG11, Document: JCTVC-F248, Jul. 2011, 5 pages total, XP030228539.

Minhua Zhou et al., "Report of BoG on recommended CfP questionnaire", Joint Video Exploration Team (JVET) of ITU-T SG 16 WP 3 and ISO/IEC JTC 1/SC 29/WG 11, Document: JVET-H0096_r2, Feb. 2018, 9 pages total, XP030151100.

Takeshi Tsukuba et al., "SCE3: Results of test 3.6 on Generalized Residual Prediction with shorter-tap MC filter", Joint Collaborative Team on Video Coding (JCT-VC) of ITU-T SG 16 WP 3 and ISO/IEC JTC 1/SC 29/WG 11, Document: JCTVC-M0073_r1, Apr. 2013, 7 pages total, XP030237026.

Sri Nitchith Akula et al., "Description of SDR, HDR and 360° video coding technology proposal considering mobile application scenario by Samsung, Huawei, GoPro, and HiSilicon", Joint Video Exploration Team (JVET) of ITU-T SG 16 WP 3 and ISO/IEC JTC 1/SC 29/WG 11, Document: JVET- J0024_v2, Apr. 2018, 124 pages total, XP030248222.

Communication dated May 30, 2022 issued by the Indian Patent Office in counterpart Indian Application No. 202027027907.

Indian Office Action issued from the Indian Patent Office dated Jan. 23, 2023 to IN Patent Application No. 202228069275.

Indian Office Action issued from the Indian Patent Office dated Jan. 23, 2023 to IN Patent Application No. 202228069272.

Indian Office Action issued from the Indian Patent Office dated Jan. 23, 2023 to IN Patent Application No. 202228069271.

* cited by examiner

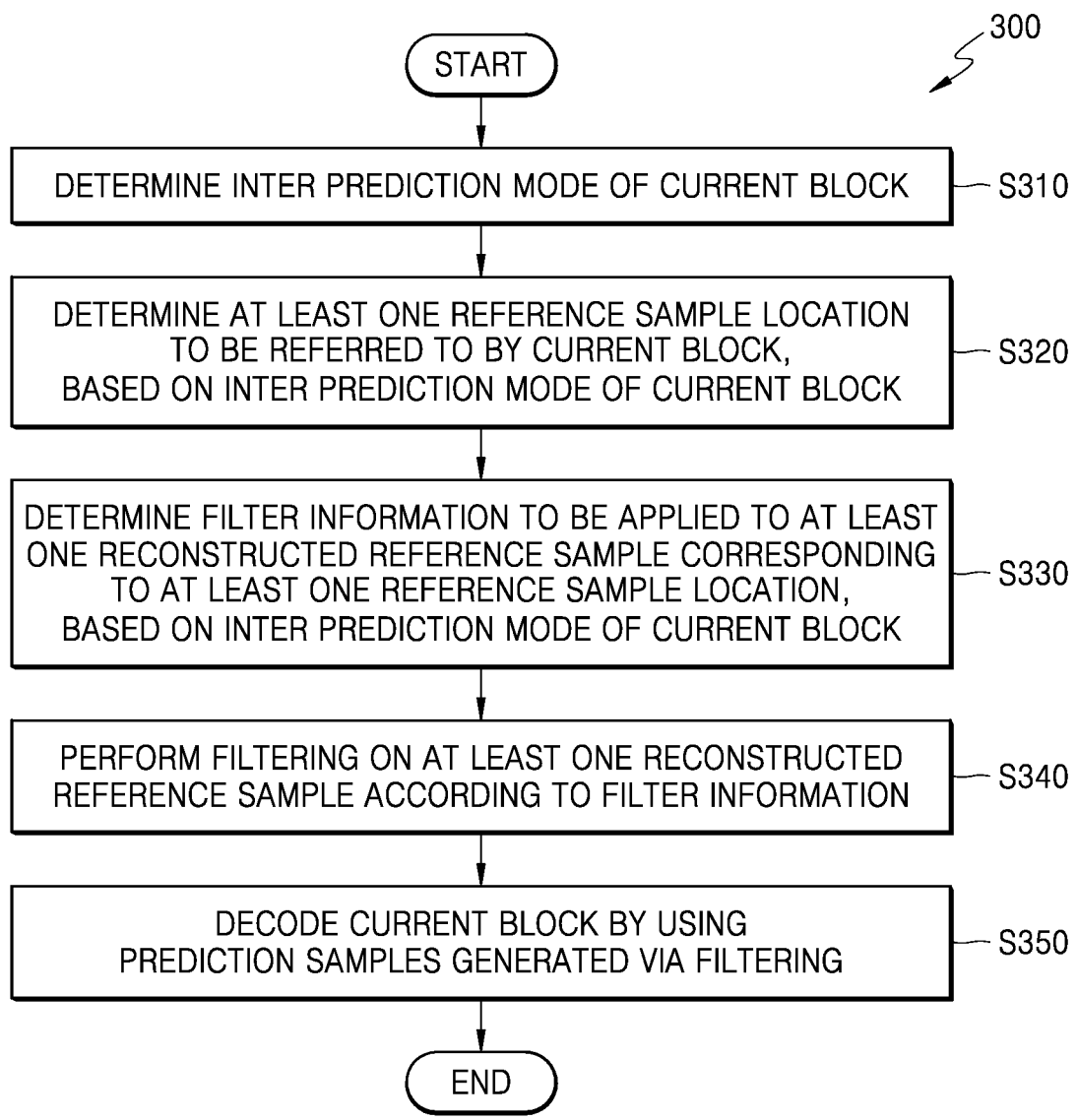

FIG. 8
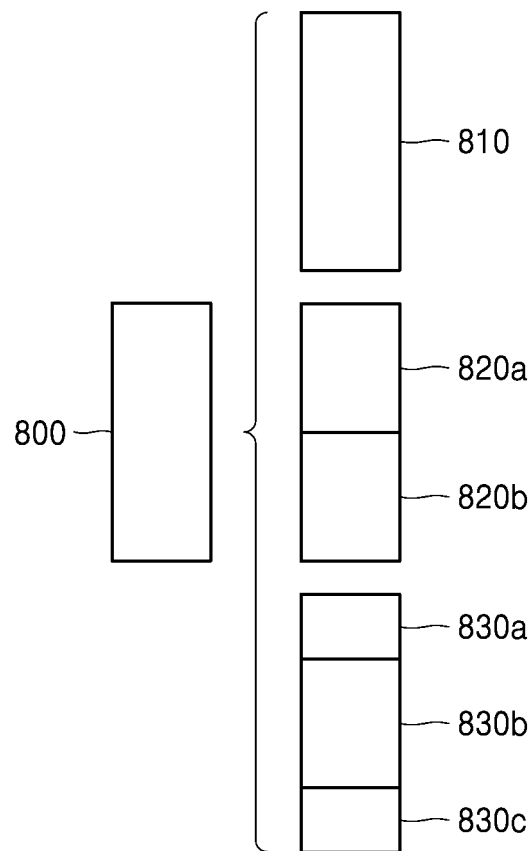
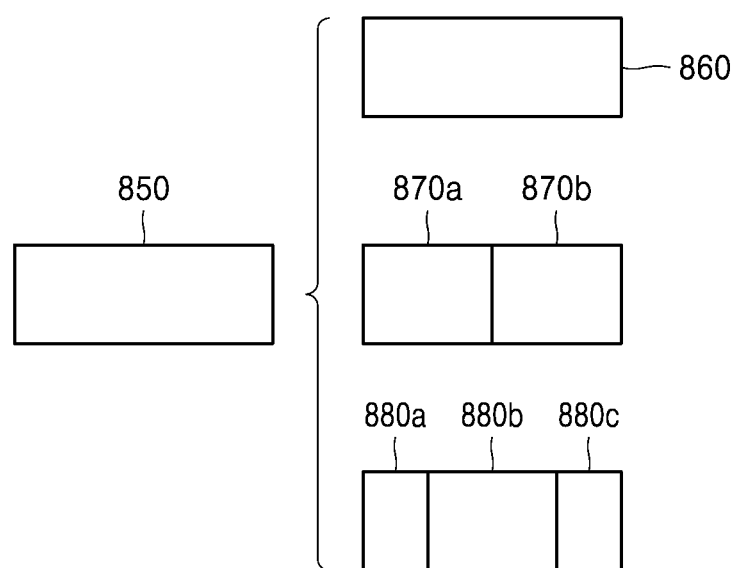

FIG. 17

| DEPTH \ BLOCK SHAPE | 0: SQUARE | 1: NS_VER | 2: NS_HOR |
|---|---|---|---|
| DEPTH D | 1700 | 1710 | 1720 |
| DEPTH D+1 | 1702 | 1712 | 1722 |
| DEPTH D+2 | 1704 | 1714 | 1724 |
| ... | ... | ... | ... |

FIG. 23

| W | H | T | $\frac{Uni}{(W+T-1)\times(H+T-1)}{W\times H}$ | $\frac{Bi}{2\times(W+T-1)\times(H+T-1)}{W\times H}$ |
|---|---|---|---|---|
| 4 | 4 | 8 | 7.56 | 15.13 |
| 4 | 4 | 4 | 3.06 | 6.13 |
| 4 | 4 | 2 | 1.56 | 3.13 |
| 4 | 8 | 8 | 5.16 | 10.31 |
| 4 | 8 | 4 | 2.41 | 4.81 |
| 4 | 8 | 2 | 1.41 | 2.81 |
| 8 | 8 | 8 | 3.52 | 7.03 |
| 8 | 8 | 4 | 1.89 | 3.78 |
| 8 | 8 | 2 | 1.27 | 2.53 |
| Chroma in 4:2:0 | | | | |
| 2 | 2 | 8 | 5.06 | 10.13 |
| 2 | 2 | 4 | 1.56 | 3.13 |
| 2 | 2 | 2 | 0.56 | 1.13 |
| 2 | 4 | 8 | 3.09 | 6.19 |
| 2 | 4 | 4 | 1.09 | 2.19 |
| 2 | 4 | 2 | 0.47 | 0.94 |

FIG. 25C

| W | H | T | Uni $\frac{(W+8+T-1)\times(H+4+T-1)}{W\times H}$ | Bi $\frac{2\times(W+8+T-1)\times(H+4+T-1)}{W\times H}$ |
|---|---|---|---|---|
| 4 | 4 | 8 | 17.81 | 35.63 |
| 4 | 4 | 4 | 10.31 | 20.63 |
| 4 | 4 | 2 | 7.31 | 14.63 |
| 4 | 8 | 8 | 11.28 | 22.56 |
| 4 | 8 | 4 | 7.03 | 14.06 |
| 4 | 8 | 2 | 5.28 | 10.56 |
| 8 | 8 | 8 | 6.83 | 13.66 |
| 8 | 8 | 4 | 4.45 | 8.91 |
| 8 | 8 | 2 | 3.45 | 6.91 |
| Chroma in 4:2:0 | | | | |
| 2 | 2 | 8 | 13.81 | 27.63 |
| 2 | 2 | 4 | 7.31 | 14.63 |
| 2 | 2 | 2 | 4.81 | 9.63 |
| 2 | 4 | 8 | 7.97 | 15.94 |
| 2 | 4 | 4 | 4.47 | 8.94 |
| 2 | 4 | 2 | 3.09 | 6.19 |

| W | H | T | Uni $\frac{(W+8+T-1) \times (H+8+T-1)}{W \times H}$ | Bi $\frac{2 \times (W+8+T-1) \times (H+8+T-1)}{W \times H}$ |
|---|---|---|---|---|
| 4 | 4 | 8 | 22.56 | 45.13 |
| 4 | 4 | 4 | 14.06 | 28.13 |
| 4 | 4 | 2 | 10.56 | 21.13 |
| Chroma in 4:2:0 | | | | |
| 2 | 2 | 8 | 18.06 | 36.13 |
| 2 | 2 | 4 | 10.56 | 21.13 |
| 2 | 2 | 2 | 7.56 | 15.13 |

FIG. 27C

| W | H | T | Uni $\frac{(W+2+T-1) \times (H+2+T-1)}{W \times H}$ | Bi $\frac{2 \times (W+2+T-1) \times (H+2+T-1)}{W \times H}$ |
|---|---|---|---|---|
| 4 | 4 | 8 | 10.56 | 21.13 |
| 4 | 4 | 4 | 5.06 | 10.13 |
| 4 | 4 | 2 | 3.06 | 6.13 |
| 4 | 8 | 8 | 6.91 | 13.81 |
| 4 | 8 | 4 | 3.66 | 7.31 |
| 4 | 8 | 2 | 2.41 | 4.81 |
| 8 | 8 | 8 | 4.52 | 9.03 |
| 8 | 8 | 4 | 2.64 | 5.28 |
| 8 | 8 | 2 | 1.89 | 3.78 |
| Chroma in 4:2:0 | | | | |
| 2 | 2 | 8 | 7.56 | 15.13 |
| 2 | 2 | 4 | 3.06 | 6.13 |
| 2 | 2 | 2 | 1.56 | 3.13 |
| 2 | 4 | 8 | 4.47 | 8.94 |
| 2 | 4 | 4 | 1.97 | 3.94 |
| 2 | 4 | 2 | 1.09 | 2.19 |

| W | H | T | M | Uni $$\frac{M \times (W + T - 1) \times (H + T - 1)}{W \times H}$$ | Bi $$\frac{2 \times M \times (W + T - 1) \times (H + T - 1)}{W \times H}$$ |
|---|---|---|---|---|---|
| 4 | 4 | 8 | 3 | 22.69 | 45.38 |
| 4 | 4 | 4 | 3 | 9.19 | 18.38 |
| 4 | 4 | 2 | 3 | 4.69 | 9.38 |
| 4 | 8 | 8 | 3 | 15.47 | 30.94 |
| 4 | 8 | 4 | 3 | 7.22 | 14.44 |
| 4 | 8 | 2 | 3 | 4.22 | 8.44 |
| 8 | 8 | 8 | 3 | 10.55 | 21.09 |
| 8 | 8 | 4 | 3 | 5.67 | 11.34 |
| 8 | 8 | 2 | 3 | 3.80 | 7.59 |
| 4 | 4 | 8 | 4 | 30.25 | 60.50 |
| 4 | 4 | 4 | 4 | 12.25 | 24.50 |
| 4 | 4 | 2 | 4 | 6.25 | 12.50 |
| 4 | 8 | 8 | 4 | 20.63 | 41.25 |
| 4 | 8 | 4 | 4 | 9.63 | 19.25 |
| 4 | 8 | 2 | 4 | 5.63 | 11.25 |
| 8 | 8 | 8 | 4 | 14.06 | 28.13 |
| 8 | 8 | 4 | 4 | 7.56 | 15.13 |
| 8 | 8 | 2 | 4 | 5.06 | 10.13 |
| 4 | 4 | 8 | 5 | 37.81 | 75.63 |
| 4 | 4 | 4 | 5 | 15.31 | 30.63 |
| 4 | 4 | 2 | 5 | 7.81 | 15.63 |
| 4 | 8 | 8 | 5 | 25.78 | 51.56 |
| 4 | 8 | 4 | 5 | 12.03 | 24.06 |
| 4 | 8 | 2 | 5 | 7.03 | 14.06 |
| 8 | 8 | 8 | 5 | 17.58 | 35.16 |
| 8 | 8 | 4 | 5 | 9.45 | 18.91 |
| 8 | 8 | 2 | 5 | 6.33 | 12.66 |
| 4 | 4 | 8 | 6 | 45.38 | 90.75 |
| 4 | 4 | 4 | 6 | 18.38 | 36.75 |
| 4 | 4 | 2 | 6 | 9.38 | 18.75 |
| 4 | 8 | 8 | 6 | 30.94 | 61.88 |
| 4 | 8 | 4 | 6 | 14.44 | 28.88 |
| 4 | 8 | 2 | 6 | 8.44 | 16.88 |
| 8 | 8 | 8 | 6 | 21.09 | 42.19 |
| 8 | 8 | 4 | 6 | 11.34 | 22.69 |
| 8 | 8 | 2 | 6 | 7.59 | 15.19 |

FIG. 28D

| W | H | T | L | Uni $\frac{(W + 2L + T - 1) \times (H + 2L + T - 1)}{W \times H}$ | Bi $\frac{2 \times (W + 2L + T - 1) \times (H + 2L + T - 1)}{W \times H}$ |
|---|---|---|---|---|---|
| 4 | 4 | 8 | 2 | 15.13 | 30.25 |
| 4 | 4 | 4 | 2 | 6.13 | 12.25 |
| 4 | 4 | 2 | 2 | 3.13 | 6.25 |
| 4 | 8 | 8 | 2 | 10.31 | 20.63 |
| 4 | 8 | 4 | 2 | 4.81 | 9.63 |
| 4 | 8 | 2 | 2 | 2.81 | 5.63 |
| 8 | 8 | 8 | 2 | 7.03 | 14.06 |
| 8 | 8 | 4 | 2 | 3.78 | 7.56 |
| 8 | 8 | 2 | 2 | 2.53 | 5.06 |
| 4 | 4 | 8 | 3 | 22.69 | 45.38 |
| 4 | 4 | 4 | 3 | 9.19 | 18.38 |
| 4 | 4 | 2 | 3 | 4.69 | 9.38 |
| 4 | 8 | 8 | 3 | 15.47 | 30.94 |
| 4 | 8 | 4 | 3 | 7.22 | 14.44 |
| 4 | 8 | 2 | 3 | 4.22 | 8.44 |
| 8 | 8 | 8 | 3 | 10.55 | 21.09 |
| 8 | 8 | 4 | 3 | 5.67 | 11.34 |
| 8 | 8 | 2 | 3 | 3.80 | 7.59 |
| 4 | 4 | 8 | 4 | 30.25 | 60.50 |
| 4 | 4 | 4 | 4 | 12.25 | 24.50 |
| 4 | 4 | 2 | 4 | 6.25 | 12.50 |
| 4 | 8 | 8 | 4 | 20.63 | 41.25 |
| 4 | 8 | 4 | 4 | 9.63 | 19.25 |
| 4 | 8 | 2 | 4 | 5.63 | 11.25 |
| 8 | 8 | 8 | 4 | 14.06 | 28.13 |
| 8 | 8 | 4 | 4 | 7.56 | 15.13 |
| 8 | 8 | 2 | 4 | 5.06 | 10.13 |
| 4 | 4 | 8 | 5 | 37.81 | 75.63 |
| 4 | 4 | 4 | 5 | 15.31 | 30.63 |
| 4 | 4 | 2 | 5 | 7.81 | 15.63 |
| 4 | 8 | 8 | 5 | 25.78 | 51.56 |
| 4 | 8 | 4 | 5 | 12.03 | 24.06 |
| 4 | 8 | 2 | 5 | 7.03 | 14.06 |
| 8 | 8 | 8 | 5 | 17.58 | 35.16 |
| 8 | 8 | 4 | 5 | 9.45 | 18.91 |
| 8 | 8 | 2 | 5 | 6.33 | 12.66 |
| 4 | 4 | 8 | 6 | 45.38 | 90.75 |
| 4 | 4 | 4 | 6 | 18.38 | 36.75 |
| 4 | 4 | 2 | 6 | 9.38 | 18.75 |
| 4 | 8 | 8 | 6 | 30.94 | 61.88 |
| 4 | 8 | 4 | 6 | 14.44 | 28.88 |
| 4 | 8 | 2 | 6 | 8.44 | 16.88 |
| 8 | 8 | 8 | 6 | 21.09 | 42.19 |
| 8 | 8 | 4 | 6 | 11.34 | 22.69 |
| 8 | 8 | 2 | 6 | 7.59 | 15.19 |

| W | H | T | Uni $\frac{(W+T-1) \times (H+T-1)}{W \times H}$ | Bi $\frac{2 \times (W+T-1) \times (H+T-1)}{W \times H}$ |
|---|---|---|---|---|
| 4 | 4 | 8 | 7.56 | 15.13 |
| 4 | 4 | 4 | 3.06 | 6.13 |
| 4 | 4 | 2 | 1.56 | 3.13 |
| Chroma in 4:2:0 | | | | |
| 2 | 2 | 8 | 5.06 | 10.13 |
| 2 | 2 | 4 | 1.56 | 3.13 |
| 2 | 2 | 2 | 0.56 | 1.13 |

| W | H | T | P | L | Uni $\frac{(W+P-1+2L+T-1) \times (H+P-1+2L+T-1)}{W \times H}$ | Bi Twice of Uni |
|---|---|---|---|---|---|---|
| 4 | 4 | 2 | 5 | 2 | 10.56 | 21.13 |
| 4 | 8 | 2 | 5 | 2 | 6.91 | 13.81 |
| 8 | 8 | 2 | 5 | 2 | 4.52 | 9.03 |
| 4 | 4 | 2 | 5 | 1 | 7.56 | 15.13 |
| 4 | 8 | 2 | 5 | 1 | 5.16 | 10.31 |
| 8 | 8 | 2 | 5 | 1 | 3.52 | 7.03 |
| 4 | 4 | 2 | 3 | 2 | 7.56 | 15.13 |
| 4 | 8 | 2 | 3 | 2 | 5.16 | 10.31 |
| 8 | 8 | 2 | 3 | 2 | 3.52 | 7.03 |

↙ 2970

ENCODING METHOD AND APPARATUS THEREFOR, AND DECODING METHOD AND APPARATUS THEREFOR

TECHNICAL FIELD

The present disclosure relates to an encoding method and decoding method of a video, and more particularly, to a method of applying an interpolation filter to a reference sample for inter prediction.

BACKGROUND ART

With the development and supply of hardware capable of reproducing and storing high resolution or high quality image content, the need for a codec capable of effectively encoding or decoding such high resolution or high quality image content has increased. The encoded image content may be reproduced by being decoded. Recently, methods for effectively compressing such high resolution or high quality image content have been implemented.

In order to compress an image, various data units may be used and an inclusion relationship may be present between the data units. A data unit may be split according to various methods to determine a size of a data unit used for image compression, and the image may be encoded or decoded by determining an optimized data unit according to characteristics of the image.

Image data may be compressed by removing spatial redundancy and temporal redundancy between pixels. Because it is general for adjacent pixels to have a common feature, encoding information is transmitted in data units of pixels to remove redundancy between the adjacent pixels.

Pixel values of the pixels included in the data units are not directly transmitted, but a method required to obtain the pixel values is transmitted. A prediction method of predicting a pixel value similar to an original value is determined for each data unit and encoding information about the prediction method is transmitted from an encoder to a decoder. Also, because a prediction value is not completely the same as the original value, residual data regarding a difference between the original value and the prediction value is transmitted from the encoder to the decoder.

The prediction method includes intra prediction and inter prediction. The intra prediction is a method of predicting pixels of a block based on neighboring pixels. The inter prediction is a method of predicting pixels by referring to a pixel of another picture to which a picture including a block refers. Accordingly, spatial redundancy is removed via the intra prediction and temporal redundancy is removed via the inter prediction.

DESCRIPTION OF EMBODIMENTS

Technical Problem

The present disclosure proposes a video encoding method and video encoding apparatus, and a video decoding method and video decoding apparatus, wherein a filter is adaptively applied to a reference sample, based on an inter prediction mode of a current block.

The technical problems to be achieved by the present embodiment are not limited to the technical problems mentioned above, and other technical problems that are not mentioned will be clearly understood by one of ordinary skill in the art from the following description.

Solution to Problem

According to various embodiments of the present disclosure, a video decoding method includes: determining an inter prediction mode of a current block when the current block is inter-predicted; determining at least one reference sample location to be referred to by the current block, based on the inter prediction mode of the current block; determining filter information to be applied to at least one reconstructed reference sample corresponding to the at least one reference sample location, based on the inter prediction mode of the current block; performing filtering on the at least one reconstructed reference sample, based on the filter information; and decoding the current block by using prediction samples generated via the filtering.

According to various embodiments of the present disclosure, a video decoding apparatus includes: at least one processor; and a memory, wherein the memory stores at least one instruction configured to be executable by the at least one processor, and the at least one instruction is configured to, when executed, cause the at least one processor to: determine an inter prediction mode of a current block when the current block is inter-predicted; determine at least one reference sample location to be referred to by the current block, based on the inter prediction mode of the current block; determine filter information to be applied to at least one reconstructed reference sample corresponding to the at least one reference sample location, based on the inter prediction mode of the current block; perform filtering on the at least one reconstructed reference sample, based on the filter information; and decode the current block by using prediction samples generated via the filtering.

According to various embodiments of the present disclosure, a video encoding method includes: determining an inter prediction mode of a current block when the current block is inter-predicted; determining at least one reference sample location to be referred to by the current block, based on the inter prediction mode of the current block; determining filter information to be applied to at least one reconstructed reference sample corresponding to the at least one reference sample location, based on the inter prediction mode of the current block; performing filtering on the at least one reconstructed reference sample, based on the filter information; and encoding the current block by using prediction samples generated via the filtering.

According to various embodiments of the present disclosure, a video encoding apparatus includes: at least one processor; and a memory, wherein the memory stores at least one instruction configured to be executable by the at least one processor, and the at least one instruction is configured to, when executed, cause the at least one processor to: determine an inter prediction mode of a current block when the current block is inter-predicted; determine at least one reference sample location to be referred to by the current block, based on the inter prediction mode of the current block; determine filter information to be applied to at least one reconstructed reference sample corresponding to the at least one reference sample location, based on the inter prediction mode of the current block; perform filtering on the at least one reconstructed reference sample, based on the filter information; and encode the current block by using prediction samples generated via the filtering.

According to various embodiments of the present disclosure, a non-transitory computer-readable recording medium has recorded thereon a program for executing the video encoding method.

According to various embodiments of the present disclosure, a non-transitory computer-readable recording medium has recorded thereon a program for executing the video decoding method.

Advantageous Effects of Disclosure

A video encoding method and video encoding apparatus, and a video decoding method and video decoding apparatus, according to various embodiments, may improve efficiency of a resource used in inter prediction by adaptively applying a filter to a reference sample, based on an inter prediction mode of a current block during the inter prediction. For example, power consumption and battery usage may be reduced by adjusting a memory bandwidth used for the inter prediction to an appropriate level.

The effects obtainable in the present disclosure are not limited to the above-mentioned effects, and other effects not mentioned may be clearly understood by one of ordinary skill in the art from the description below.

BRIEF DESCRIPTION OF DRAWINGS

FIG. 3 is a flowchart of an image decoding method according to various embodiments.

FIG. 8 illustrates a process, performed by an image decoding apparatus, of determining at least one coding unit by splitting a non-square coding unit, according to various embodiments.

FIG. 17 illustrates a process of determining a depth of a coding unit when a shape and size of the coding unit change, when the coding unit is recursively split such that a plurality of coding units are determined, according to various embodiments.

FIG. 23 illustrates a memory bandwidth required for inter prediction of a current block, according to various embodiments.

FIG. 25C illustrates a memory bandwidth required for inter prediction of a current block in an OBMC mode where a sub-block is not used, according to various embodiments.

FIG. 27C illustrates memory bandwidth required for inter prediction of a current block in a DMVR mode, according to various embodiments.

FIG. 28B illustrates a memory bandwidth required for inter prediction of a current block in a DMVR mode where a plurality of motion vector candidates are used, according to various embodiments.

FIG. 28D illustrates a memory bandwidth required for inter prediction of a current block in a DMVR mode where a search range is limited, according to various embodiments.

FIG. 29B illustrates a memory bandwidth required for inter prediction of a current block in an affine mode, according to various embodiments.

FIG. 29D illustrates a memory bandwidth required for inter prediction of a current block in an affine mode, according to various embodiments.

MODE OF DISCLOSURE

Figure 1A:
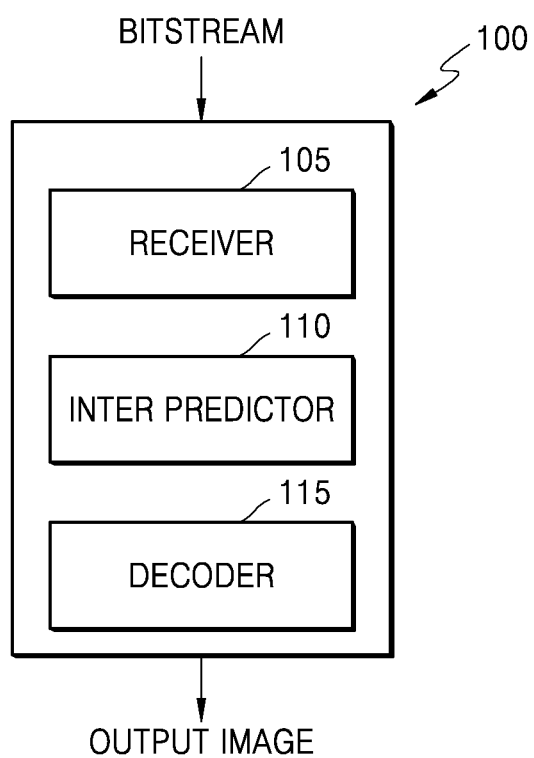
FIG. 1A is a block diagram of an image decoding apparatus according to various embodiments.

Advantages and features of one or more embodiments and methods of accomplishing the same may be understood more readily by reference to the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present embodiments of the present disclosure to one of ordinary skill in the art.

The terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

Terms such as "unit" used in the specification indicate software or a hardware component such as a field-programmable gate array (FPGA) or an application-specific integrated circuit (ASIC), and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the present disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, a register, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "current block" may denote one of a coding unit, a prediction unit, and a transform unit, which is currently encoded or decoded. Also, a "lower block" may denote a data unit split from the "current block". An "upper block" may denote a data unit including the "current block".

Hereinafter, a "sample" denotes data assigned to a sampling position of an image, i.e., data to be processed. For example, pixel values of an image in a spatial domain and transform coefficients on a transform region may be samples. A unit including at least one such sample may be defined as a block.

Hereinafter, embodiments will be described in detail with reference to the accompanying drawings such that one of ordinary skill in the art may easily implement the embodiments. In the drawings, parts irrelevant to the description are omitted to clearly describe the present disclosure.

Hereinafter, an image encoding apparatus and image decoding apparatus, and an image encoding method and image decoding method for adaptively performing inter prediction, based on an inter prediction mode of a current block, according to various embodiments, will be described with reference to FIGS. 1A through 6. Also, a video encoding apparatus and video decoding apparatus, and a video encoding method and video decoding method based on coding units of a tree structure, according to various embodiments, will be described with reference to FIGS. 7 through 20. Also, various embodiments to which a video encoding method, video decoding method, video encoding method, and video decoding method according to embodiments of FIGS. 1A through 20 are applicable will be described with reference to FIGS. 21A through 30.

FIG. 1A is a block diagram of an image decoding apparatus 100 according to various embodiments.

The image decoding apparatus 100 may include a receiver 105, an inter predictor 110, and a decoder 115. The receiver 105, the inter predictor 110, and the decoder 115 may include at least one processor. Also, the receiver 105, the inter predictor 110, and the decoder 115 may include a memory storing instructions to be performed by the at least one processor.

The receiver 105 may receive a bitstream. The bitstream includes information of an image encoded by an image encoding apparatus 400 described later. Also, the bitstream may be transmitted from the image encoding apparatus 400. The image encoding apparatus 400 and the image decoding apparatus 100 may be connected via wires or wirelessly, and the receiver 105 may receive the bitstream via wires or wirelessly. The receiver 105 may receive the bitstream from a storage medium, such as an optical medium or a hard disk.

The receiver 105 may obtain information about a prediction mode of a current block, from the bitstream. The information about the prediction mode of the current block may include information indicating n intra mode or an inter prediction mode. When the prediction mode of the current block is the inter prediction mode, the receiver 105 may obtain information about the inter prediction mode of the current block from the bitstream. The information about the inter prediction mode of the current block may be information about the inter prediction mode applied to the current block among a plurality of inter prediction modes. For example, the inter prediction mode of the current block may be at least one of a merge mode, an advanced motion vector prediction (AMVP) mode, an inter skip mode, an overlapped block motion compensation (OBMC) mode, a decoder-side motion vector refinement (DMVR) mode, an affine mode, and a bidirectional optical flow (BIO) mode.

The inter predictor 110 may be activated when the prediction mode of the current block is the inter prediction mode. The inter predictor 110 may determine the inter prediction mode of the current block, based on the information about the inter prediction mode of the current block obtained from the bitstream.

The inter predictor 110 may determine at least one reference sample location to be referred to by the current block, based on the inter prediction mode of the current block. The inter predictor 110 may obtain at least one motion vector and at least one reference picture index of the current block, based on the inter prediction mode of the current block, and determine a location indicated by the motion vector within a reference picture indicated by the reference picture index as the reference sample location. According to various embodiments, the reference sample location may be determined to be coordinates obtained by adding a motion vector component of the current block to top-left coordinates of the current block. The reference sample location may indicate a top-left location of the reference block referred to by the current block within the reference picture.

According to various embodiments, the reference sample location may indicate a sub-pixel located between integer pixels, for further accurate prediction. For example, the reference sample location may indicate a sub-pixel of ¼-pixel unit. However, the reference sample location is not limited thereto, and a sub-pixel unit may be a ⅛-pixel unit or smaller.

According to various embodiments, the number of reference sample locations equal to the number of motion vectors used in the inter prediction mode of the current block may be determined. For example, when the current block is unidirectionally predicted, one reference sample location may be determined, and when the current block is bidirectionally predicted, two reference sample locations may be determined.

The inter predictor 110 may determine filter information to be applied to at least one reconstructed reference sample corresponding to the at least one reference sample location, based on the inter prediction mode of the current block. The inter predictor 110 may apply an interpolation filter to reference samples at integer pixel locations and determine information about the interpolation filter to generate a reference sample at a sub-pixel location between the reference samples at the integer pixel locations.

According to various embodiments, the inter predictor 110 may determine the at least one reconstructed reference sample to which a filter is to be applied, based on the reference sample location within a reconstructed reference picture. According to some embodiments, the at least one reconstructed reference sample may include samples located within a certain range based on the reference sample location. According to some embodiments, the at least one reconstructed reference sample may include samples in the reference block referred to by the current block and neighboring samples adjacent to the reference block of the current block. According to some embodiments, the at least one reconstructed reference sample may further include reference samples referred to by a neighboring block adjacent to the current block. According to some embodiments, the at least one reconstructed reference sample may further include neighboring samples adjacent to reference blocks referred to by the neighboring block of the current block.

According to some embodiments, the inter predictor 110 may determine reference samples at integer pixel locations located within a certain range based on the reference sample location to be the at least one reconstructed reference sample to which the interpolation filter is to be applied. According to some embodiments, the at least one reconstructed reference sample may include reference samples at integer pixel locations required to generate reference samples at sub-pixel locations included in the reference block referred to by the current block. According to some embodiments, the at least one reconstructed reference sample may further include reference samples at integer pixel locations required to generate a neighboring reference sample at a sub-pixel location adjacent to the reference block of the current block. According to some embodiments, the at least one reconstructed reference sample may further include reference samples at integer pixel locations required to generate reference samples at sub-pixel locations referred to by the neighboring block adjacent to the current block.

According to various embodiments, the filter information may include at least one of a direction and size of the filter. According to various embodiments, the inter predictor 110 may determine to use a separable 2-dimensional (2D) filter. According to an embodiment, the inter predictor 110 may determine to apply each of a horizontal direction filter and a vertical direction filter.

According to various embodiments, the inter predictor 110 may determine the size of the filter by determining the number of taps of the filter to a certain value. The number of taps of the filter may denote the number of reference samples at integer pixel locations required to generate the reference sample at the sub-pixel location. Here, the certain value may be determined according to the inter prediction mode of the current block.

According to various embodiments, the inter predictor 110 may determine the filter information based on the size of the current block. According to some embodiments, the inter predictor 110 may determine the size of the filter based on the size of the current block.

According to an embodiment, the inter predictor 110 may determine to use a first filter when the size of the current block is equal to or greater than a certain reference value and determine to use a second filter otherwise. According to an embodiment, a size of the first filter may be greater than a size of the second filter. According to an embodiment, the certain reference value may be determined according to the inter prediction mode of the current block. According to an embodiment, the inter predictor 110 may compare the size of the current block with a plurality of reference values, and determine a filter to be used among a plurality of filters based on a result of the comparison.

According to an embodiment, the inter predictor 110 may determine horizontal direction filter information based on a horizontal width of the current block and determine vertical direction filter information based on a vertical height of the current block. According to an embodiment, when the current block is non-square, the inter predictor 110 may determine a horizontal direction filter and a vertical direction filter to be filters of different sizes.

According to an embodiment, the inter predictor 110 may determine the horizontal direction filter information and the vertical direction filter information, based on a ratio of the horizontal width and the vertical height of the current block. For example, when the horizontal direction filter information of the current block is determined, the inter predictor 110 may determine the vertical direction filter information based on the horizontal direction filter information and the ratio of the horizontal width and the vertical height of the current block. As for another example, when the vertical direction filter information of the current block is determined, the inter predictor 110 may determine the horizontal direction filter information based on the vertical direction filter information and the ratio of the horizontal width and the vertical height of the current block. According to an embodiment, the inter predictor 110 may determine the size of the horizontal direction filter and the size of the vertical direction filter to be in proportion to the horizontal width and the vertical height of the current block.

According to various embodiments, the inter predictor 110 may determine the filter information based on whether the current block is a luma block or a chroma block. According to an embodiment, the inter predictor 110 may determine to use the first filter when the current block is the luma block and determine to use the second filter when the current block is the chroma block. According to an embodiment, the size of the first filter may be twice larger than the size of the second filter.

According to various embodiments, the inter predictor 110 may determine the filter information based on whether the inter prediction of the current block is unidirectional prediction or bidirectional prediction. According to an embodiment, the inter predictor 110 may determine to use the first filter when the current block is unidirectionally predicted and determine to use the second filter when the current block is bidirectionally predicted. According to an embodiment, the size of the first filter may be twice larger than the size of the second filter.

According to various embodiments, the inter predictor 110 may determine the filter information based on the number of reference blocks referred to by the current block. According to an embodiment, the image decoding apparatus 100 may determine to use a filter of a first number of taps when the number of reference blocks referred to by the current block is lower than or equal to a certain reference value and determine to use a filter of a second number of taps smaller than the first number of taps otherwise. According to an embodiment, the inter predictor 110 may compare the number of reference blocks referred to by the current block with a plurality of reference values and determine a filter to be used among the plurality of filters based on a result of the comparison.

According to various embodiments, the inter predictor 110 may determine a largest size of the filter, based on the inter prediction mode of the current block. For example, when the inter prediction mode of the current block is an OBMC mode, the inter predictor 110 may determine the size of the filter to be smaller than or equal to 2 taps. For example, when the inter prediction mode of the current block is a DMVR mode, the inter predictor 110 may determine the size of the filter to be smaller than or equal to 4 taps. For example, when the inter prediction mode of the current block is an affine mode, the inter predictor 110 may determine the size of the filter to be smaller than or equal to 4 taps. For example, when the inter prediction mode of the current block is a BIO mode, the inter predictor 110 may determine the size of the filter to be smaller than or equal to 8 taps.

According to various embodiments, the inter predictor 110 may determine the filter information such that a memory bandwidth required for inter prediction of the current block is within a certain range. The memory bandwidth may be defined to be the number of reference samples to be fetched from a memory to predict a current sample. The memory bandwidth may be determined based on the size of the current block and the number of reconstructed reference samples required for inter prediction of the current block.

According to various embodiments, the inter predictor 110 may determine not to perform filtering on the at least one reconstructed reference sample, based on at least one of the inter prediction mode of the current block, the size of the current block, whether the current block is the luma block or the chroma block, and whether the inter prediction of the current block is the unidirectional prediction or the bidirectional prediction.

The inter predictor 110 may perform filtering on the at least one reconstructed reference sample, based on the filter information. According to various embodiments, the inter predictor 110 may generate the reference sample at the sub-pixel location by applying the interpolation filter to the reconstructed reference samples at the integer pixel locations, based on the filter information. According to various embodiments, the inter predictor 110 may generate prediction samples corresponding to samples of the current block by using the reference samples at the integer pixel locations and the reference samples at the sub-pixel locations.

The decoder 115 may decode the current block by using the prediction samples generated via the filtering. According to various embodiments, the decoder 115 may reconstruct the current block, based on the prediction samples of the current block and a residual block of the current block.

Figure 1B:
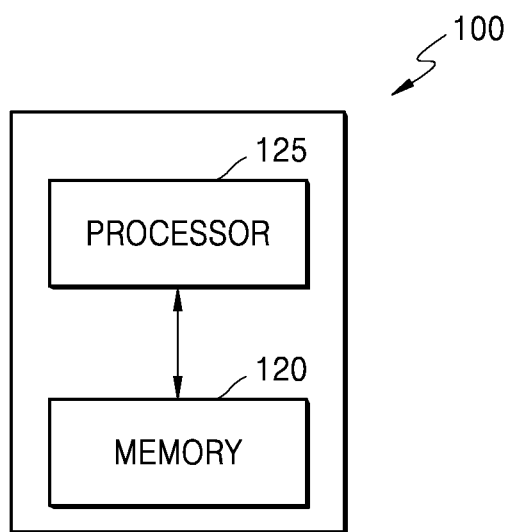
FIG. 1B is a block diagram of an image decoding apparatus according to various embodiments.

FIG. 1B is a block diagram of the image decoding apparatus 100 according to various embodiments. The image decoding apparatus 100 may be the image decoding apparatus 100 of FIG. 1A.

The image decoding apparatus 100 according to various embodiments may include a memory 120 and at least one processor 125 accessing the memory 120. Operations of the image decoding apparatus 100 according to various embodiments may be performed by individual processors or by control of a central processor. Also, the memory 120 of the image decoding apparatus 100 may store data received from an external source and data generated by the processor 125.

The memory 120 of the image decoding apparatus 100 according to various embodiments may include at least one instruction configured to be executable by the at least one processor 125. The at least one instruction may be configured to, when executed, cause the at least one processor 125 to: determine an inter prediction mode of a current block when the current block is inter-predicted; determine at least one reference sample location to be referred to by the current block, based on the inter prediction mode of the current block; determine filter information to be applied to at least one reconstructed reference sample corresponding to the at least one reference sample location, based on the inter prediction mode of the current block; perform filtering on the at least one reconstructed reference sample, based on the filter information; and decode the current block by using prediction samples generated via the filtering.

Figure 2:
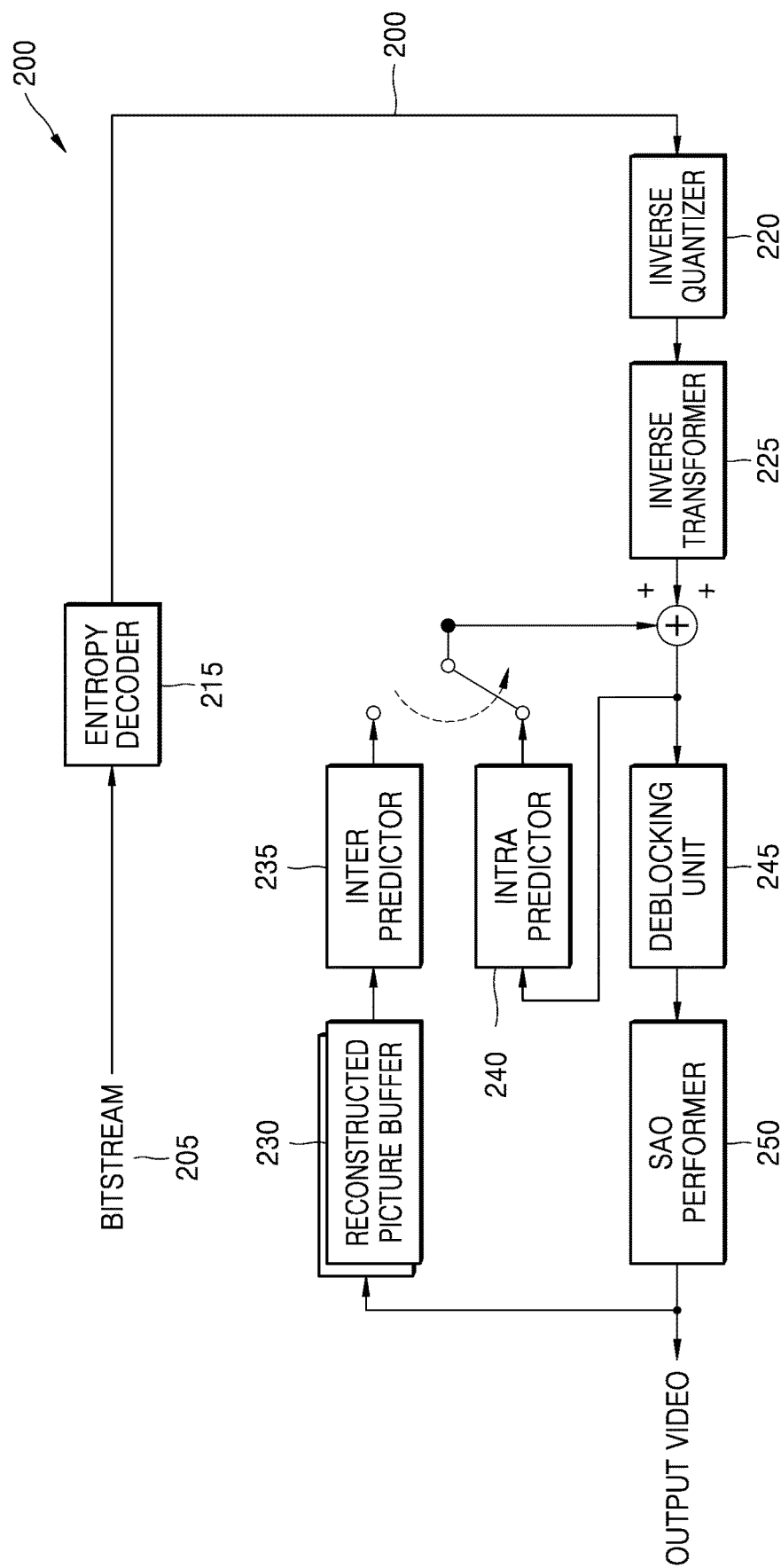
FIG. 2 is a block diagram of an image decoding apparatus according to various embodiments.

FIG. 2 is a block diagram of an image decoder 200 according to various embodiments.

The image decoder 200 according to various embodiments may perform operations that are processed by the image decoding apparatus 100 of FIG. 1A or 1B to decode image data.

Referring to FIG. 2, an entropy decoder 215 parses, from a bitstream 205, encoded image data that is to be decoded and encoding information required for decoding. The encoded image data is a quantized transform coefficient, and an inverse quantizer 220 and an inverse transformer 225 reconstructs residue data from the quantized transform coefficient.

An intra predictor 240 performs intra prediction on each block. An inter predictor 235 performs inter prediction on each block using a reference picture obtained by a reconstructed picture buffer 230. The inter predictor 235 may correspond to the inter predictor 110 of FIG. 1A.

Data of a spatial domain regarding a block of a current image may be reconstructed in response to prediction data for each block generated by the intra predictor 240 or the inter predictor 235 and the residue data being added, and a deblocking unit 245 and a sample adaptive offset (SAO) performer 250 may output a filtered reconstructed image by performing loop filtering on the reconstructed data of the spatial domain. Also, reconstructed images stored in the reconstructed picture buffer 230 may be output as reference images.

In order for the image decoding apparatus 100 to decode image data, step-by-step operations of the image decoder 200 according to various embodiments may be performed block by block.

FIG. 3 is a flowchart of an image decoding method 300 according to various embodiments.

In operation S310, the image decoding apparatus 100 may determine an inter prediction mode of a current block. The image decoding apparatus 100 may receive a bitstream and obtain information about the inter prediction mode of the current block from the bitstream. The information about the inter prediction mode of the current block may be information about the inter prediction mode applied to the current block among a plurality of inter prediction modes. For example, the inter prediction mode may be at least one of a merge mode, an advanced motion vector prediction (AMVP) mode, an inter skip mode, an overlapped block motion compensation (OBMC) mode, a decoder-side motion vector refinement (DMVR) mode, an affine mode, and a bidirectional optical flow (BIO) mode.

In operation S320, the image decoding apparatus 100 may determine at least one reference sample location to be referred to by the current block, based on the inter prediction mode of the current block. The image decoding apparatus 100 may obtain at least one motion vector and at least one reference picture index of the current block, based on the inter prediction mode of the current block, and determine a location indicated by the motion vector within a reference picture indicated by the reference picture index as the reference sample location.

According to various embodiments, the reference sample location may indicate a sub-pixel located between integer pixels, for further accurate prediction. According to various embodiments, the number of reference sample locations equal to the number of motion vectors used in the inter prediction mode of the current block may be determined.

In operation S330, the image decoding apparatus 100 may determine filter information to be applied to at least one reconstructed reference sample corresponding to the at least one reference sample location, based on the inter prediction mode of the current block. The image decoding apparatus 100 may apply an interpolation filter to reference samples at integer pixel locations and determine information about the interpolation filter to generate a reference sample at a sub-pixel location between the reference samples at the integer pixel locations.

According to various embodiments, the image decoding apparatus 100 may determine the at least one reconstructed reference sample to which a filter is to be applied, based on the reference sample location within a reconstructed reference picture. According to some embodiments, the at least one reconstructed reference sample may include samples located within a certain range based on the reference sample location. According to some embodiments, the at least one reconstructed reference sample may include samples in the reference block referred to by the current block and neighboring samples adjacent to the reference block of the current block. According to some embodiments, the at least one reconstructed reference sample may further include reference samples referred to by a neighboring block adjacent to the current block. According to some embodiments, the at least one reconstructed reference sample may further include neighboring samples adjacent to reference blocks referred to by the neighboring block of the current block.

According to some embodiments, the image decoding apparatus 100 may determine reference samples at integer pixel locations located within a certain range based on the reference sample location to be the at least one reconstructed reference sample to which the interpolation filter is to be applied. According to some embodiments, the at least one reconstructed reference sample may include reference samples at integer pixel locations required to generate reference samples at sub-pixel locations included in the reference block referred to by the current block. According to some embodiments, the at least one reconstructed reference sample may further include reference samples at integer pixel locations required to generate a neighboring reference sample at a sub-pixel location adjacent to the reference block of the current block. According to some embodiments, the at least one reconstructed reference sample may further include reference samples at integer pixel locations required to generate reference samples at sub-pixel locations referred to by the neighboring block adjacent to the current block.

According to various embodiments, the filter information may include at least one of a direction and size of the filter. According to various embodiments, the image decoding apparatus 100 may determine to use a separable 2D filter. According to an embodiment, the image decoding apparatus 100 may determine to apply each of a horizontal direction filter and a vertical direction filter.

According to various embodiments, the image decoding apparatus 100 may determine the size of the filter by determining the number of taps of the filter to a certain value. Here, the certain value may be determined according to the inter prediction mode of the current block.

According to various embodiments, the image decoding apparatus 100 may determine the filter information based on the size of the current block. According to an embodiment, the image decoding apparatus 100 may determine to use a first filter when the size of the current block is equal to or greater than a certain reference value and determine to use a second filter otherwise. According to an embodiment, a size of the first filter may be greater than a size of the second filter. According to an embodiment, the certain reference value may be determined according to the inter prediction mode of the current block. According to an embodiment, the image decoding apparatus 100 may compare the size of the current block with a plurality of reference values, and determine a filter to be used among a plurality of filters based on a result of the comparison.

According to an embodiment, the image decoding apparatus 100 may determine horizontal direction filter information based on a horizontal width of the current block and determine vertical direction filter information based on a vertical height of the current block. According to an embodiment, when the current block is non-square, the image decoding apparatus 100 may determine a horizontal direction filter and a vertical direction filter to be filters of different sizes.

According to an embodiment, the image decoding apparatus 100 may determine the horizontal direction filter information and the vertical direction filter information, based on a ratio of the horizontal width and the vertical height of the current block. For example, when the horizontal direction filter information of the current block is determined, the image decoding apparatus 100 may determine the vertical direction filter information based on the horizontal direction filter information and the ratio of the horizontal width and the vertical height of the current block. As for another example, when the vertical direction filter information of the current block is determined, the image decoding apparatus 100 may determine the horizontal direction filter information based on the vertical direction filter information and the ratio of the horizontal width and the vertical height of the current block. According to an embodiment, the image decoding apparatus 100 may determine the size of the horizontal direction filter and the size of the vertical direction filter to be in proportion to the horizontal width and the vertical height of the current block.

According to various embodiments, the image decoding apparatus 100 may determine the filter information based on whether the current block is a luma block or a chroma block. According to an embodiment, the image decoding apparatus 100 may determine to use the first filter when the current block is the luma block and determine to use the second filter when the current block is the chroma block. According to an embodiment, the size of the first filter may be twice larger than the size of the second filter.

According to various embodiments, the image decoding apparatus 100 may determine the filter information based on whether the inter prediction of the current block is unidirectional prediction or bidirectional prediction. According to an embodiment, the image decoding apparatus 100 may determine to use the first filter when the current block is unidirectionally predicted and determine to use the second filter when the current block is bidirectionally predicted. According to an embodiment, the size of the first filter may be twice larger than the size of the second filter.

According to various embodiments, the image decoding apparatus 100 may determine the filter information based on the number of reference blocks referred to by the current block. According to an embodiment, the image decoding apparatus 100 may compare the number of reference blocks referred to by the current block with a plurality of reference values and determine a filter to be used among the plurality of filters based on a result of the comparison.

According to various embodiments, the image decoding apparatus 100 may determine a largest size of the filter, based on the inter prediction mode of the current block. For example, when the inter prediction mode of the current block is an OBMC mode, the image decoding apparatus 100 may determine the size of the filter to be smaller than or equal to 2 taps. For example, when the inter prediction mode of the current block is a DMVR mode, the image decoding apparatus 100 may determine the size of the filter to be smaller than or equal to 4 taps. For example, when the inter prediction mode of the current block is an affine mode, the image decoding apparatus 100 may determine the size of the filter to be smaller than or equal to 4 taps. For example, when the inter prediction mode of the current block is a BIO mode, the image decoding apparatus 100 may determine the size of the filter to be smaller than or equal to 8 taps.

According to various embodiments, the image decoding apparatus 100 may determine the filter information such that a memory bandwidth required for inter prediction of the current block is within a certain range. The memory bandwidth may be defined to be the number of reference samples to be fetched from a memory to process a current sample. The memory bandwidth may be determined based on the size of the current block and the number of reconstructed reference samples required for inter prediction of the current block.

According to various embodiments, the image decoding apparatus 100 may determine not to perform filtering on the at least one reconstructed reference sample, based on at least one of the inter prediction mode of the current block, the size of the current block, whether the current block is the luma block or the chroma block, and whether the inter prediction of the current block is the unidirectional prediction or the bidirectional prediction.

In operation S340, the image decoding apparatus 100 may perform filtering on the at least one reconstructed reference sample, based on the filter information. According to various embodiments, the image decoding apparatus 100 may generate the reference sample at the sub-pixel location by applying the interpolation filter to the reconstructed reference samples at the integer pixel locations, based on the filter information. According to various embodiments, the image decoding apparatus 100 may generate prediction samples corresponding to samples of the current block by using the reference samples at the integer pixel locations and the reference samples at the sub-pixel locations.

In operation S350, the image decoding apparatus 100 may decode the current block by using the prediction samples generated via the filtering. According to various embodiments, the image decoding apparatus 100 may reconstruct the current block, based on the prediction samples of the current block and a residual block of the current block.

Figure 4A:
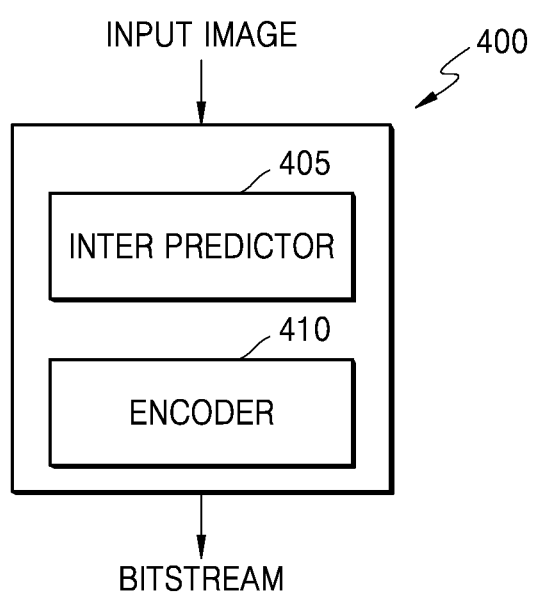
FIG. 4A is a block diagram of an image encoding apparatus according to various embodiments.

FIG. 4A is a block diagram of an image encoding apparatus 400 according to various embodiments.

The image encoding apparatus 400 may include an inter predictor 405 and an encoder 410. The inter predictor 405 and the encoder 410 may include at least one processor. Also, the inter predictor 405 and the encoder 410 may include a memory storing instructions to be performed by the at least one processor.

The inter predictor 405 may determine an inter prediction mode applied to a current block among a plurality of inter prediction modes, when a prediction mode of the current block is the inter prediction mode. According to various embodiments, the inter predictor 405 may determine the inter prediction mode applied to the current block according to encoding efficiency of the inter prediction mode applicable to the current block. For example, the inter prediction modes applicable to the current block may be a merge mode, an AMVP mode, an inter skip mode, an OBMC mode, a DMVR mode, an affine mode, and a BIO mode.

According to various embodiments, the inter predictor 405 may determine the number of reference blocks to be referred to by the current block. For example, the inter predictor 405 may determine whether the current block is to be unidirectionally predicted or bidirectionally predicted.

The inter predictor 405 may determine at least one reference sample location to be referred to by the current block, based on the inter prediction mode of the current block. According to various embodiments, the inter predictor 405 may determine a reference block that is a block most similar to the current block from at least one reference picture, based on the inter prediction mode of the current block, and perform motion prediction of determining a motion vector indicating a location difference between the current block and the reference block.

Here, for further accurate motion prediction, reference samples at sub-pixel locations between reference samples at integer pixel locations of a reference picture may be generated and a motion vector of a sub-pixel unit indicating the reference sample at the sub-pixel location may be determined. For example, the reference samples at sub-pixel locations may be generated in ¼-pixel units. However, the reference samples are not limited thereto, and the reference samples at sub-pixel locations may be generated in ⅛-pixel units or smaller.

According to various embodiments, the inter predictor 405 may determine a location indicated by the motion vector in the reference picture as the reference sample location. According to various embodiments, the reference sample location may indicate a top-left location of the reference block referred to by the current block within the reference picture. The reference sample location may be determined to be coordinates obtained by adding a motion vector component of the current block to top-left coordinates of the current block.

According to various embodiments, the number of reference sample locations equal to the number of motion vectors used in the inter prediction mode of the current block may be determined. For example, when the current block is unidirectionally predicted, one reference sample location may be determined. For example, when the current block is bidirectionally predicted, two reference sample locations may be determined.

The inter predictor 405 may determine filter information to be applied to at least one reconstructed reference sample corresponding to the at least one reference sample location, based on the inter prediction mode of the current block. The inter predictor 405 may apply an interpolation filter to reference samples at integer pixel locations and determine information about the interpolation filter to generate a reference sample at a sub-pixel location between the reference samples at the integer pixel locations.

According to various embodiments, the inter predictor 405 may determine the at least one reconstructed reference sample to which a filter is to be applied, based on the reference sample location within a reconstructed reference picture. According to some embodiments, the at least one reconstructed reference sample may include samples located within a certain range based on the reference sample location. According to some embodiments, the at least one reconstructed reference sample may include samples in the reference block referred to by the current block and neighboring samples adjacent to the reference block of the current block. According to some embodiments, the at least one reconstructed reference sample may further include reference samples referred to by a neighboring block adjacent to the current block. According to some embodiments, the at least one reconstructed reference sample may further include neighboring samples adjacent to reference blocks referred to by the neighboring block of the current block.

According to some embodiments, the inter predictor 405 may determine reference samples at integer pixel locations located within a certain range based on the reference sample location to be the at least one reconstructed reference sample to which the interpolation filter is to be applied. According to some embodiments, the at least one reconstructed reference sample may include reference samples at integer pixel locations required to generate reference samples at sub-pixel locations included in the reference block referred to by the current block. According to some embodiments, the at least one reconstructed reference sample may further include reference samples at integer pixel locations required to generate a neighboring reference sample at a sub-pixel location adjacent to the reference block of the current block. According to some embodiments, the at least one reconstructed reference sample may further include reference samples at integer pixel locations required to generate reference samples at sub-pixel locations referred to by the neighboring block adjacent to the current block.

According to various embodiments, the filter information may include at least one of a direction and size of the filter. According to various embodiments, the inter predictor 405 may determine to use a separable 2D filter. According to an embodiment, the inter predictor 405 may determine to apply each of a horizontal direction filter and a vertical direction filter.

According to various embodiments, the inter predictor 405 may determine the size of the filter by determining the number of taps of the filter to a certain value. The number of taps of the filter may denote the number of reference samples at integer pixel locations required to generate the reference sample at the sub-pixel location. Here, the certain value may be determined according to the inter prediction mode of the current block.

According to various embodiments, the inter predictor 405 may determine the filter information based on the size of the current block. According to some embodiments, the inter predictor 405 may determine the size of the filter based on the size of the current block.

According to an embodiment, the inter predictor 405 may determine to use a first filter when the size of the current block is equal to or greater than a certain reference value and determine to use a second filter otherwise. According to an embodiment, a size of the first filter may be greater than a size of the second filter. According to an embodiment, the certain reference value may be determined according to the inter prediction mode of the current block. According to an embodiment, the inter predictor 405 may compare the size of the current block with a plurality of reference values, and determine a filter to be used among a plurality of filters based on a result of the comparison.

According to an embodiment, the inter predictor 405 may determine horizontal direction filter information based on a horizontal width of the current block and determine vertical direction filter information based on a vertical height of the current block. According to an embodiment, when the current block is non-square, the inter predictor 405 may determine a horizontal direction filter and a vertical direction filter to be filters of different sizes. According to an embodiment, when the current block is non-square, the inter predictor 405 may determine the number of taps of a horizontal direction filter and the number of taps of a vertical direction filter to be different from each other.

According to an embodiment, the inter predictor 405 may determine the horizontal direction filter information and the vertical direction filter information, based on a ratio of the horizontal width and the vertical height of the current block. For example, when the horizontal direction filter information of the current block is determined, the inter predictor 405 may determine the vertical direction filter information based on the horizontal direction filter information and the ratio of the horizontal width and the vertical height of the current block. As for another example, when the vertical direction filter information of the current block is determined, the inter predictor 405 may determine the horizontal direction filter information based on the vertical direction filter information and the ratio of the horizontal width and the vertical height of the current block. According to an embodiment, the inter predictor 405 may determine the size of the horizontal direction filter and the size of the vertical direction filter to be in proportion to the horizontal width and the vertical height of the current block.

According to various embodiments, the inter predictor 405 may determine the filter information based on whether the current block is a luma block or a chroma block. According to an embodiment, the inter predictor 405 may determine to use the first filter when the current block is the luma block and determine to use the second filter when the current block is the chroma block. According to an embodiment, the size of the first filter may be twice larger than the size of the second filter.

According to various embodiments, the inter predictor 405 may determine the filter information based on whether the inter prediction of the current block is unidirectional prediction or bidirectional prediction. According to an embodiment, the inter predictor 405 may determine to use the first filter when the current block is unidirectionally predicted and determine to use the second filter when the current block is bidirectionally predicted. According to an embodiment, the size of the first filter may be twice larger than the size of the second filter.

According to various embodiments, the inter predictor 405 may determine the filter information based on the number of reference blocks referred to by the current block. According to an embodiment, the inter predictor 405 may compare the number of reference blocks referred to by the current block with a plurality of reference values and determine a filter to be used among the plurality of filters based on a result of the comparison.

According to various embodiments, the inter predictor 405 may determine a largest size of the filter, based on the inter prediction mode of the current block. For example, when the inter prediction mode of the current block is an OBMC mode, the inter predictor 405 may determine the size of the filter to be smaller than or equal to 2 taps. For example, when the inter prediction mode of the current block is a DMVR mode, the inter predictor 405 may determine the size of the filter to be smaller than or equal to 4 taps. For example, when the inter prediction mode of the current block is an affine mode, the inter predictor 405 may determine the size of the filter to be smaller than or equal to 4 taps. For example, when the inter prediction mode of the current block is a BIO mode, the inter predictor 405 may determine the size of the filter to be smaller than or equal to 8 taps.

According to various embodiments, the inter predictor 405 may determine the filter information such that a memory bandwidth required for inter prediction of the current block is within a certain range. The memory bandwidth may be defined to be the number of reference samples to be fetched from a memory to encode a current sample. The memory bandwidth may be determined based on the size of the current block and the number of reconstructed reference samples required for inter prediction of the current block.

According to various embodiments, the inter predictor 405 may determine not to perform filtering on the at least one reconstructed reference sample, based on at least one of the inter prediction mode of the current block, the size of the current block, whether the current block is the luma block or the chroma block, and whether the inter prediction of the current block is the unidirectional prediction or the bidirectional prediction.

The inter predictor 405 may perform filtering on the at least one reconstructed reference sample, based on the filter information. According to various embodiments, the inter predictor 405 may generate the reference sample at the sub-pixel location by applying the interpolation filter to the reconstructed reference samples at the integer pixel locations, based on the filter information.

According to various embodiments, the inter predictor 405 may determine at least one reference block most similar to the current block by using the reference samples at integer pixel locations and reference samples at sub-pixel locations, based on the inter prediction mode of the current block. According to various embodiments, the inter predictor 405 may determine a location difference between the current block and the reference block as a motion vector.

According to various embodiments, the inter predictor 405 may generate prediction samples corresponding to samples of the current block, from samples of the reference block.

The encoder 410 may encode the current block by using the prediction samples generated via the filtering. According to various embodiments, the encoder 410 may obtain a residual value between a sample value of the current block and a prediction sample value of the current block, and encode the residual value.

According to various embodiments, the encoder 410 may encode information related to at least one motion vector of the current block. According to various embodiments, the encoder 410 may encode at least one reference picture index of the current block. According to various embodiments, the encoder 410 may encode information about the inter prediction mode of the current block.

Figure 4B:
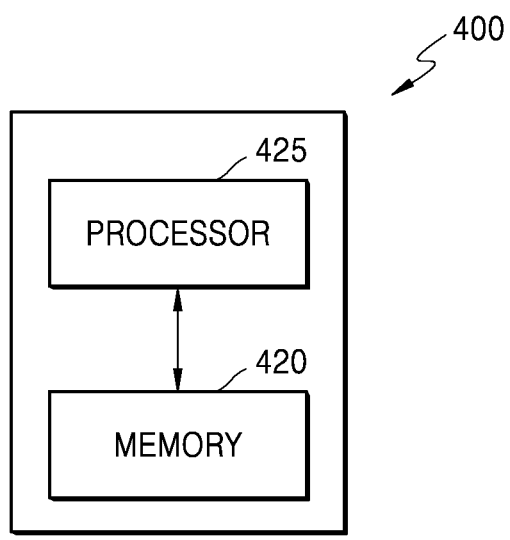
FIG. 4B is a block diagram of an image encoding apparatus according to various embodiments.

FIG. 4B is a block diagram of the image encoding apparatus 400 according to various embodiments. The image encoding apparatus 400 may be the image encoding apparatus 400 of FIG. 4A.

The image encoding apparatus 400 according to various embodiments may include a memory 420 and at least one processor 425 accessing the memory 420. Operations of the image encoding apparatus 400 according to various embodiments may be performed by individual processors or by control of a central processor. Also, the memory 420 of the image encoding apparatus 400 may store data received from an external source and data generated by the processor 425.

The memory 420 of the image encoding apparatus 400 according to various embodiments may include at least one instruction configured to be executable by the at least one processor 425. The at least one instruction may be configured to, when executed, cause the at least one processor 425 to: determine an inter prediction mode of a current block when the current block is inter-predicted; determine at least one reference sample location to be referred to by the current block, based on the inter prediction mode of the current block; determine filter information to be applied to at least one reconstructed reference sample corresponding to the at least one reference sample location, based on the inter prediction mode of the current block; perform filtering on the at least one reconstructed reference sample, based on the filter information; and encode the current block by using prediction samples generated via the filtering.

Figure 5:
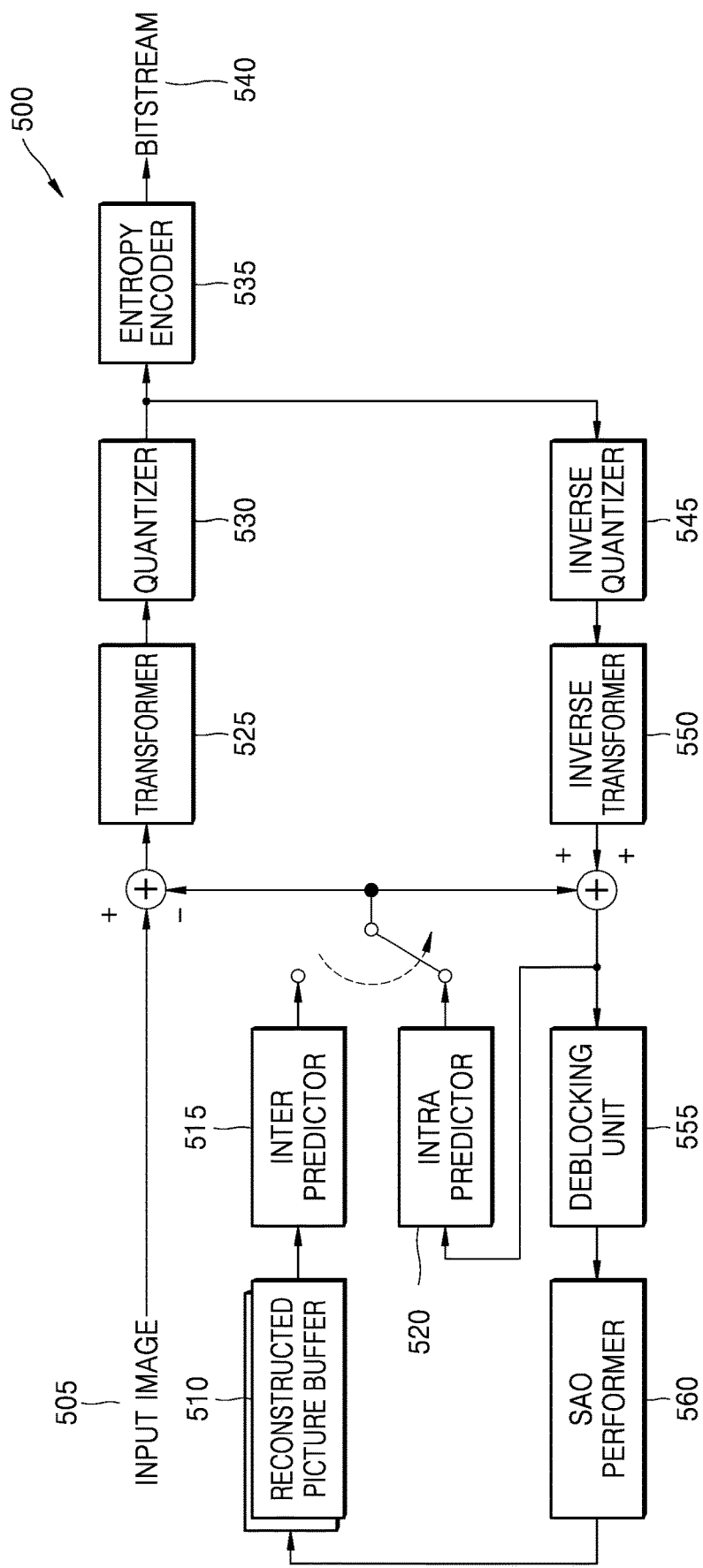
FIG. 5 is a block diagram of an image encoding apparatus according to various embodiments.

FIG. 5 is a block diagram of an image encoder 500 according to various embodiments.

The image encoder 500 according to various embodiments may perform operations that are processed by the image encoding apparatus 400 of FIG. 4A or 4B to encode image data.

An intra predictor 520 performs intra prediction for each block in a current image 505 and an inter predictor 515 performs inter prediction by using the current image 505 and a reference image obtained from a reconstructed picture buffer 510 for each block. The inter predictor 520 of FIG. 5 may correspond to the inter predictor 405 of FIG. 4A.

Residue data is generated by subtracting prediction data of each block output from the intra predictor 520 or the inter predictor 515 from data of an encoded block of the current image 505, and a transformer 525 and a quantizer 530 may output a quantized transform coefficient for each block by performing transformation and quantization on the residue data.

An inverse quantizer 545 and an inverse transformer 550 may reconstruct residue data of a spatial domain by performing inverse quantization and inverse transformation on the quantized transform coefficient. The reconstructed residue data of the spatial domain is reconstructed to data of the spatial domain regarding the block of the current image 505 by being added to the prediction data regarding each block output from the intra predictor 520 or the inter predictor 515. A deblocking unit 555 and an SAO performer 560 perform in-loop filtering on the reconstructed data of the spatial domain, and generate a filtered reconstructed image. The generated reconstructed image is stored in the reconstructed picture buffer 510. Reconstructed images stored in the reconstructed picture buffer 510 may be used as a reference image for inter prediction of another image. An entropy encoder 535 may entropy-encode the quantized transform coefficient and the entropy-encoded coefficient may be output as a bitstream 540.

In order for the image encoding apparatus 400 to encode image data, step-by-step operations of the image encoder 500 according to various embodiments may be performed block by block.

Figure 6:
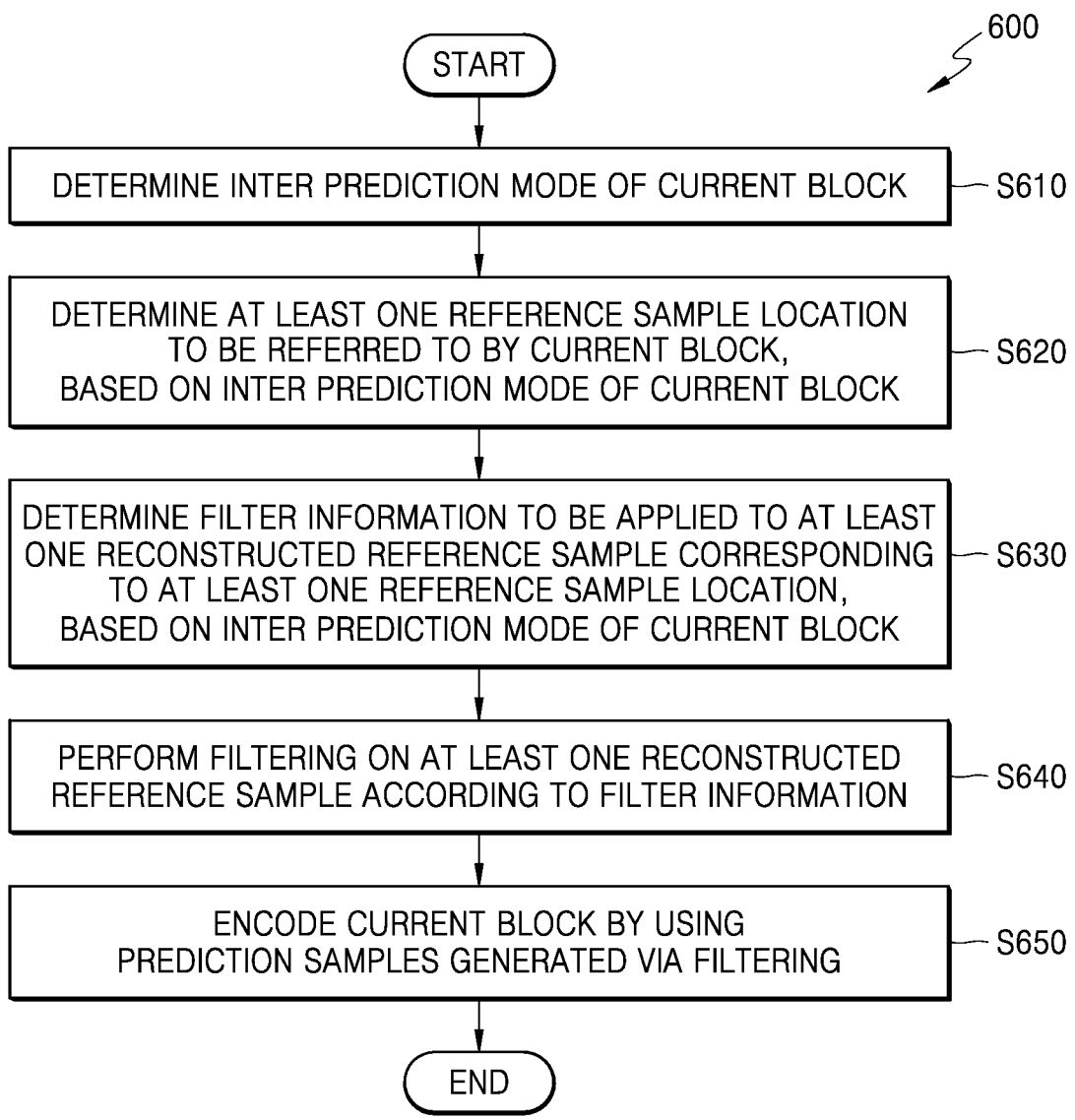
FIG. 6 is a flowchart of an image encoding method according to various embodiments.

FIG. 6 is a flowchart of an image encoding method 600 according to various embodiments.

In operation S610, the image encoding apparatus 400 may determine an inter prediction mode of a current block. According to various embodiments, the image encoding apparatus 400 may determine the inter prediction mode of the current block according to encoding efficiency of the inter prediction modes applicable to the current block. For example, the inter prediction modes applicable to the current block may be a merge mode, an AMVP mode, an inter skip mode, an OBMC mode, a DMVR mode, an affine mode, and a BIO mode.

According to various embodiments, the image encoding apparatus 400 may determine the number of reference blocks to be referred to by the current block. For example, the image encoding apparatus 400 may determine whether the current block is to be unidirectionally predicted or bidirectionally predicted.

In operation S620, the image encoding apparatus 400 may determine at least one reference sample location to be referred to by the current block, based on the inter prediction mode of the current block. According to various embodiments, the image encoding apparatus 400 may determine a reference block that is a block most similar to the current block from at least one reference picture, based on the inter prediction mode of the current block, and perform motion prediction of determining a motion vector indicating a location difference between the current block and the reference block.

Here, for further accurate motion prediction, reference samples at sub-pixel locations between reference samples at integer pixel locations of a reference picture may be generated and a motion vector of a sub-pixel unit indicating the determined reference sample may be determined.

According to various embodiments, the image encoding apparatus 400 may determine a location indicated by the motion vector in the reference picture as the reference sample location. According to various embodiments, the number of reference sample locations equal to the number of motion vectors used in the inter prediction mode of the current block may be determined.

In operation S630, the image encoding apparatus 400 may determine filter information to be applied to at least one reconstructed reference sample corresponding to the at least one reference sample location, based on the inter prediction mode of the current block. The image encoding apparatus 400 may apply an interpolation filter to reference samples at integer pixel locations and determine information about the interpolation filter to generate a reference sample at a sub-pixel location between the reference samples at the integer pixel locations.

According to various embodiments, the image encoding apparatus 400 may determine the at least one reconstructed reference sample to which a filter is to be applied, based on the reference sample location within a reconstructed reference picture. According to some embodiments, the at least one reconstructed reference sample may include samples located within a certain range based on the reference sample location. According to some embodiments, the at least one reconstructed reference sample may include samples in the reference block referred to by the current block and neighboring samples adjacent to the reference block of the current block. According to some embodiments, the at least one reconstructed reference sample may further include reference samples referred to by a neighboring block adjacent to the current block. According to some embodiments, the at least one reconstructed reference sample may further include neighboring samples adjacent to reference blocks referred to by the neighboring block of the current block.

According to some embodiments, the image encoding apparatus 400 may determine reference samples at integer pixel locations located within a certain range based on the reference sample location to be the at least one reconstructed reference sample to which the interpolation filter is to be applied. According to some embodiments, the at least one reconstructed reference sample may include reference samples at integer pixel locations required to generate reference samples at sub-pixel locations included in the reference block referred to by the current block. According to some embodiments, the at least one reconstructed reference sample may further include reference samples at integer pixel locations required to generate a neighboring reference sample at a sub-pixel location adjacent to the reference block of the current block. According to some embodiments, the at least one reconstructed reference sample may further include reference samples at integer pixel locations required to generate reference samples at sub-pixel locations referred to by the neighboring block adjacent to the current block.

According to various embodiments, the filter information may include at least one of a direction and size of the filter. According to various embodiments, the image encoding apparatus 400 may determine to use a separable 2D filter. According to an embodiment, the image encoding apparatus 400 may determine to apply each of a horizontal direction filter and a vertical direction filter.

According to various embodiments, the image encoding apparatus 400 may determine the size of the filter by determining the number of taps of the filter to a certain value. Here, the certain value may be determined according to the inter prediction mode of the current block.

According to various embodiments, the image encoding apparatus 400 may determine the filter information based on the size of the current block. According to an embodiment, the image encoding apparatus 400 may determine to use a first filter when the size of the current block is equal to or greater than a certain reference value and determine to use a second filter otherwise. According to an embodiment, a size of the first filter may be greater than a size of the second filter. According to an embodiment, the image encoding apparatus 400 may compare the size of the current block with a plurality of reference values, and determine a filter to be used among a plurality of filters based on a result of the comparison.

According to an embodiment, the image encoding apparatus 400 may determine horizontal direction filter information based on a horizontal width of the current block and determine vertical direction filter information based on a vertical height of the current block. According to an embodiment, when the current block is non-square, the image encoding apparatus 400 may determine a horizontal direction filter and a vertical direction filter to be filters of different sizes. According to an embodiment, when the current block is non-square, the image encoding apparatus 400 may determine the number of taps of a horizontal direction filter and the number of taps of a vertical direction filter to be different from each other.

According to an embodiment, the image encoding apparatus 400 may determine the horizontal direction filter information and the vertical direction filter information, based on a ratio of the horizontal width and the vertical height of the current block. For example, when the horizontal direction filter information of the current block is determined, the image encoding apparatus 400 may determine the vertical direction filter information based on the horizontal direction filter information and the ratio of the horizontal width and the vertical height of the current block. As for another example, when the vertical direction filter information of the current block is determined, the image encoding apparatus 400 may determine the horizontal direction filter information based on the vertical direction filter information and the ratio of the horizontal width and the vertical height of the current block. According to an embodiment, the image encoding apparatus 400 may determine the size of the horizontal direction filter and the size of the vertical direction filter to be in proportion to the horizontal width and the vertical height of the current block.

According to various embodiments, the image encoding apparatus 400 may determine the filter information based on whether the current block is a luma block or a chroma block. According to an embodiment, the image encoding apparatus 400 may determine to use the first filter when the current block is the luma block and determine to use the second filter when the current block is the chroma block. According to an embodiment, the size of the first filter may be twice larger than the size of the second filter.

According to various embodiments, the image encoding apparatus 400 may determine the filter information based on whether the inter prediction of the current block is unidirectional prediction or bidirectional prediction. According to an embodiment, the image encoding apparatus 400 may determine to use the first filter when the current block is unidirectionally predicted and determine to use the second filter when the current block is bidirectionally predicted. According to an embodiment, the size of the first filter may be twice larger than the size of the second filter.

According to various embodiments, the image encoding apparatus 400 may determine the filter information based on the number of reference blocks referred to by the current block. According to an embodiment, the image encoding apparatus 400 may compare the number of reference blocks referred to by the current block with a plurality of reference values and determine a filter to be used among the plurality of filters based on a result of the comparison.

According to various embodiments, the image encoding apparatus 400 may determine a largest size of the filter, based on the inter prediction mode of the current block. For example, when the inter prediction mode of the current block is an OBMC mode, the image encoding apparatus 400 may determine the size of the filter to be smaller than or equal to 2 taps. For example, when the inter prediction mode of the current block is a DMVR mode, the image encoding apparatus 400 may determine the size of the filter to be smaller than or equal to 4 taps. For example, when the inter prediction mode of the current block is an affine mode, the image encoding apparatus 400 may determine the size of the filter to be smaller than or equal to 4 taps. For example, when the inter prediction mode of the current block is a BIO mode, the image encoding apparatus 400 may determine the size of the filter to be smaller than or equal to 8 taps.

According to various embodiments, the image encoding apparatus 400 may determine the filter information such that a memory bandwidth required for inter prediction of the current block is within a certain range. The memory bandwidth may be defined to be the number of reference samples to be fetched from a memory to process a current sample. The memory bandwidth may be determined based on the size of the current block and the number of reconstructed reference samples required for inter prediction of the current block.

According to various embodiments, the image encoding apparatus 400 may determine not to perform filtering on the at least one reconstructed reference sample, based on at least one of the inter prediction mode of the current block, the size of the current block, whether the current block is the luma block or the chroma block, and whether the inter prediction of the current block is the unidirectional prediction or the bidirectional prediction.

In operation S640, the image encoding apparatus 400 may perform filtering on the at least one reconstructed reference sample, based on the filter information. According to various embodiments, the image encoding apparatus 400 may generate the reference sample at the sub-pixel location by applying the interpolation filter to the reconstructed reference samples at the integer pixel locations, based on the filter information.

According to various embodiments, the image encoding apparatus 400 may determine at least one reference block most similar to the current block by using the reference samples at integer pixel locations and reference samples at sub-pixel locations, based on the inter prediction mode of the current block. According to various embodiments, the image encoding apparatus 400 may determine a location difference between the current block and the reference block as a motion vector. According to various embodiments, the image encoding apparatus 400 may generate prediction samples corresponding to samples of the current block, from samples of the reference block.

In operation S650, the image encoding apparatus 400 may decode the current block by using the prediction samples generated via the filtering. According to various embodiments, the image encoding apparatus 400 may obtain a residual value between a sample value of the current block and a prediction sample value of the current block, and encode the residual value. According to various embodiments, the image encoding apparatus 400 may encode information related to at least one motion vector of the current block. According to various embodiments, the image encoding apparatus 400 may encode at least one reference picture index of the current block. According to various embodiments, the image encoding apparatus 400 may encode information about the inter prediction mode of the current block.

Hereinafter, splitting of a coding unit will be described in detail according to various embodiments of the disclosure.

First, one picture may be split into one or more slices. One slice may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-slice may be 32×32, and the maximum size of the luma coding block that is ternary splittable in a P-slice or a B-slice may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 7 through 20.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 7 through 20. A current block and a neighboring block of the disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the bottom-left, left, top-left, top, top-right, right, bottom-right of the current block.

Figure 7:
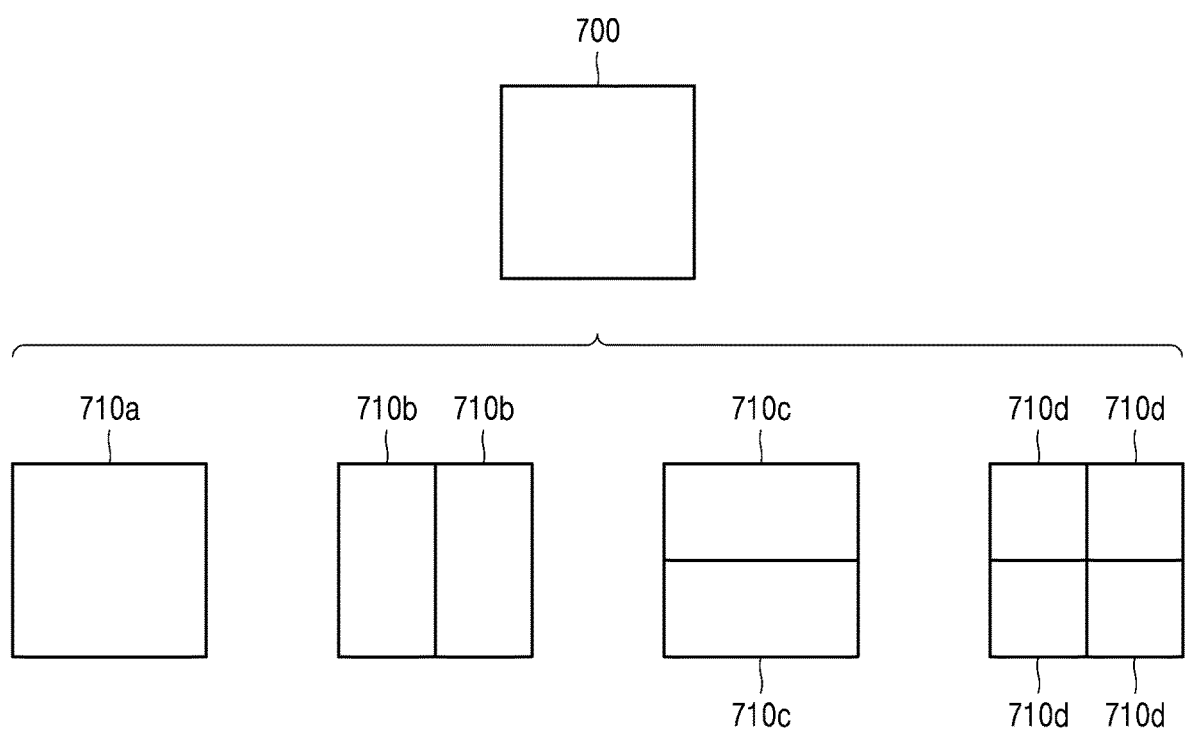
FIG. 7 illustrates a process, performed by an image decoding apparatus, of determining at least one coding unit by splitting a current coding unit, according to various embodiments.

FIG. 7 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 400 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 7, when the block shape information of a current coding unit 700 indicates a square shape, the decoder 115 may determine that a coding unit 710a having the same size as the current coding unit 700 is not split, based on the split shape mode information indicating not to perform splitting, or may determine coding units 710b, 710c, 710d, 710e, or 710f split based on the split shape mode information indicating a predetermined splitting method.

Referring to FIG. 7, according to an embodiment, the image decoding apparatus 100 may determine two coding units 710b obtained by splitting the current coding unit 700 in a vertical direction, based on the split shape mode information indicating to perform splitting in a vertical direction. The image decoding apparatus 100 may determine two coding units 710c obtained by splitting the current coding unit 700 in a horizontal direction, based on the split shape mode information indicating to perform splitting in a horizontal direction. The image decoding apparatus 100 may determine four coding units 710d obtained by splitting the current coding unit 700 in vertical and horizontal directions, based on the split shape mode information indicating to perform splitting in vertical and horizontal directions. According to an embodiment, the image decoding apparatus 100 may determine three coding units 710e obtained by splitting the current coding unit 700 in a vertical direction, based on the split shape mode information indicating to perform ternary-splitting in a vertical direction. The image decoding apparatus 100 may determine three coding units 710f obtained by splitting the current coding unit 700 in a horizontal direction, based on the split shape mode information indicating to perform ternary-splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

FIG. 8 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 8, when the block shape information of a current coding unit 800 or 850 indicates a non-square shape, the image decoding apparatus 100 may determine that a coding unit 810 or 860 having the same size as the current coding unit 800 or 850 is not split, based on the split shape mode information indicating not to perform splitting, or determine coding units 820a and 820b, 830a to 830c, 870a and 870b, or 880a to 880c split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 8, when the split shape mode information indicates to split the current coding unit 800 or 850 into two coding units, the image decoding apparatus 100 may determine two coding units 820a and 820b, or 870a and 870b included in the current coding unit 800 or 850, by splitting the current coding unit 800 or 850 based on the split shape mode information.

According to an embodiment, when the image decoding apparatus 100 splits the non-square current coding unit 800 or 850 based on the split shape mode information, the image decoding apparatus 100 may consider the location of a long side of the non-square current coding unit 800 or 850 to split a current coding unit. For example, the image decoding apparatus 100 may determine a plurality of coding units by splitting a long side of the current coding unit 800 or 850, in consideration of the shape of the current coding unit 800 or 850.

According to an embodiment, when the split shape mode information indicates to split (ternary-split) a coding unit into an odd number of blocks, the image decoding apparatus 100 may determine an odd number of coding units included in the current coding unit 800 or 850. For example, when the split shape mode information indicates to split the current coding unit 800 or 850 into three coding units, the image decoding apparatus 100 may split the current coding unit 800 or 850 into three coding units 830a, 830b, and 830c, or 880a, 880b, and 880c.

According to an embodiment, a ratio of the width and height of the current coding unit 800 or 850 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 800 or 850, based on the block shape information of the current coding unit 800 or 850. For example, when the current coding unit 800 is in the vertical direction, the image decoding apparatus 100 may determine the coding units 830a to 830c by splitting the current coding unit 800 in the horizontal direction. Also, when the current coding unit 850 is in the horizontal direction, the image decoding apparatus 100 may determine the coding units 880a to 880c by splitting the current coding unit 850 in the vertical direction.

According to an embodiment, the image decoding apparatus 100 may determine the odd number of coding units included in the current coding unit 800 or 850, and not all the determined coding units may have the same size. For example, a predetermined coding unit 830b or 880b from among the determined odd number of coding units 830a, 830b, and 830c, or 880a, 880b, and 880c may have a size different from the size of the other coding units 830a and 830c, or 880a and 880c. That is, coding units which may be determined by splitting the current coding unit 800 or 850 may have multiple sizes and, in some cases, all of the odd number of coding units 830a, 830b, and 830c, or 880a, 880b, and 880c may have different sizes.

According to an embodiment, when the split shape mode information indicates to split a coding unit into the odd number of blocks, the image decoding apparatus 100 may determine the odd number of coding units included in the current coding unit 800 or 850, and in addition, may put a predetermined restriction on at least one coding unit from among the odd number of coding units generated by splitting the current coding unit 800 or 850. Referring to FIG. 8, the image decoding apparatus 100 may set a decoding process regarding the coding unit 830b or 880b located at the center among the three coding units 830a, 830b, and 830c or 880a, 880b, and 880c generated as the current coding unit 800 or 850 is split to be different from that of the other coding units 830a and 830c, or 880a or 880c. For example, the image decoding apparatus 100 may restrict the coding unit 830b or 880b at the center location to be no longer split or to be split only a predetermined number of times, unlike the other coding units 830a and 830c, or 880a and 880c.

Figure 9:
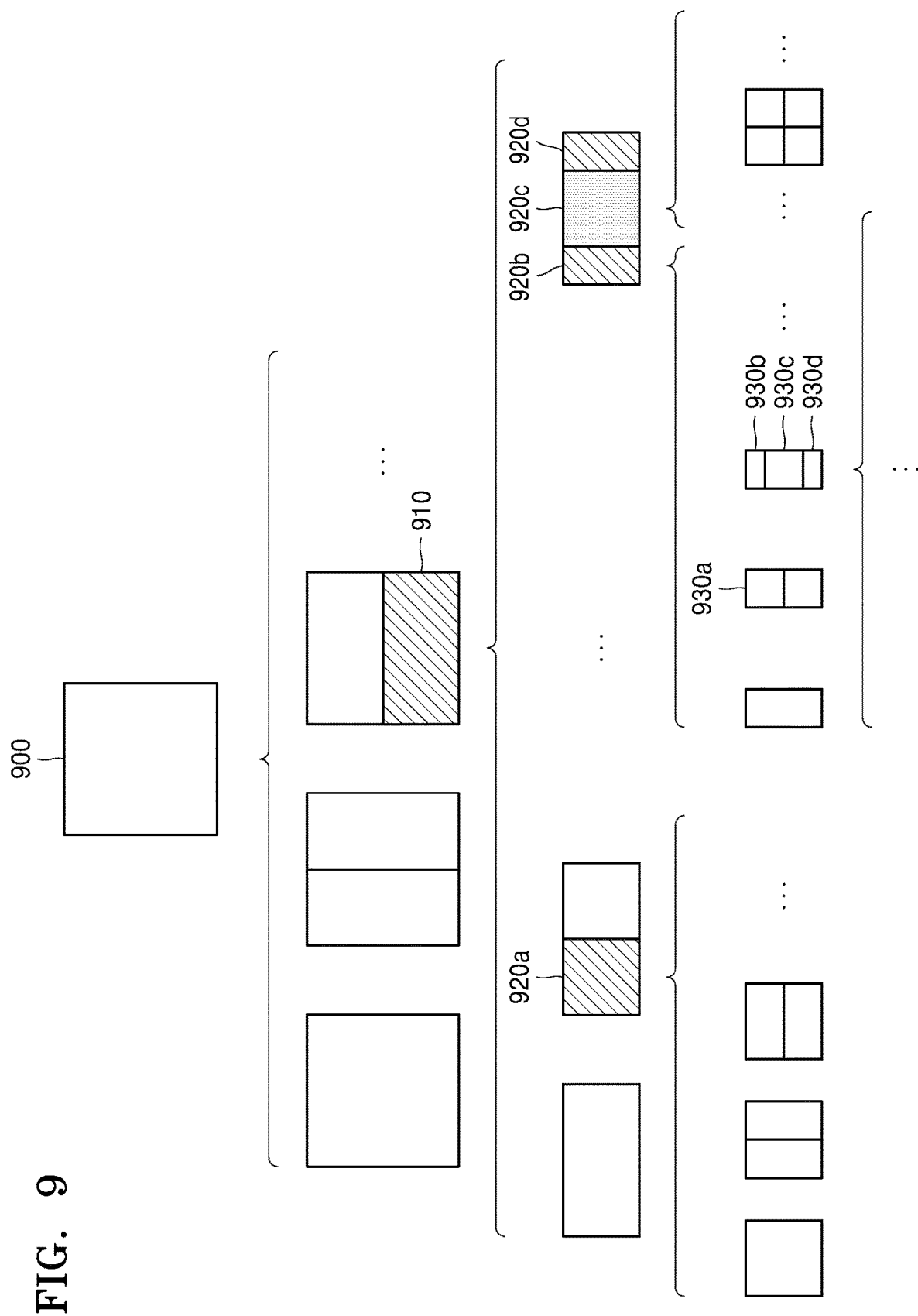
FIG. 9 illustrates a process, performed by an image decoding apparatus, of splitting a coding unit based on at least one of block shape information and split shape mode information, according to various embodiments.

FIG. 9 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 900 into coding units, based on at least one of the block shape information and the split shape mode information. According to an embodiment, when the split shape mode information indicates to split the first coding unit 900 in a horizontal direction, the image decoding apparatus 100 may determine a second coding unit 910 by splitting the first coding unit 900 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 910 into coding units, based on the split shape mode information. Referring to FIG. 9, the image decoding apparatus 100 may split the non-square second coding unit 910, which is determined by splitting the first coding unit 900, into one or more third coding units 920a, or 920b, 920c, and 920d based on the split shape mode information, or may not split the non-square second coding unit 910. The image decoding apparatus 100 may obtain the split shape mode information, and may obtain a plurality of various-shaped second coding units (e.g., 910) by splitting the first coding unit 900, based on the obtained split shape mode information, and the second coding unit 910 may be split by using a splitting method of the first coding unit 900 based on the split shape mode information. According to an embodiment, when the first coding unit 900 is split into the second coding units 910 based on the split shape mode information of the first coding unit 900, the second coding unit 910 may also be split into the third coding units 920a, or 920b, 920c, and 920d based on the split shape mode information of the second coding unit 910. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 9, a predetermined coding unit from among the odd number of third coding units 920b, 920c, and 920d determined by splitting the non-square second coding unit 910 (e.g., a coding unit or a square coding unit, which is located at a center location) may be recursively split. According to an embodiment, the square third coding unit 920c from among the odd number of third coding units 920b, 920c, and 920d may be split in a horizontal direction into a plurality of fourth coding units. A non-square fourth coding unit 930b or 930d from among a plurality of fourth coding units 930a, 930b, 930c, and 930d may be split into a plurality of coding units again. For example, the non-square fourth coding unit 930b or 930d may be split into the odd number of coding units again. A method that may be used to recursively split a coding unit will be described below in relation to various embodiments.

According to an embodiment, the image decoding apparatus 100 may split each of the third coding units 920a, or 920b, 920c, and 920d into coding units, based on the split shape mode information. Also, the image decoding apparatus 100 may determine not to split the second coding unit 910 based on the split shape mode information. According to an embodiment, the image decoding apparatus 100 may split the non-square second coding unit 910 into the odd number of third coding units 920*b*, 920*c*, and 920*d*. The image decoding apparatus 100 may put a predetermined restriction on a predetermined third coding unit from among the odd number of third coding units 920*b*, 920*c*, and 920*d*. For example, the image decoding apparatus 100 may restrict the third coding unit 920*c* at a center location from among the odd number of third coding units 920*b*, 920*c*, and 920*d* to be no longer split or to be split a settable number of times.

Referring to FIG. 9, the image decoding apparatus 100 may restrict the third coding unit 920*c*, which is at the center location from among the odd number of third coding units 920*b*, 920*c*, and 920*d* included in the non-square second coding unit 910, to be no longer split, to be split by using a predetermined splitting method (e.g., split into only four coding units or split by using a splitting method of the second coding unit 910), or to be split only a predetermined number of times (e.g., split only n times (where n>0)). However, the restrictions on the third coding unit 920*c* at the center location are not limited to the above-described examples, and may include various restrictions for decoding the third coding unit 920*c* at the center location differently from the other third coding units 920*b* and 920*d*.

According to an embodiment, the image decoding apparatus 100 may obtain the split shape mode information, which is used to split a current coding unit, from a predetermined location in the current coding unit.

Figure 10:
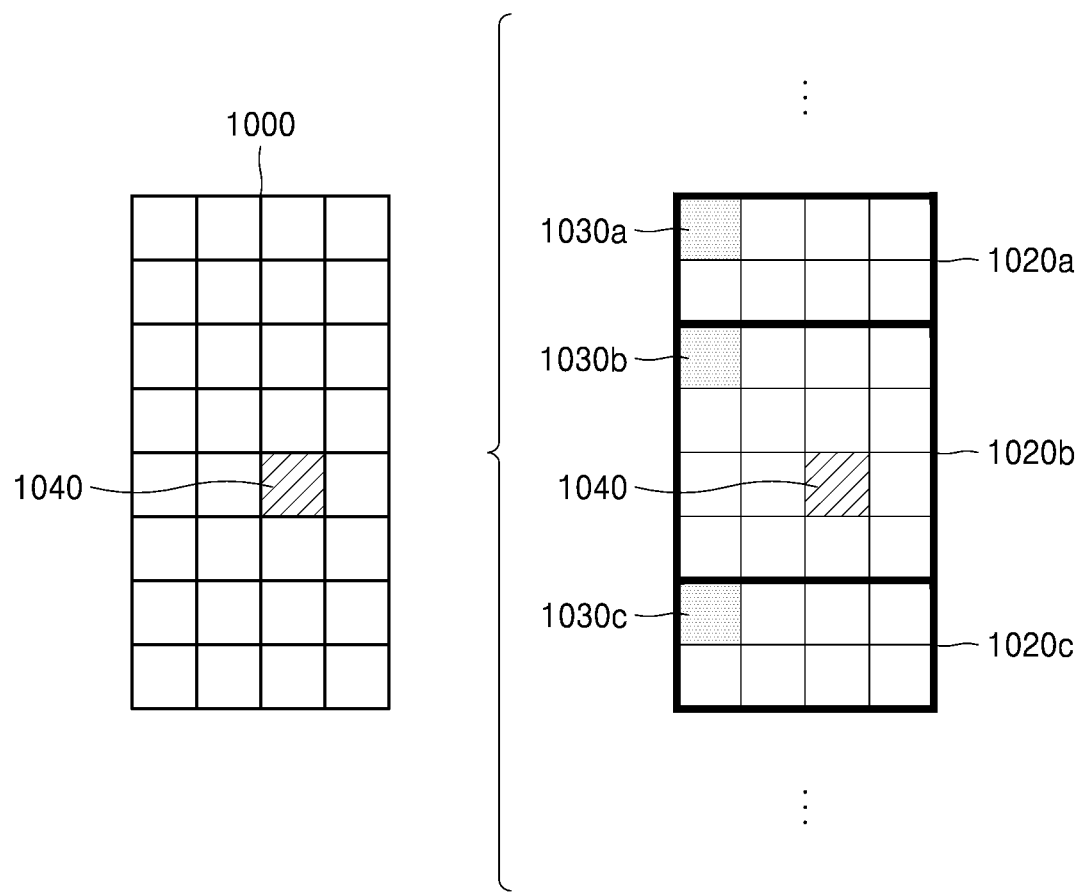
FIG. 10 illustrates a method, performed by an image decoding apparatus, of determining a predetermined coding unit from among an odd number of coding units, according to various embodiments.

FIG. 10 illustrates a method, performed by the image decoding apparatus 100, of determining a predetermined coding unit from among an odd number of coding units, according to an embodiment.

Referring to FIG. 10, split shape mode information of a current coding unit 1000 or 1050 may be obtained from a sample of a predetermined location (e.g., a sample 1040 or 1090 of a center location) from among a plurality of samples included in the current coding unit 1000 or 1050. However, the predetermined location in the current coding unit 1000, from which at least one piece of the split shape mode information may be obtained, is not limited to the center location in FIG. 10, and may include various locations included in the current coding unit 1000 (e.g., top, bottom, left, right, top-left, bottom-left, top-right, and bottom-right locations). The image decoding apparatus 100 may obtain the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 10, the image decoding apparatus 100 may determine the odd number of coding units 1020*a*, 1020*b*, and 1020*c* or the odd number of coding units 1060*a*, 1060*b*, and 1060*c* by splitting the current coding unit 1000 or the current coding unit 1050. The image decoding apparatus 100 may determine the middle coding unit 1020*b* or the middle coding unit 1060*b* by using information about the locations of the odd number of coding units 1020*a*, 1020*b*, and 1020*c* or the odd number of coding units 1060*a*, 1060*b*, and 1060*c*. For example, the image decoding apparatus 100 may determine the coding unit 1020*b* of the center location by determining the locations of the coding units 1020*a*, 1020*b*, and 1020*c* based on information indicating locations of predetermined samples included in the coding units 1020*a*, 1020*b*, and 1020*c*. In detail, the image decoding apparatus 100 may determine the coding unit 1020*b* at the center location by determining the locations of the coding units 1020*a*, 1020*b*, and 1020*c* based on information indicating locations of top-left samples 1030*a*, 1030*b*, and 1030*c* of the coding units 1020*a*, 1020*b*, and 1020*c*.

According to an embodiment, the information indicating the locations of the top-left samples 1030*a*, 1030*b*, and 1030*c*, which are included in the coding units 1020*a*, 1020*b*, and 1020*c*, respectively, may include information about locations or coordinates of the coding units 1020*a*, 1020*b*, and 1020*c* in a picture. According to an embodiment, the information indicating the locations of the top-left samples 1030*a*, 1030*b*, and 1030*c*, which are included in the coding units 1020*a*, 1020*b*, and 1020*c*, respectively, may include information indicating widths or heights of the coding units 1020*a*, 1020*b*, and 1020*c* included in the current coding unit 1000, and the widths or heights may correspond to information indicating differences between the coordinates of the coding units 1020*a*, 1020*b*, and 1020*c* in the picture. That is, the image decoding apparatus 100 may determine the coding unit 1020*b* at the center location by directly using the information about the locations or coordinates of the coding units 1020*a*, 1020*b*, and 1020*c* in the picture, or by using the information about the widths or heights of the coding units, which correspond to the difference values between the coordinates.

According to an embodiment, information indicating the location of the top-left sample 1030*a* of the upper coding unit 1020*a* may include coordinates (xa, ya), information indicating the location of the top-left sample 1030*b* of the middle coding unit 1020*b* may include coordinates (xb, yb), and information indicating the location of the top-left sample 1030*c* of the lower coding unit 1020*c* may include coordinates (xc, yc). The image decoding apparatus 100 may determine the middle coding unit 1020*b* by using the coordinates of the top-left samples 1030*a*, 1030*b*, and 1030*c* which are included in the coding units 1020*a*, 1020*b*, and 1020*c*, respectively. For example, when the coordinates of the top-left samples 1030*a*, 1030*b*, and 1030*c* are sorted in an ascending or descending order, the coding unit 1020*b* including the coordinates (xb, yb) of the sample 1030*b* at a center location may be determined as a coding unit at a center location from among the coding units 1020*a*, 1020*b*, and 1020*c* determined by splitting the current coding unit 1000. However, the coordinates indicating the locations of the top-left samples 1030*a*, 1030*b*, and 1030*c* may include coordinates indicating absolute locations in the picture, or may use coordinates (dxb, dyb) indicating a relative location of the top-left sample 1030*b* of the middle coding unit 1020*b* and coordinates (dxc, dyc) indicating a relative location of the top-left sample 1030*c* of the lower coding unit 1020*c* with reference to the location of the top-left sample 1030*a* of the upper coding unit 1020*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 1000 into a plurality of coding units 1020a, 1020b, and 1020c, and may select one of the coding units 1020a, 1020b, and 1020c based on a predetermined criterion. For example, the image decoding apparatus 100 may select the coding unit 1020b, which has a size different from that of the others, from among the coding units 1020a, 1020b, and 1020c.

According to an embodiment, the image decoding apparatus 100 may determine the width or height of each of the coding units 1020a, 1020b, and 1020c by using the coordinates (xa, ya) that is the information indicating the location of the top-left sample 1030a of the upper coding unit 1020a, the coordinates (xb, yb) that is the information indicating the location of the top-left sample 1030b of the middle coding unit 1020b, and the coordinates (xc, yc) that is the information indicating the location of the top-left sample 1030c of the lower coding unit 1020c. The image decoding apparatus 100 may determine the respective sizes of the coding units 1020a, 1020b, and 1020c by using the coordinates (xa, ya), (xb, yb), and (xc, yc) indicating the locations of the coding units 1020a, 1020b, and 1020c. According to an embodiment, the image decoding apparatus 100 may determine the width of the upper coding unit 1020a to be the width of the current coding unit 1000. The image decoding apparatus 100 may determine the height of the upper coding unit 1020a to be yb-ya. According to an embodiment, the image decoding apparatus 100 may determine the width of the middle coding unit 1020b to be the width of the current coding unit 1000. The image decoding apparatus 100 may determine the height of the middle coding unit 1020b to be yc-yb. According to an embodiment, the image decoding apparatus 100 may determine the width or height of the lower coding unit 1020c by using the width or height of the current coding unit 1000 or the widths or heights of the upper and middle coding units 1020a and 1020b. The image decoding apparatus 100 may determine a coding unit, which has a size different from that of the others, based on the determined widths and heights of the coding units 1020a to 1020c. Referring to FIG. 10, the image decoding apparatus 100 may determine the middle coding unit 1020b, which has a size different from the size of the upper and lower coding units 1020a and 1020c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 1060a, 1060b, and 1060c by using the coordinates (xd, yd) that is information indicating the location of a top-left sample 1070a of the left coding unit 1060a, the coordinates (xe, ye) that is information indicating the location of a top-left sample 1070b of the middle coding unit 1060b, and the coordinates (xf, yf) that is information indicating a location of the top-left sample 1070c of the right coding unit 1060c. The image decoding apparatus 100 may determine the respective sizes of the coding units 1060a, 1060b, and 1060c by using the coordinates (xd, yd), (xe, ye), and (xf, yf) indicating the locations of the coding units 1060a, 1060b, and 1060c.

According to an embodiment, the image decoding apparatus 100 may determine the width of the left coding unit 1060a to be xe-xd. The image decoding apparatus 100 may determine the height of the left coding unit 1060a to be the height of the current coding unit 1050. According to an embodiment, the image decoding apparatus 100 may determine the width of the middle coding unit 1060b to be xf-xe. The image decoding apparatus 100 may determine the height of the middle coding unit 1060b to be the height of the current coding unit 1050. According to an embodiment, the image decoding apparatus 100 may determine the width or height of the right coding unit 1060c by using the width or height of the current coding unit 1050 or the widths or heights of the left and middle coding units 1060a and 1060b. The image decoding apparatus 100 may determine a coding unit, which has a size different from that of the others, based on the determined widths and heights of the coding units 1060a to 1060c. Referring to FIG. 10, the image decoding apparatus 100 may determine the middle coding unit 1060b, which has a size different from the sizes of the left and right coding units 1060a and 1060c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top-left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary-splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 10, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 10, the image decoding apparatus 100 may split the current coding unit 1000 into the plurality of coding units 1020a, 1020b, and 1020c based on the split shape mode information, and may determine the coding unit 1020b at a center location from among the plurality of the coding units 1020a, 1020b, and 1020c. Furthermore, the image decoding apparatus 100 may determine the coding unit 1020b at the center location, in consideration of a location from which the split shape mode information is obtained. That is, the split shape mode information of the current coding unit 1000 may be obtained from the sample 1040 at a center location of the current coding unit 1000 and, when the current coding unit 1000 is split into the plurality of coding units 1020a, 1020b, and 1020c based on the split shape mode information, the coding unit 1020b including the sample 1040 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 10, the image decoding apparatus 100 may use the split shape mode information, which is obtained from a sample at a predetermined location in the current coding unit 1000 (e.g., a sample at a center location of the current coding unit 1000) to determine a coding unit at a predetermined location from among the plurality of the coding units 1020a, 1020b, and 1020c determined by splitting the current coding unit 1000 (e.g., a coding unit at a center location from among a plurality of split coding units). That is, the image decoding apparatus 100 may determine the sample at the predetermined location by considering a block shape of the current coding unit 1000, determine the coding unit 1020b including a sample, from which predetermined information (e.g., the split shape mode information) may be obtained, from among the plurality of coding units 1020a, 1020b, and 1020c determined by splitting the current coding unit 1000, and may put a predetermined restriction on the coding unit 1020b. Referring to FIG. 10, according to an embodiment, the image decoding apparatus 100 may determine the sample 1040 at the center location of the current coding unit 1000 as the sample from which the predetermined information may be obtained, and may put a predetermined restriction on the coding unit 1020b including the sample 1040, in a decoding operation. However, the location of the sample from which the predetermined information may be obtained is not limited to the above-described location, and may include arbitrary locations of samples included in the coding unit 1020b to be determined for a restriction.

According to an embodiment, the location of the sample from which the predetermined information may be obtained may be determined based on the shape of the current coding unit 1000. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 9, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 11:
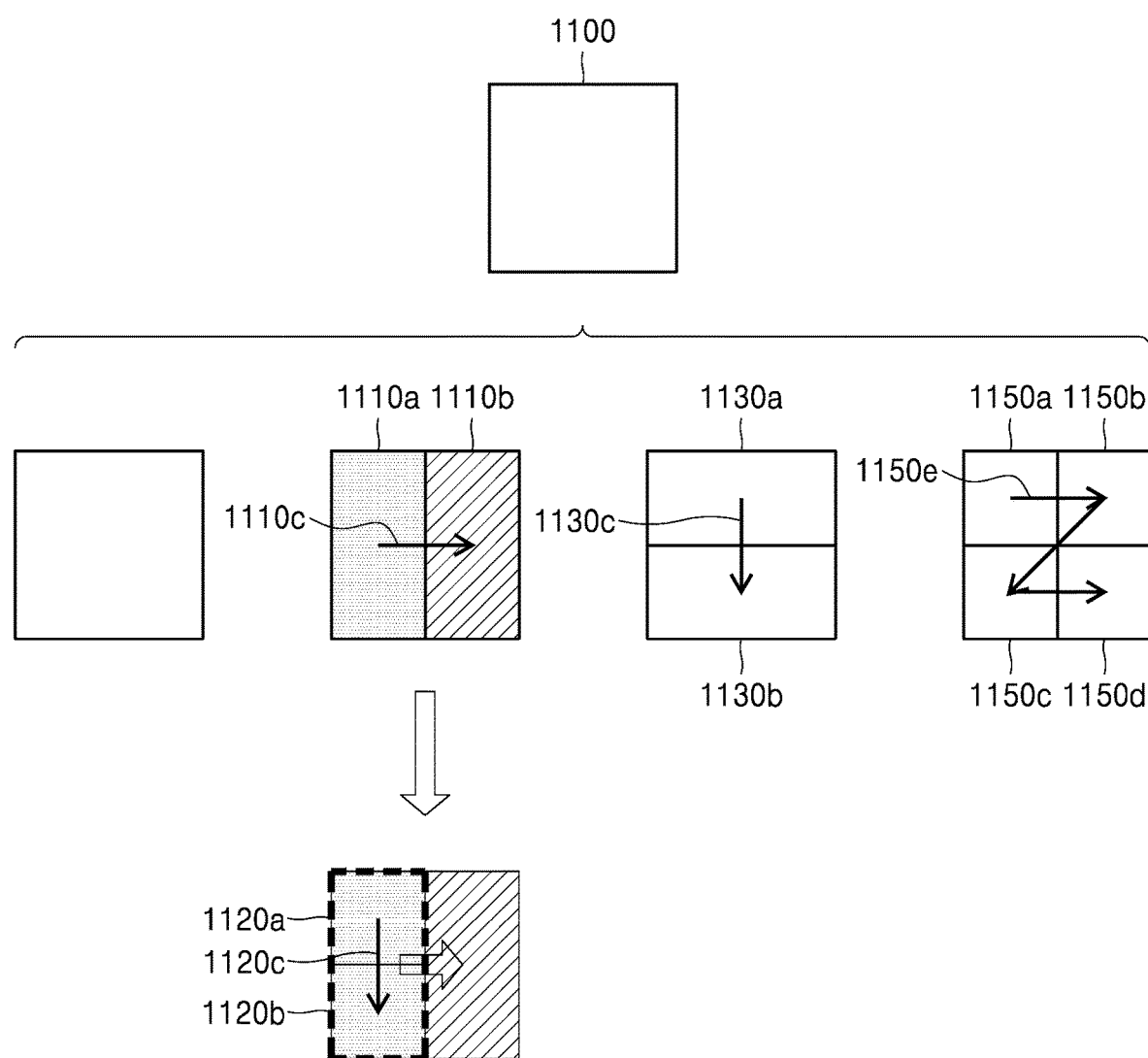
FIG. 11 illustrates an order of processing a plurality of coding units when an image decoding apparatus determines the plurality of coding units by splitting a current coding unit, according to various embodiments.

FIG. 11 illustrates an order of processing a plurality of coding units when the image decoding apparatus 100 determines the plurality of coding units by splitting a current coding unit, according to an embodiment.

According to an embodiment, the image decoding apparatus 100 may determine second coding units 1110a and 1110b by splitting a first coding unit 1100 in a vertical direction, determine second coding units 1130a and 1130b by splitting the first coding unit 1100 in a horizontal direction, or determine second coding units 1150a to 1150d by splitting the first coding unit 1100 in vertical and horizontal directions, based on split shape mode information.

Referring to FIG. 11, the image decoding apparatus 100 may determine to process the second coding units 1110a and 1110b, which are determined by splitting the first coding unit 1100 in a vertical direction, in a horizontal direction order 1110c. The image decoding apparatus 100 may determine to process the second coding units 1130a and 1130b, which are determined by splitting the first coding unit 1100 in a horizontal direction, in a vertical direction order 1130c. The image decoding apparatus 100 may determine to process the second coding units 1150a to 1150d, which are determined by splitting the first coding unit 1100 in vertical and horizontal directions, according to a predetermined order (e.g., a raster scan order or Z-scan order 1150e) by which coding units in a row are processed and then coding units in a next row are processed.

According to an embodiment, the image decoding apparatus 100 may recursively split coding units. Referring to FIG. 11, the image decoding apparatus 100 may determine the plurality of coding units 1110a and 1110b, 1130a and 1130b, or 1150a to 1150d by splitting the first coding unit 1100, and recursively split each of the determined plurality of coding units 1110b, 1130a and 1130b, or 1150a to 1150d. A splitting method of the plurality of coding units 1110b, 1130a and 1130b, or 1150a to 1150d may correspond to a splitting method of the first coding unit 1100. As such, each of the plurality of coding units 1110b, 1130a and 1130b, or 1150a to 1150d may be independently split into a plurality of coding units. Referring to FIG. 11, the image decoding apparatus 100 may determine the second coding units 1110a and 1110b by splitting the first coding unit 1100 in a vertical direction, and may determine to independently split or not to split each of the second coding units 1110a and 1110b.

According to an embodiment, the image decoding apparatus 100 may determine third coding units 1120a and 1120b by splitting the left second coding unit 1110a in a horizontal direction, and may not split the right second coding unit 1110b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 1120a and 1120b determined by splitting the left second coding unit 1110a, independently of the right second coding unit 1110b. Because the third coding units 1120a and 1120b are determined by splitting the left second coding unit 1110a in a horizontal direction, the third coding units 1120a and 1120b may be processed in a vertical direction order 1120c. Because the left and right second coding units 1110a and 1110b are processed in the horizontal direction order 1110c, the right second coding unit 1110b may be processed after the third coding units 1120a and 1120b included in the left second coding unit 1110a are processed in the vertical direction order 1120c. An operation of determining a processing order of coding units based on a coding unit before being split is not limited to the above-described example, and various methods may be used to independently process coding units, which are split and determined to various shapes, in a predetermined order.

Figure 12:
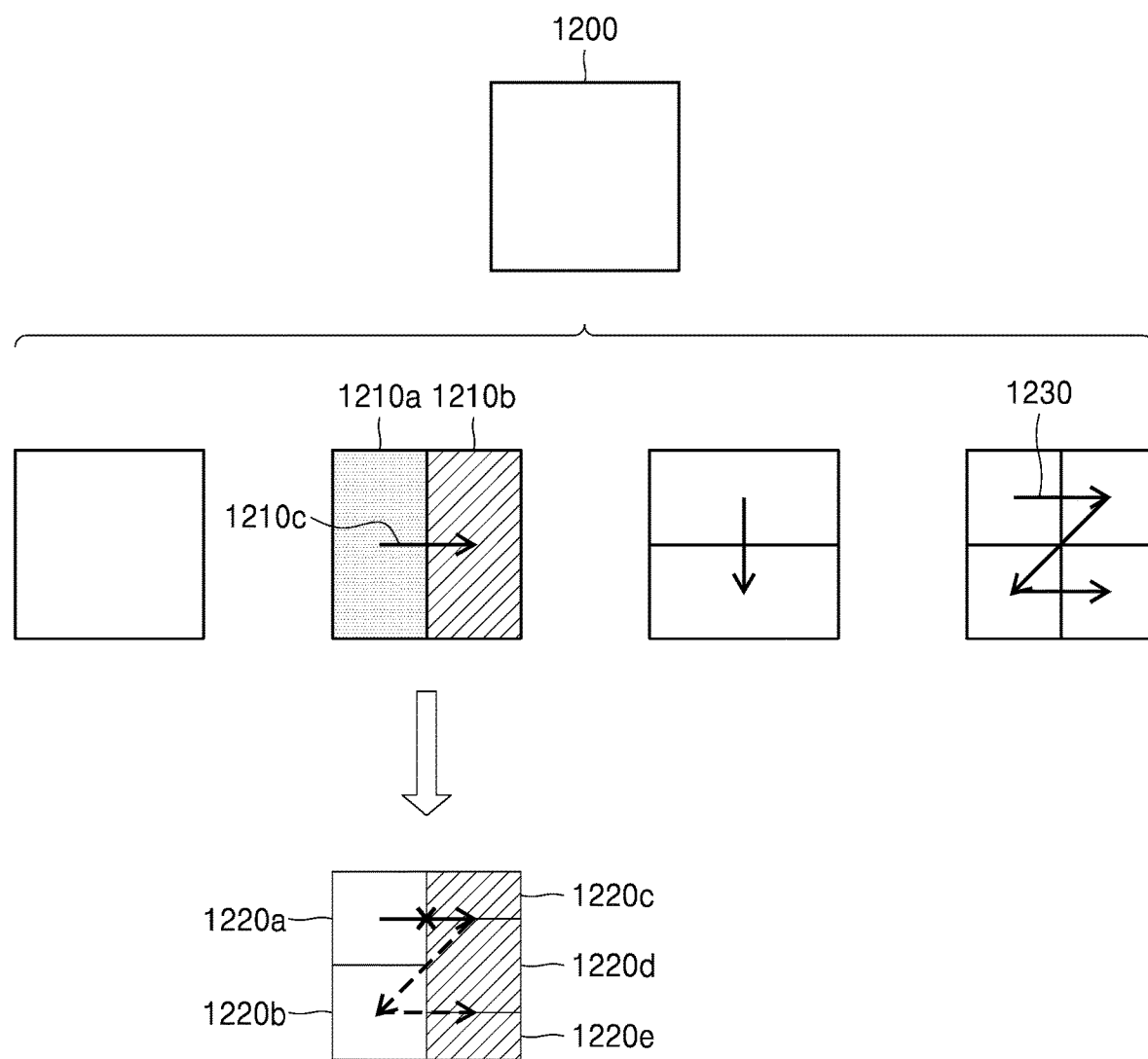
FIG. 12 illustrates a process, performed by an image decoding apparatus, of determining that a current coding unit is to be split into an odd number of coding units, when the coding units are not processable in a predetermined order, according to various embodiments.

FIG. 12 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained split shape mode information. Referring to FIG. 12, a square first coding unit 1200 may be split into non-square second coding units 1210a and 1210b, and the second coding units 1210a and 1210b may be independently split into third coding units 1220a and 1220b, and 1220c to 1220e. According to an embodiment, the image decoding apparatus 100 may determine the plurality of third coding units 1220a and 1220b by splitting the left second coding unit 1210a in a horizontal direction, and may split the right second coding unit 1210b into the odd number of third coding units 1220c to 1220e.

According to an embodiment, the image decoding apparatus 100 may determine whether any coding unit is split into an odd number of coding units, by determining whether the third coding units 1220a and 1220b, and 1220c to 1220e are processable in a predetermined order. Referring to FIG. 12, the image decoding apparatus 100 may determine the third coding units 1220a and 1220b, and 1220c to 1220e by recursively splitting the first coding unit 1200. The image decoding apparatus 100 may determine whether any of the first coding unit 1200, the second coding units 1210a and 1210b, and the third coding units 1220a and 1220b, and 1220c to 1220e are split into an odd number of coding units, based on at least one of the block shape information and the split shape mode information. For example, the second coding unit 1210b located in the right from among the second coding units 1210a and 1210b may be split into an odd number of third coding units 1220c, 1220d, and 1220e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 1220a and 1220b, and 1220c to 1220e included in the first coding unit 1200 satisfy the condition for processing in the predetermined order, and the condition relates to whether at least one of a width and height of the second coding units 1210a and 1210b is to be split in half along a boundary of the third coding units 1220a and 1220b, and 1220c to 1220e. For example, the third coding units 1220a and 1220b determined when the height of the left second coding unit 1210a of the non-square shape is split in half may satisfy the condition. It may be determined that the third coding units 1220c to 1220e do not satisfy the condition because the boundaries of the third coding units 1220c to 1220e determined when the right second coding unit 1210b is split into three coding units are unable to split the width or height of the right second coding unit 1210b in half. When the condition is not satisfied as described above, the image decoding apparatus 100 may determine disconnection of a scan order, and may determine that the right second coding unit 1210b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 13:
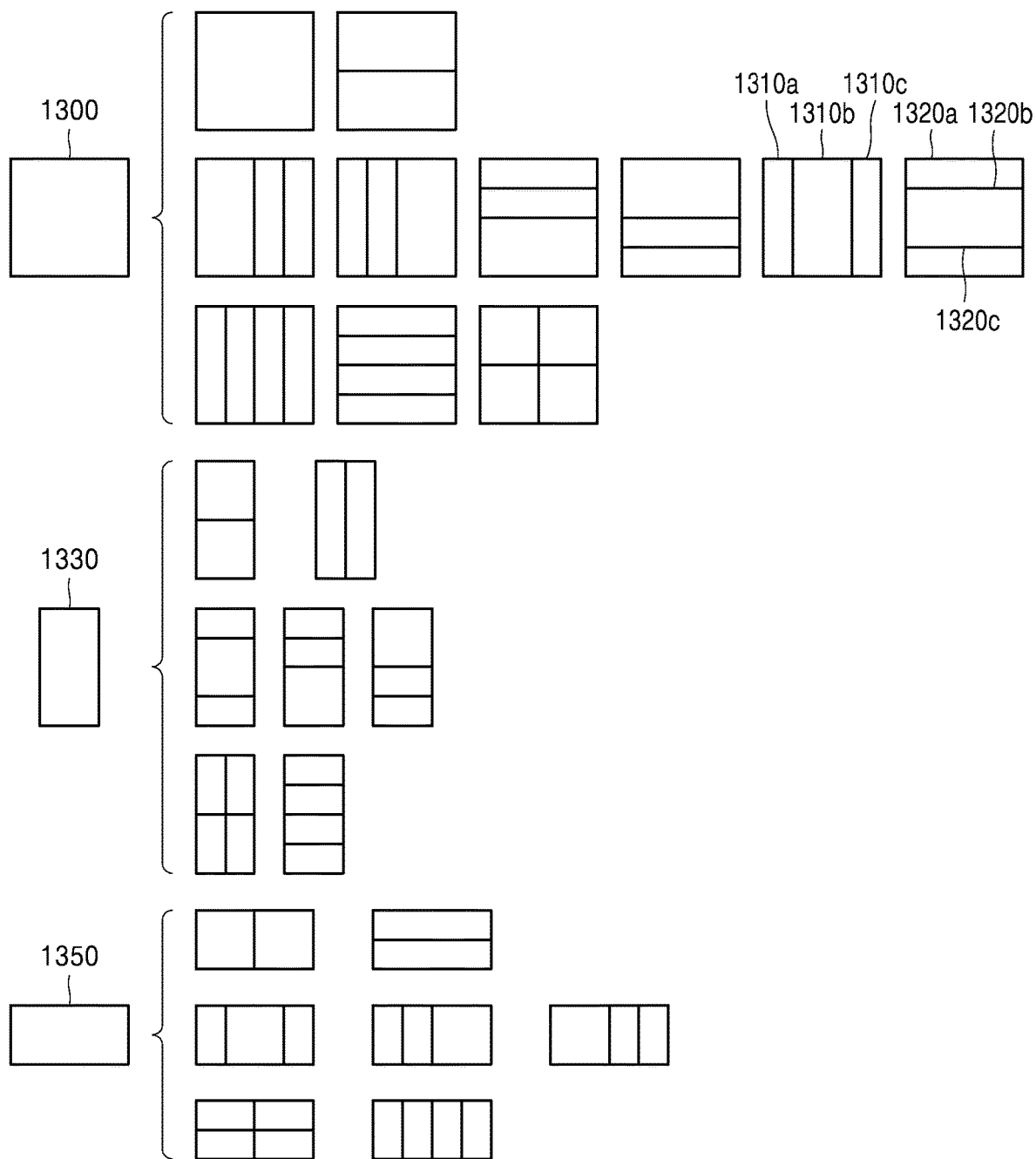
FIG. 13 illustrates a process, performed by an image decoding apparatus, of determining at least one coding unit by splitting a first coding unit, according to various embodiments.

FIG. 13 illustrates a process, performed by the image decoding apparatus 100, of determining at least one coding unit by splitting a first coding unit 1300, according to an embodiment.

According to an embodiment, the image decoding apparatus 100 may split the first coding unit 1300, based on split shape mode information, which is obtained through the receiver (not shown). The square first coding unit 1300 may be split into four square coding units, or may be split into a plurality of non-square coding units. For example, referring to FIG. 13, when the split shape mode information indicates to split the first coding unit 1300 into non-square coding units, the image decoding apparatus 100 may split the first coding unit 1300 into a plurality of non-square coding units. In detail, when the split shape mode information indicates to determine an odd number of coding units by splitting the first coding unit 1300 in a horizontal direction or a vertical direction, the image decoding apparatus 100 may split the square first coding unit 1300 into an odd number of coding units, e.g., second coding units 1310a, 1310b, and 1310c determined by splitting the square first coding unit 1300 in a vertical direction or second coding units 1320a, 1320b, and 1320c determined by splitting the square first coding unit 1300 in a horizontal direction.

According to an embodiment, the image decoding apparatus 100 may determine whether the second coding units 1310a, 1310b, 1310c, 1320a, 1320b, and 1320c included in the first coding unit 1300 satisfy a condition for processing in a predetermined order, and the condition relates to whether at least one of a width and height of the first coding unit 1300 is to be split in half along a boundary of the second coding units 1310a, 1310b, 1310c, 1320a, 1320b, and 1320c. Referring to FIG. 13, because boundaries of the second coding units 1310a, 1310b, and 1310c determined by splitting the square first coding unit 1300 in a vertical direction do not split the width of the first coding unit 1300 in half, it may be determined that the first coding unit 1300 does not satisfy the condition for processing in the predetermined order. In addition, because boundaries of the second coding units 1320a, 1320b, and 1320c determined by splitting the square first coding unit 1300 in a horizontal direction do not split the width of the first coding unit 1300 in half, it may be determined that the first coding unit 1300 does not satisfy the condition for processing in the predetermined order. When the condition is not satisfied as described above, the image decoding apparatus 100 may decide disconnection of a scan order, and may determine that the first coding unit 1300 is to be split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 13, the image decoding apparatus 100 may split the square first coding unit 1300 or a non-square first coding unit 1330 or 1350 into various-shaped coding units.

Figure 14:
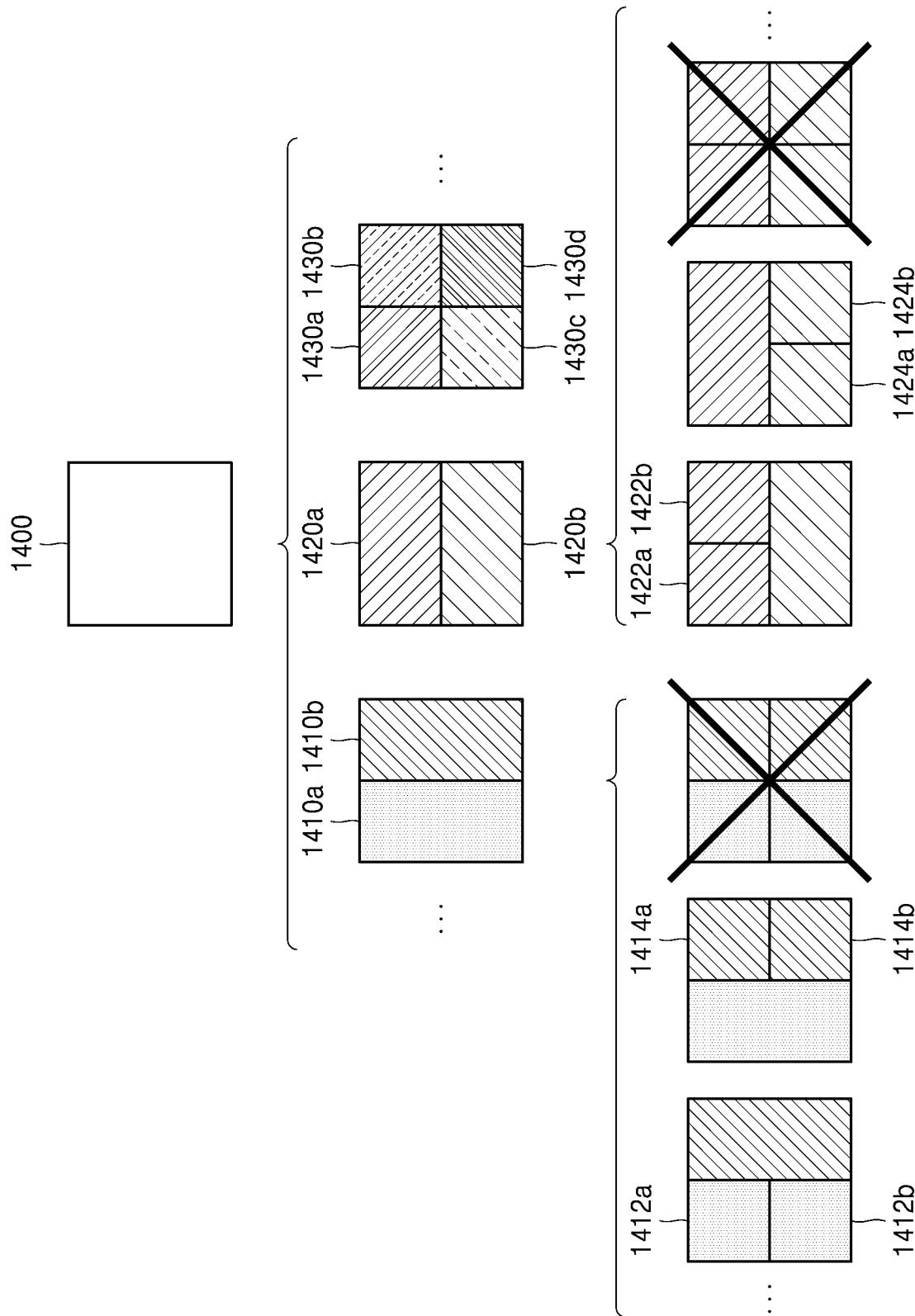
FIG. 14 illustrates that a shape into which a second coding unit is splittable is restricted when the second coding unit having a non-square shape, which is determined when an image decoding apparatus splits a first coding unit, satisfies a predetermined condition, according to various embodiments.

FIG. 14 illustrates that a shape into which a second coding unit is splittable is restricted when the second coding unit having a non-square shape, which is determined as the image decoding apparatus 100 splits a first coding unit 1400, satisfies a predetermined condition, according to an embodiment.

According to an embodiment, the image decoding apparatus 100 may determine to split the square first coding unit 1400 into non-square second coding units 1410a and 1410b or 1420a and 1420b, based on split shape mode information, which is obtained by the receiver (not shown). The second coding units 1410a and 1410b or 1420a and 1420b may be independently split. As such, the image decoding apparatus 100 may determine to split or not to split each of the second coding units 1410a and 1410b or 1420a and 1420b into a plurality of coding units, based on the split shape mode information of each of the second coding units 1410a and 1410b or 1420a and 1420b. According to an embodiment, the image decoding apparatus 100 may determine third coding units 1412a and 1412b by splitting the non-square left second coding unit 1410a, which is determined by splitting the first coding unit 1400 in a vertical direction, in a horizontal direction. However, when the left second coding unit 1410a is split in a horizontal direction, the image decoding apparatus 100 may restrict the right second coding unit 1410b to not be split in a horizontal direction in which the left second coding unit 1410a is split. When third coding units 1414a and 1414b are determined by splitting the right second coding unit 1410b in a same direction, because the left and right second coding units 1410a and 1410b are independently split in a horizontal direction, the third coding units 1412a and 1412b or 1414a and 1414b may be determined. However, this case serves equally as a case in which the image decoding apparatus 100 splits the first coding unit 1400 into four square second coding units 1430a, 1430b, 1430c, and 1430d, based on the split shape mode information, and may be inefficient in terms of image decoding.

According to an embodiment, the image decoding apparatus 100 may determine third coding units 1422a and 1422b or 1424a and 1424b by splitting the non-square second coding unit 1420a or 1420b, which is determined by splitting the first coding unit 1400 in a horizontal direction, in a vertical direction. However, when a second coding unit (e.g., the upper second coding unit 1420a) is split in a vertical direction, for the above-described reason, the image decoding apparatus 100 may restrict the other second coding unit (e.g., the lower second coding unit 1420b) to not be split in a vertical direction in which the upper second coding unit 1420a is split.

Figure 15:
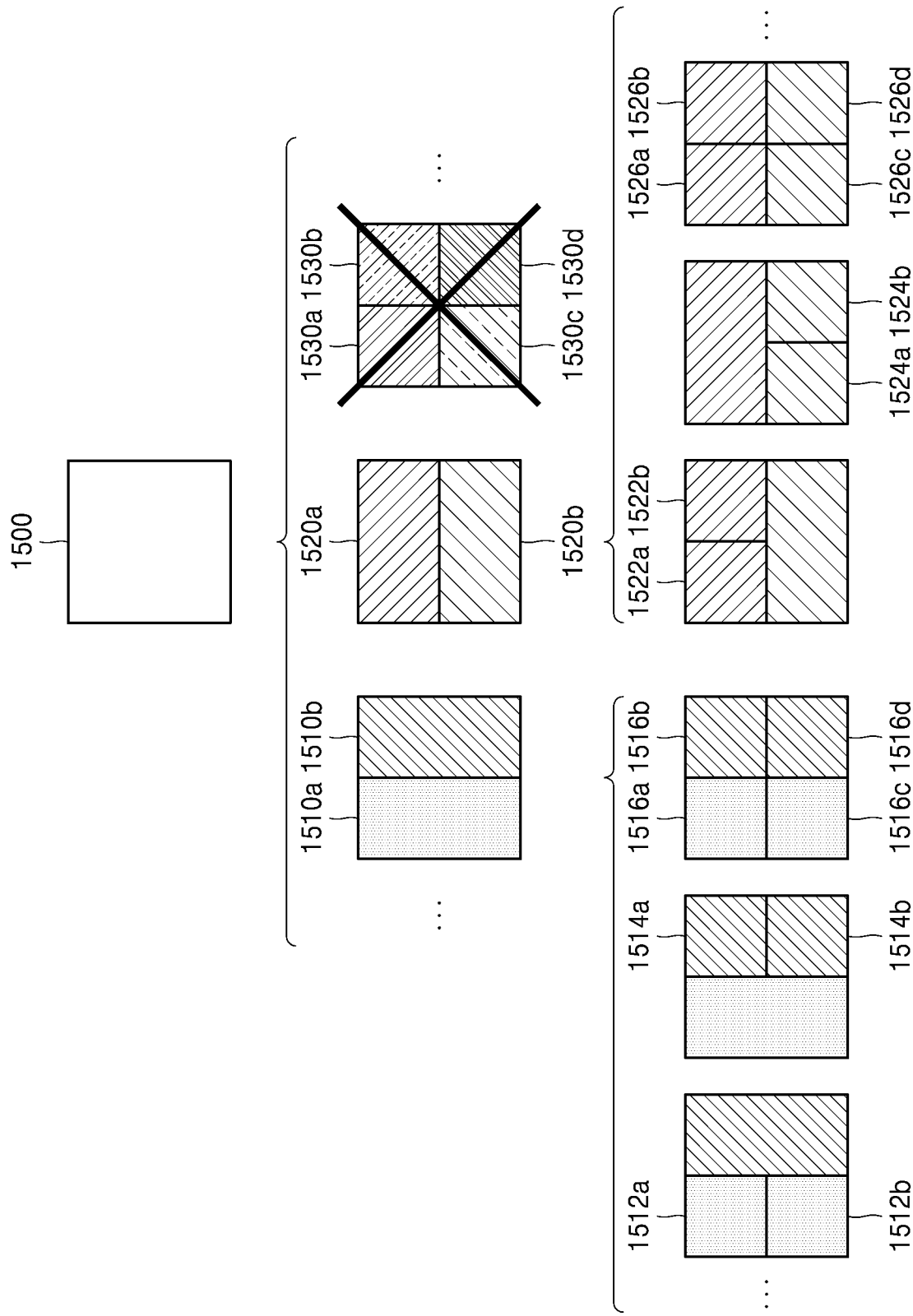
FIG. 15 illustrates a process, performed by an image decoding apparatus, of splitting a square coding unit when split shape mode information is unable to indicate that the square coding unit is split into four square coding units, according to various embodiments.

FIG. 15 illustrates a process, performed by the image decoding apparatus 100, of splitting a square coding unit when split shape mode information is unable to indicate that the square coding unit is split into four square coding units, according to an embodiment.

According to an embodiment, the image decoding apparatus 100 may determine second coding units 1510a and 1510b or 1520a and 1520b, etc. by splitting a first coding unit 1500, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1500 into four square second coding units 1530a, 1530b, 1530c, and 1530d. The image decoding apparatus 100 may determine the non-square second coding units 1510a and 1510b or 1520a and 1520b, etc., based on the split shape mode information.

According to an embodiment, the image decoding apparatus 100 may independently split the non-square second coding units 1510a and 1510b or 1520a and 1520b, etc. Each of the second coding units 1510a and 1510b or 1520a and 1520b, etc. may be recursively split in a predetermined order, and this splitting method may correspond to a method of splitting the first coding unit 1500, based on the split shape mode information.

For example, the image decoding apparatus 100 may determine square third coding units 1512a and 1512b by splitting the left second coding unit 1510a in a horizontal direction, and may determine square third coding units 1514*a* and 1514*b* by splitting the right second coding unit 1510*b* in a horizontal direction. Furthermore, the image decoding apparatus 100 may determine square third coding units 1516*a*, 1516*b*, 1516*c*, and 1516*d* by splitting both of the left and right second coding units 1510*a* and 1510*b* in a horizontal direction. In this case, coding units having the same shape as the four square second coding units 1530*a*, 1530*b*, 1530*c*, and 1530*d* split from the first coding unit 1500 may be determined.

As another example, the image decoding apparatus 100 may determine square third coding units 1522*a* and 1522*b* by splitting the upper second coding unit 1520*a* in a vertical direction, and may determine square third coding units 1524*a* and 1524*b* by splitting the lower second coding unit 1520*b* in a vertical direction. Furthermore, the image decoding apparatus 100 may determine square third coding units 1526*a*, 1526*b*, 1526*c*, and 1526*d* by splitting both of the upper and lower second coding units 1520*a* and 1520*b* in a vertical direction. In this case, coding units having the same shape as the four square second coding units 1530*a*, 1530*b*, 1530*c*, and 1530*d* split from the first coding unit 1500 may be determined.

Figure 16:
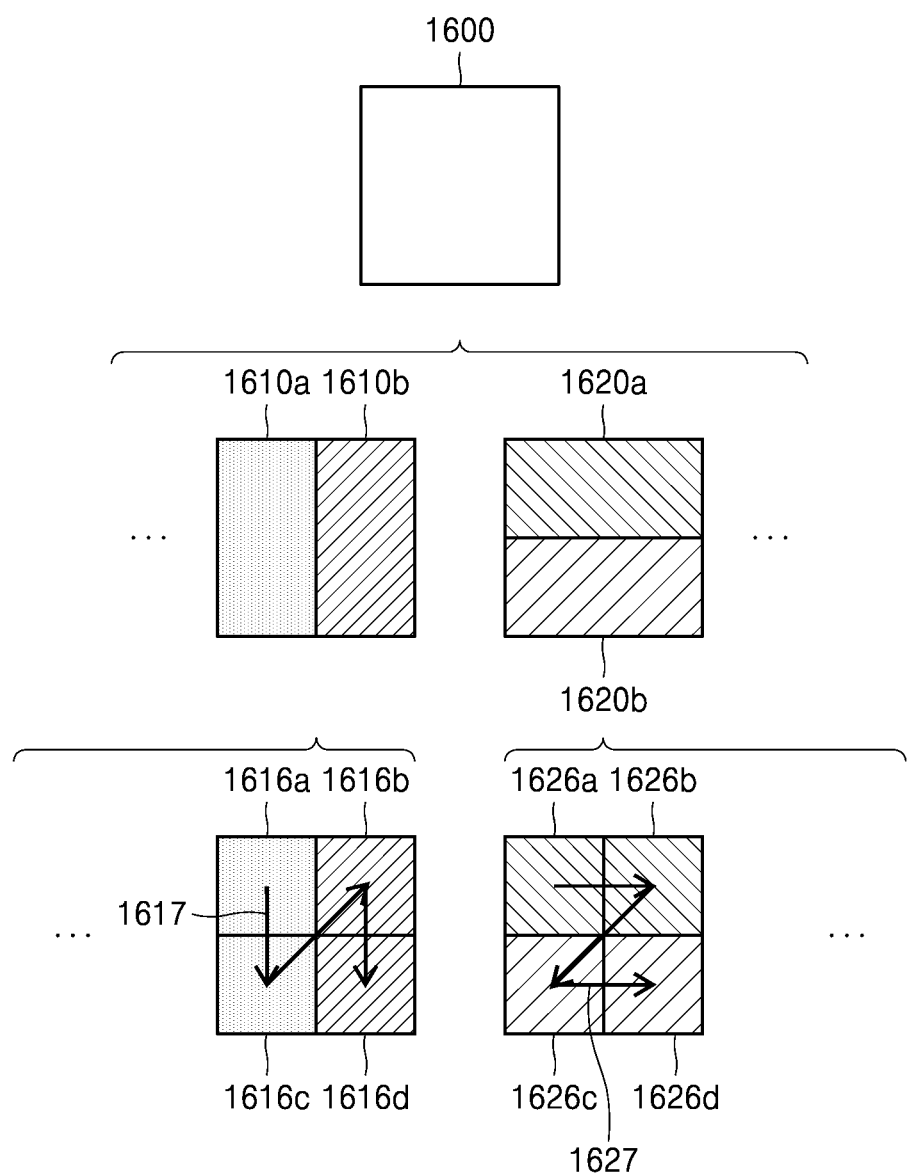
FIG. 16 illustrates that a processing order between a plurality of coding units may be changed depending on a process of splitting a coding unit, according to various embodiments.

FIG. 16 illustrates that a processing order between a plurality of coding units may be changed depending on a process of splitting a coding unit, according to an embodiment.

According to an embodiment, the image decoding apparatus 100 may split a first coding unit 1600, based on split shape mode information. When a block shape indicates a square shape and the split shape mode information indicates to split the first coding unit 1600 in at least one of horizontal and vertical directions, the image decoding apparatus 100 may determine second coding units 1610*a* and 1610*b* or 1620*a* and 1620*b*, etc. by splitting the first coding unit 1600. Referring to FIG. 16, the non-square second coding units 1610*a* and 1610*b* or 1620*a* and 1620*b* determined by splitting the first coding unit 1600 in only a horizontal direction or vertical direction may be independently split based on the split shape mode information of each coding unit. For example, the image decoding apparatus 100 may determine third coding units 1616*a*, 1616*b*, 1616*c*, and 1616*d* by splitting the second coding units 1610*a* and 1610*b*, which are generated by splitting the first coding unit 1600 in a vertical direction, in a horizontal direction, and may determine third coding units 1626*a*, 1626*b*, 1626*c*, and 1626*d* by splitting the second coding units 1620*a* and 1620*b*, which are generated by splitting the first coding unit 1600 in a horizontal direction, in a vertical direction. An operation of splitting the second coding units 1610*a* and 1610*b* or 1620*a* and 1620*b* has been described above in relation to FIG. 15, and thus detailed descriptions thereof will not be provided herein.

According to an embodiment, the image decoding apparatus 100 may process coding units in a predetermined order. An operation of processing coding units in a predetermined order has been described above in relation to FIG. 11, and thus detailed descriptions thereof will not be provided herein. Referring to FIG. 16, the image decoding apparatus 100 may determine four square third coding units 1616*a*, 1616*b*, 1616*c*, and 1616*d*, and 1626*a*, 1626*b*, 1626*c*, and 1626*d* by splitting the square first coding unit 1600. According to an embodiment, the image decoding apparatus 100 may determine processing orders of the third coding units 1616*a*, 1616*b*, 1616*c*, and 1616*d*, and 1626*a*, 1626*b*, 1626*c*, and 1626*d* based on a splitting method of the first coding unit 1600.

According to an embodiment, the image decoding apparatus 100 may determine the third coding units 1616*a*, 1616*b*, 1616*c*, and 1616*d* by splitting the second coding units 1610*a* and 1610*b* generated by splitting the first coding unit 1600 in a vertical direction, in a horizontal direction, and may process the third coding units 1616*a*, 1616*b*, 1616*c*, and 1616*d* in a processing order 1617 for initially processing the third coding units 1616*a* and 1616*c*, which are included in the left second coding unit 1610*a*, in a vertical direction and then processing the third coding unit 1616*b* and 1616*d*, which are included in the right second coding unit 1610*b*, in a vertical direction.

According to an embodiment, the image decoding apparatus 100 may determine the third coding units 1626*a*, 1626*b*, 1626*c*, and 1626*d* by splitting the second coding units 1620*a* and 1620*b* generated by splitting the first coding unit 1600 in a horizontal direction, in a vertical direction, and may process the third coding units 1626*a*, 1626*b*, 1626*c*, and 1626*d* in a processing order 1627 for initially processing the third coding units 1626*a* and 1626*b*, which are included in the upper second coding unit 1620*a*, in a horizontal direction and then processing the third coding unit 1626*c* and 1626*d*, which are included in the lower second coding unit 1620*b*, in a horizontal direction.

Referring to FIG. 16, the square third coding units 1616*a*, 1616*b*, 1616*c*, and 1616*d*, and 1626*a*, 1626*b*, 1626*c*, and 1626*d* may be determined by splitting the second coding units 1610*a* and 1610*b*, and 1620*a* and 1620*b*, respectively. Although the second coding units 1610*a* and 1610*b* are determined by splitting the first coding unit 1600 in a vertical direction differently from the second coding units 1620*a* and 1620*b* which are determined by splitting the first coding unit 1600 in a horizontal direction, the third coding units 1616*a*, 1616*b*, 1616*c*, and 1616*d*, and 1626*a*, 1626*b*, 1626*c*, and 1626*d* split therefrom eventually show same-shaped coding units split from the first coding unit 1600. As such, by recursively splitting a coding unit in different manners based on the split shape information, the image decoding apparatus 100 may process a plurality of coding units in different orders even when the coding units are eventually determined to be the same shape.

FIG. 17 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 17, according to an embodiment, the image decoding apparatus 100 may determine a second coding unit 1702 and a third coding unit 1704 of deeper depths by splitting a square first coding unit 1700 based on block shape information indicating a square shape (for example, the block shape information may be expressed as '0: SQUARE'). Assuming that the size of the square first coding unit 1700 is 2N×2N, the second coding unit 1702 determined by splitting a width and height of the first coding unit 1700 to ½ may have a size of N×N. Furthermore, the third coding unit 1704 determined by splitting a width and height of the second coding unit 1702 to ½ may have a size of N/2×N/2. In this case, a width and height of the third coding unit 1704 are ¼ times those of the first coding unit 1700. When a depth of the first coding unit 1700 is D, a depth of the second coding unit 1702, the width and height of which are ½ times those of the first coding unit 1700, may be D+1, and a depth of the third coding unit 1704, the width and height of which are ¼ times those of the first coding unit 1700, may be D+2.

According to an embodiment, the image decoding apparatus 100 may determine a second coding unit 1712 or 1722 and a third coding unit 1714 or 1724 of deeper depths by splitting a non-square first coding unit 1710 or 1720 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1702, 1712, or 1722 by splitting at least one of a width and height of the first coding unit 1710 having a size of N×2N. That is, the image decoding apparatus 100 may determine the second coding unit 1702 having a size of N×N or the second coding unit 1722 having a size of N×N/2 by splitting the first coding unit 1710 in a horizontal direction, or may determine the second coding unit 1712 having a size of N/2×N by splitting the first coding unit 1710 in horizontal and vertical directions.

According to an embodiment, the image decoding apparatus 100 may determine the second coding unit 1702, 1712, or 1722 by splitting at least one of a width and height of the first coding unit 1720 having a size of 2N×N. That is, the image decoding apparatus 100 may determine the second coding unit 1702 having a size of N×N or the second coding unit 1712 having a size of N/2×N by splitting the first coding unit 1720 in a vertical direction, or may determine the second coding unit 1722 having a size of N×N/2 by splitting the first coding unit 1720 in horizontal and vertical directions.

According to an embodiment, the image decoding apparatus 100 may determine a third coding unit 1704, 1714, or 1724 by splitting at least one of a width and height of the second coding unit 1702 having a size of N×N. That is, the image decoding apparatus 100 may determine the third coding unit 1704 having a size of N/2×N/2, the third coding unit 1714 having a size of N/4×N/2, or the third coding unit 1724 having a size of N/2×N/4 by splitting the second coding unit 1702 in vertical and horizontal directions.

According to an embodiment, the image decoding apparatus 100 may determine the third coding unit 1704, 1714, or 1724 by splitting at least one of a width and height of the second coding unit 1712 having a size of N/2×N. That is, the image decoding apparatus 100 may determine the third coding unit 1704 having a size of N/2×N/2 or the third coding unit 1724 having a size of N/2×N/4 by splitting the second coding unit 1712 in a horizontal direction, or may determine the third coding unit 1714 having a size of N/4×N/2 by splitting the second coding unit 1712 in vertical and horizontal directions.

According to an embodiment, the image decoding apparatus 100 may determine the third coding unit 1704, 1714, or 1724 by splitting at least one of a width and height of the second coding unit 1722 having a size of N×N/2. That is, the image decoding apparatus 100 may determine the third coding unit 1704 having a size of N/2×N/2 or the third coding unit 1714 having a size of N/4×N/2 by splitting the second coding unit 1722 in a vertical direction, or may determine the third coding unit 1724 having a size of N/2×N/4 by splitting the second coding unit 1722 in vertical and horizontal directions.

According to an embodiment, the image decoding apparatus 100 may split the square coding unit 1700, 1702, or 1704 in a horizontal or vertical direction. For example, the image decoding apparatus 100 may determine the first coding unit 1710 having a size of N×2N by splitting the first coding unit 1700 having a size of 2N×2N in a vertical direction, or may determine the first coding unit 1720 having a size of 2N×N by splitting the first coding unit 1700 in a horizontal direction. According to an embodiment, when a depth is determined based on the length of the longest side of a coding unit, a depth of a coding unit determined by splitting the first coding unit 1700 having a size of 2N×2N in a horizontal or vertical direction may be the same as the depth of the first coding unit 1700.

According to an embodiment, a width and height of the third coding unit 1714 or 1724 may be ¼ times those of the first coding unit 1710 or 1720. When a depth of the first coding unit 1710 or 1720 is D, a depth of the second coding unit 1712 or 1722, the width and height of which are ½ times those of the first coding unit 1710 or 1720, may be D+1, and a depth of the third coding unit 1714 or 1724, the width and height of which are ¼ times those of the first coding unit 1710 or 1720, may be D+2.

Figure 18:
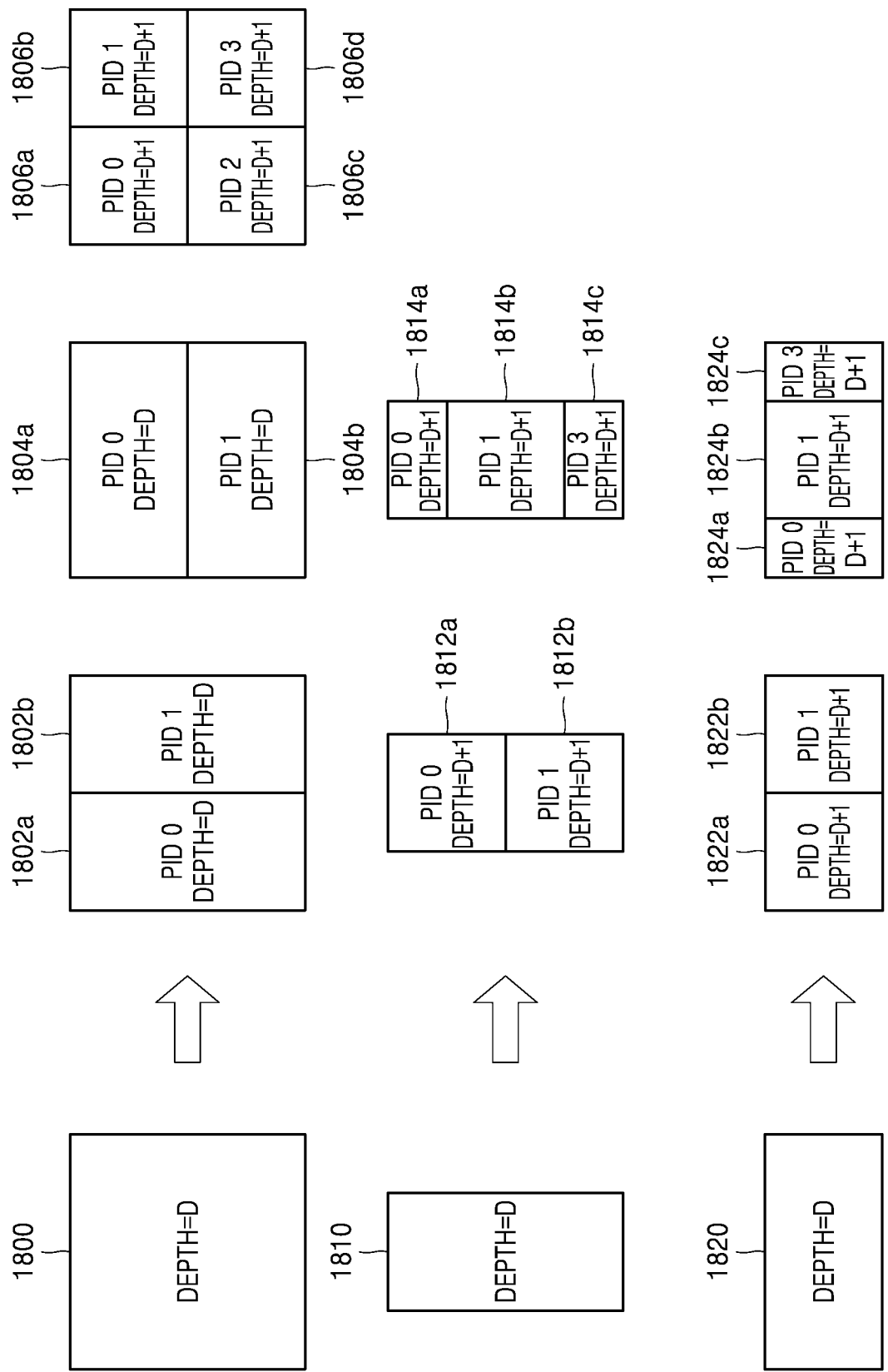
FIG. 18 illustrates depths that are determinable based on shapes and sizes of coding units, and part indexes (PIDs) that are for distinguishing the coding units, according to various embodiments.

FIG. 18 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1800. Referring to FIG. 18, the image decoding apparatus 100 may determine second coding units 1802*a* and 1802*b*, 1804*a* and 1804*b*, and 1806*a*, 1806*b*, 1806*c*, and 1806*d* by splitting the first coding unit 1800 in at least one of vertical and horizontal directions based on split shape mode information. That is, the image decoding apparatus 100 may determine the second coding units 1802*a* and 1802*b*, 1804*a* and 1804*b*, and 1806*a*, 1806*b*, 1806*c*, and 1806*d*, based on the split shape mode information of the first coding unit 1800.

According to an embodiment, a depth of the second coding units 1802*a* and 1802*b*, 1804*a* and 1804*b*, and 1806*a*, 1806*b*, 1806*c*, and 1806*d*, which are determined based on the split shape mode information of the square first coding unit 1800, may be determined based on the length of a long side thereof. For example, because the length of a side of the square first coding unit 1800 equals the length of a long side of the non-square second coding units 1802*a* and 1802*b*, and 1804*a* and 1804*b*, the first coding unit 1800 and the non-square second coding units 1802*a* and 1802*b*, and 1804*a* and 1804*b* may have the same depth, e.g., D. However, when the image decoding apparatus 100 splits the first coding unit 1800 into the four square second coding units 1806*a*, 1806*b*, 1806*c*, and 1806*d* based on the split shape mode information, because the length of a side of the square second coding units 1806*a*, 1806*b*, 1806*c*, and 1806*d* is ½ times the length of a side of the first coding unit 1800, a depth of the second coding units 1806*a*, 1806*b*, 1806*c*, and 1806*d* may be D+1 which is deeper than the depth D of the first coding unit 1800 by 1.

According to an embodiment, the image decoding apparatus 100 may determine a plurality of second coding units 1812*a* and 1812*b*, and 1814*a*, 1814*b*, and 1814*c* by splitting a first coding unit 1810, a height of which is longer than a width, in a horizontal direction based on the split shape mode information. According to an embodiment, the image decoding apparatus 100 may determine a plurality of second coding units 1822*a* and 1822*b*, and 1824*a*, 1824*b*, and 1824*c* by splitting a first coding unit 1820, a width of which is longer than a height, in a vertical direction based on the split shape mode information.

According to an embodiment, a depth of the second coding units 1812*a* and 1812*b*, and 1814*a*, 1814*b*, and 1814*c*, or 1822*a* and 1822*b*, and 1824*a*, 1824*b*, and 1824*c*, which are determined based on the split shape mode information of the non-square first coding unit 1810 or 1820, may be determined based on the length of a long side thereof. For example, because the length of a side of the square second coding units 1812*a* and 1812*b* is ½ times the length of a long side of the first coding unit 1810 having a non-square shape, a height of which is longer than a width, a depth of the square second coding units 1812*a* and 1812*b* is D+1 which is deeper than the depth D of the non-square first coding unit 1810 by 1.

Furthermore, the image decoding apparatus 100 may split the non-square first coding unit 1810 into an odd number of second coding units 1814*a*, 1814*b*, and 1814*c* based on the split shape mode information. The odd number of second coding units 1814*a*, 1814*b*, and 1814*c* may include the non-square second coding units 1814*a* and 1814*c* and the square second coding unit 1814*b*. In this case, because the length of a long side of the non-square second coding units 1814*a* and 1814*c* and the length of a side of the square second coding unit 1814*b* are ½ times the length of a long side of the first coding unit 1810, a depth of the second coding units 1814*a*, 1814*b*, and 1814*c* may be D+1 which is deeper than the depth D of the non-square first coding unit 1810 by 1. The image decoding apparatus 100 may determine depths of coding units split from the first coding unit 1820 having a non-square shape, a width of which is longer than a height, by using the above-described method of determining depths of coding units split from the first coding unit 1810.

According to an embodiment, the image decoding apparatus 100 may determine PIDs for identifying split coding units, based on a size ratio between the coding units when an odd number of split coding units do not have equal sizes. Referring to FIG. 18, the coding unit 1814*b* of a center location among the odd number of split coding units 1814*a*, 1814*b*, and 1814*c* may have a width equal to that of the other coding units 1814*a* and 1814*c* and a height which is two times that of the other coding units 1814*a* and 1814*c*. That is, in this case, the coding unit 1814*b* at the center location may include two of the other coding unit 1814*a* or 1814*c*. Therefore, when a PID of the coding unit 1814*b* at the center location is 1 based on a scan order, a PID of the coding unit 1814*c* located next to the coding unit 1814*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 18, the image decoding apparatus 100 may determine an even number of coding units 1812*a* and 1812*b* or an odd number of coding units 1814*a*, 1814*b*, and 1814*c* by splitting the first coding unit 1810 having a rectangular shape, a height of which is longer than a width. The image decoding apparatus 100 may use PIDs to identify respective coding units. According to an embodiment, the PID may be obtained from a sample of a predetermined location of each coding unit (e.g., a top-left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1810 having a rectangular shape, a height of which is longer than a width, indicates to split a coding unit into three coding units, the image decoding apparatus 100 may split the first coding unit 1810 into three coding units 1814*a*, 1814*b*, and 1814*c*. The image decoding apparatus 100 may assign a PID to each of the three coding units 1814*a*, 1814*b*, and 1814*c*. The image decoding apparatus 100 may compare PIDs of an odd number of split coding units to determine a coding unit at a center location from among the coding units. The image decoding apparatus 100 may determine the coding unit 1814*b* having a PID corresponding to a middle value among the PIDs of the coding units, as the coding unit at the center location from among the coding units determined by splitting the first coding unit 1810. According to an embodiment, the image decoding apparatus 100 may determine PIDs for distinguishing split coding units, based on a size ratio between the coding units when the split coding units do not have equal sizes. Referring to FIG. 18, the coding unit 1814*b* generated by splitting the first coding unit 1810 may have a width equal to that of the other coding units 1814*a* and 1814*c* and a height which is two times that of the other coding units 1814*a* and 1814*c*. In this case, when the PID of the coding unit 1814*b* at the center location is 1, the PID of the coding unit 1814*c* located next to the coding unit 1814*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 19:
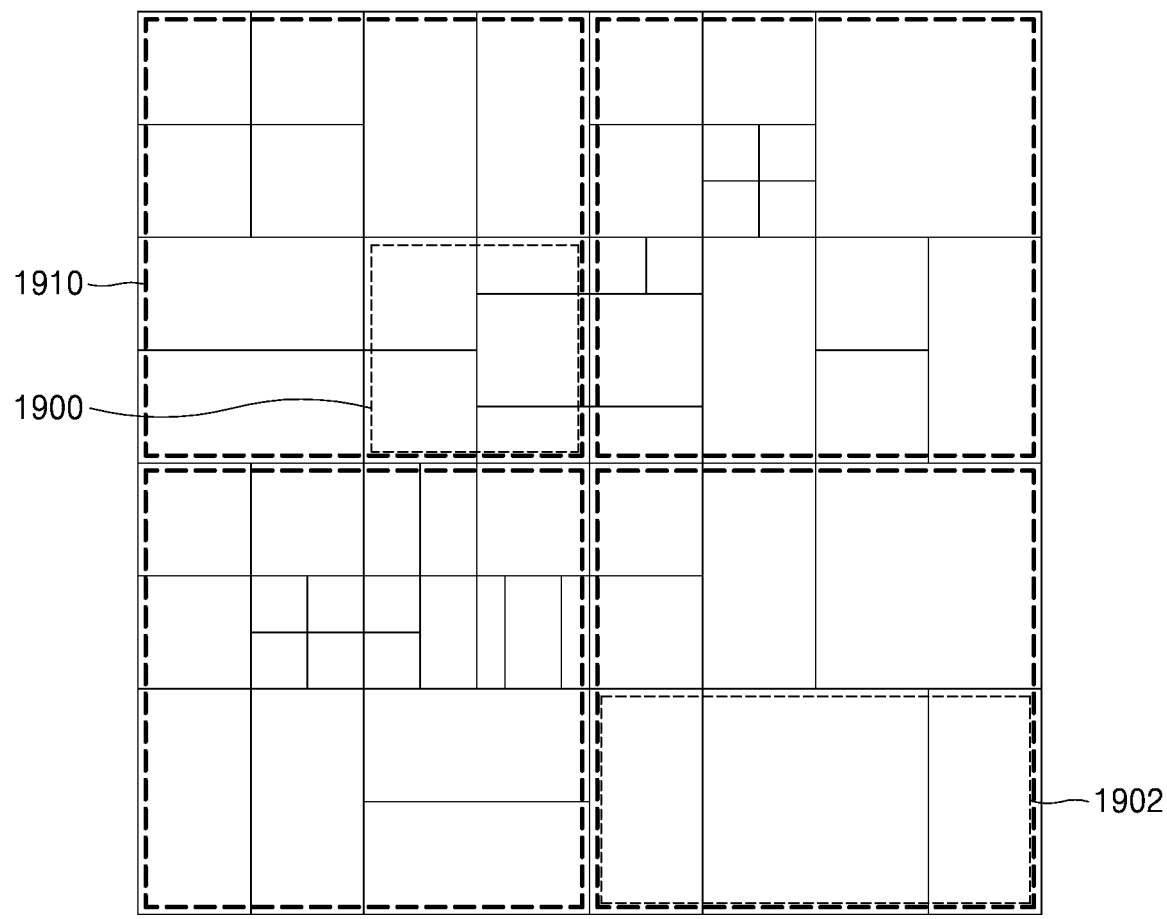
FIG. 19 illustrates that a plurality of coding units are determined based on a plurality of predetermined data units included in a picture, according to various embodiments.

FIG. 19 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture.

In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 19, the image decoding apparatus 100 may use a square reference coding unit 1900 or a non-square reference coding unit 1902. According to an embodiment, the shape and size of reference coding units may be determined based on various data units capable of including one or more reference coding units (e.g., sequences, pictures, slices, slice segments, largest coding units, or the like).

According to an embodiment, the receiver (not shown) of the image decoding apparatus 100 may obtain, from a bitstream, at least one of reference coding unit shape information and reference coding unit size information with respect to each of the various data units. An operation of splitting the square reference coding unit 1900 into one or more coding units has been described above in relation to the operation of splitting the current coding unit 1500 of FIG. 15, and an operation of splitting the non-square reference coding unit 1902 into one or more coding units has been described above in relation to the operation of splitting the current coding unit 1600 or 1650 of FIG. 16. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver (not shown) may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 20:
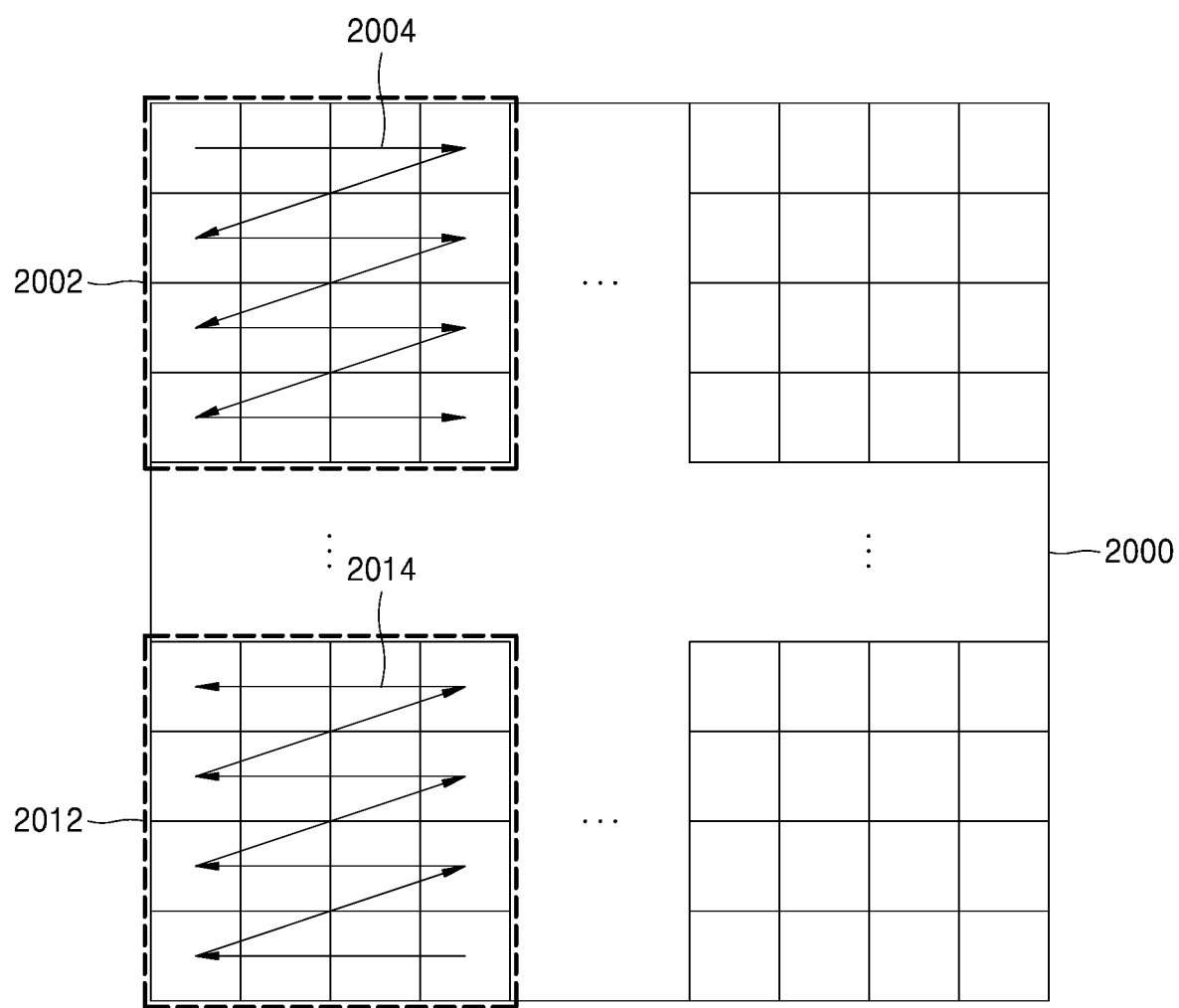
FIG. 20 illustrates a processing block serving as a unit for determining a determination order of reference coding units included in a picture, according to various embodiments.

FIG. 20 illustrates a processing block serving as a criterion for determining a determination order of reference coding units included in a picture 2000, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver (not shown) of the image decoding apparatus 100 may obtain the processing block size information from the bitstream according to each specific data unit. For example, the processing block size information may be obtained from the bitstream in a data unit such as an image, sequence, picture, slice, or slice segment. That is, the receiver (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 2002 and 2012 included in the picture 2000. For example, the image decoding apparatus 100 may determine the size of processing blocks based on the processing block size information obtained from the bitstream. Referring to FIG. 20, according to an embodiment, the image decoding apparatus 100 may determine a width of the processing blocks 2002 and 2012 to be four times the width of the reference coding units, and may determine a height of the processing blocks 2002 and 2012 to be four times the height of the reference coding units. The image decoding apparatus 100 may determine a determination order of one or more reference coding units in one or more processing blocks.

According to an embodiment, the image decoding apparatus 100 may determine the processing blocks 2002 and 2012, which are included in the picture 2000, based on the size of processing blocks, and may determine a determination order of one or more reference coding units in the processing blocks 2002 and 2012. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver (not shown) may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 2002 and 2012, and the image decoding apparatus 100 may determine a determination order of one or more reference coding units included in the processing blocks 2002 and 2012 and determine one or more reference coding units, which are included in the picture 2000, based on the determination order. Referring to FIG. 20, the image decoding apparatus 100 may determine determination orders 2004 and 2014 of one or more reference coding units in the processing blocks 2002 and 2012, respectively. For example, when the determination order information of reference coding units is obtained with respect to each processing block, different types of the determination order information of reference coding units may be obtained for the processing blocks 2002 and 2012. When the determination order 2004 of reference coding units in the processing block 2002 is a raster scan order, reference coding units included in the processing block 2002 may be determined according to a raster scan order. On the contrary, when the determination order 2014 of reference coding units in the other processing block 2012 is a backward raster scan order, reference coding units included in the processing block 2012 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be pre-determined between the image decoding apparatus 100 and the image encoding apparatus 400. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, and a slice segment header. The image decoding apparatus 100 may determine the split rule differently according to frames, slices, temporal layers, largest coding units, or coding units.

The image decoding apparatus 100 may determine the split rule based on block shape information of a coding unit. A block shape may include a size, shape, a ratio of width and height, and a direction of the coding unit. The image encoding apparatus 400 and the image decoding apparatus 100 may pre-determine to determine the split rule based on the block shape information of the coding unit. However, an embodiment is not limited thereto. The image decoding apparatus 100 may determine the split rule based on the information obtained from the bitstream received from the image encoding apparatus 400.

The shape of the coding unit may include a square and a non-square. When the lengths of the width and height of the coding unit are the same, the image decoding apparatus 100 may determine the shape of the coding unit to be a square.

Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, or 16:1. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 400 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding process orders. Because the decoding process orders have been described above with reference to FIG. 16, details thereof are not provided again.

Hereinafter, an image encoding apparatus and image decoding apparatus, and an image encoding method and image decoding method for adaptively applying a filter to a reference sample, based on an inter prediction mode of a current block, according to various embodiments, will be described in detail with reference to FIGS. 21A through 30.

Figure 21A:
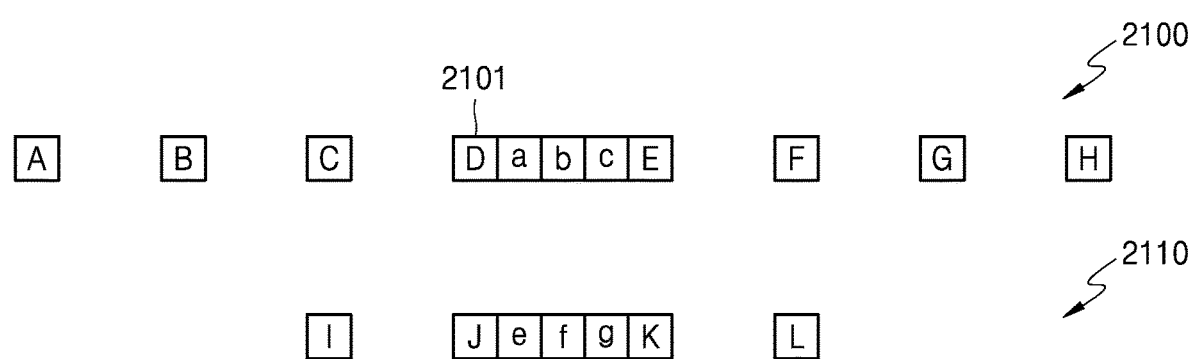
FIGS. 21A and 21B are diagrams for describing a method of performing filtering on a reference sample for motion compensation during inter prediction, according to various embodiments.
Figure 21B:
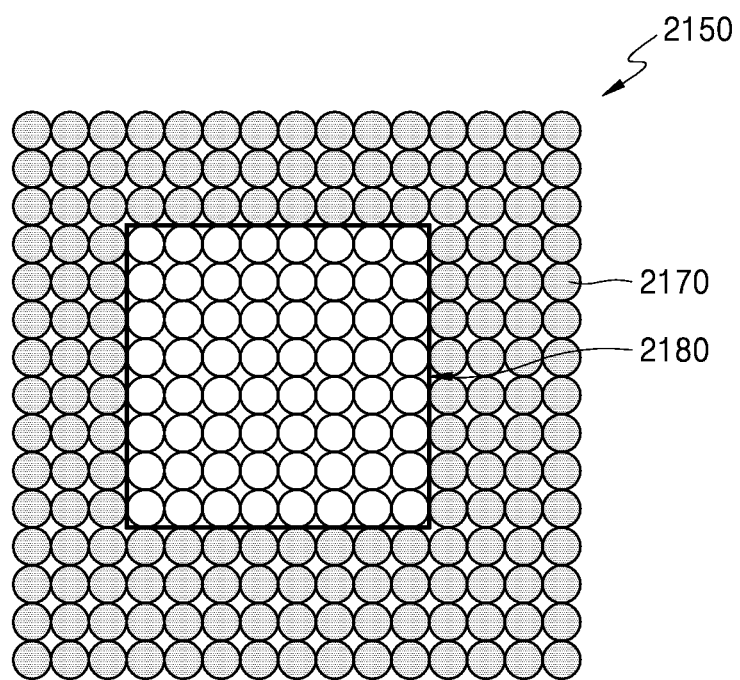

FIGS. 21A and 21B are diagrams for describing a method of performing filtering on a reference sample for motion compensation during inter prediction, according to various embodiments.

FIG. 21A illustrates reference samples at integer pixel locations and reference samples at sub-pixel locations, according to various embodiments.

An interpolation filter may be applied to the reference samples at integer pixel locations to generate the reference samples at sub-pixel locations located between integer pixels. The interpolation filter may be applied with respect to neighboring samples at integer pixel locations adjacent to the reference sample at sub-pixel location to be generated. For example, the applying of the interpolation filter is a process of sequentially multiplying coefficients of the interpolation filter and sample values at integer pixel locations and generating a value obtained by adding multiplication result values (or a value obtained by scaling the added value) as an interpolation sample value. The samples at integer pixel locations to which the interpolation filter is applied are samples arranged in a line around the reference sample at sub-pixel location to be generated, and the interpolation filter may be applied with respect to the number of samples equal to the number of coefficients of the interpolation filter.

Among the reference samples shown in FIG. 21A, samples indicated by capital letters of the alphabet such as A, B, C, D, E, F, G, H, I, J, K, and L are the samples at integer pixel locations. Samples indicated by lower case of the alphabet such as a, b, c, e, f, and g are the samples at sub-pixel locations. In FIG. 21A, only sub-pixels of ¼-pixel units are shown, but the samples at the sub-pixel locations are not limited thereto, and the samples at the sub-pixel locations may be generated in ⅛-pixel units, 1/16-pixel units, or smaller units.

For example, referring to a reference numeral 2100 of FIG. 21A, samples a, b, and c at sub-pixel locations may be generated by applying the interpolation filter with respect to eight reference samples at integer pixel locations adjacent to the sub-pixel location, such as A, B, C, D, E, F, G, and H. In other words, the interpolation filter for generating the sample at the sub-pixel location may be an 8-tap filter. Here, the reference samples at integer pixel locations to which the interpolation filter is to be applied may be selected in an adjacent order from left and right of the sub-pixel location. However, a filter coefficient set of the interpolation filter for generating the sample a at the sub-pixel location, a filter coefficient set of the interpolation filter for generating the sample b at the sub-pixel location, and a filter coefficient set of the interpolation filter for generating the sample c at the sub-pixel location may be different from each other.

For example, referring to a reference numeral 2110 of FIG. 21A, samples e, g, and f at sub-pixel locations may be generated by applying the interpolation filter with respect to four reference samples at integer pixel locations adjacent to the sub-pixel location, such as I, J, K, and L. In other words, the interpolation filter for generating the sample at the sub-pixel location may be a 4-tap filter. A filter coefficient set of the interpolation filter for generating the sample e at the sub-pixel location, a filter coefficient set of the interpolation filter for generating the sample f at the sub-pixel location, and a filter coefficient set of the interpolation filter for generating the sample g at the sub-pixel location may be different from each other.

According to various embodiments, an interpolation filter used by the image encoding apparatus 400 and the image decoding apparatus 100 to generate a reference sample for motion compensation (prediction) may be determined based on an inter prediction mode of a current block. According to various embodiments, a direction or size of the interpolation filter may be determined based on the inter prediction mode of the current block.

According to various embodiments, the interpolation filter used by the image encoding apparatus 400 and the image decoding apparatus 100 to generate the reference sample for motion compensation (prediction) may be determined further based on a size of the current block, whether the current block is a luma block or a chroma block, and/or whether the inter prediction mode of the current block is unidirectional prediction or bidirectional prediction.

In FIG. 21A, only an example of using an adjacent reference sample at an integer pixel location in a horizontal direction is illustrated, but similarly, a sample at a sub-pixel location may be generated by applying an interpolation filter to an adjacent reference sample at an integer pixel location in a vertical direction.

FIG. 21B illustrates an example of reference samples required for inter prediction of a current block.

The image decoding apparatus 100 may determine a reference block 2180 from a location of a reference sample indicated by a motion vector of a current block, in a reference picture 2150 indicated by a reference picture index of the current block. For example, a reference block may be determined such that a motion vector of a current block indicates a sample located at a top-left boundary in a reference block.

According to various embodiments, when the reference sample indicated by the motion vector of the current block is a sample at a sub-pixel location, the reference block 2180 may include reference samples at sub-pixel locations as many as the current block. Neighboring reference samples at integer pixel locations may be used as shown in FIG. 21A to generate the reference sample at each sub-pixel location included in the reference block 2180. Accordingly, the reference samples required to generate the reference block 2180 corresponding to the current block may include samples at integer pixel locations in the reference block 2180 and samples 2170 at integer pixel locations adjacent to the reference block 2180.

FIG. 21B illustrates an example in which the size of the current block is 8×8 and an 8-tap filter in horizontal and vertical directions is used as an interpolation filter. In this case, the reference block 2180 determined based on the motion vector of the current block may include 8×8=64 reference samples at sub-pixel locations. Eight left and right or top and bottom adjacent reference samples at integer pixel locations may be selected for each sub-pixel location and a reference sample at a sub-pixel location may be generated by applying an interpolation filter to the selected reference samples at integer pixel locations. For example, to generate 64 reference samples at sub-pixel locations, the interpolation filter may be applied to reference samples at integer pixel locations in a reference block, and to reference samples at integer pixel locations in 3 columns adjacent to the left of the reference block, 4 columns adjacent to the right of the reference block, 3 rows adjacent to the top of the reference block, and 4 rows adjacent to the bottom of the reference block. In this case, the number of reconstructed reference samples to be read from a reference picture for inter prediction of a 8×8 current block is up to (8+7)×(8+7)=225.

Figure 22A:
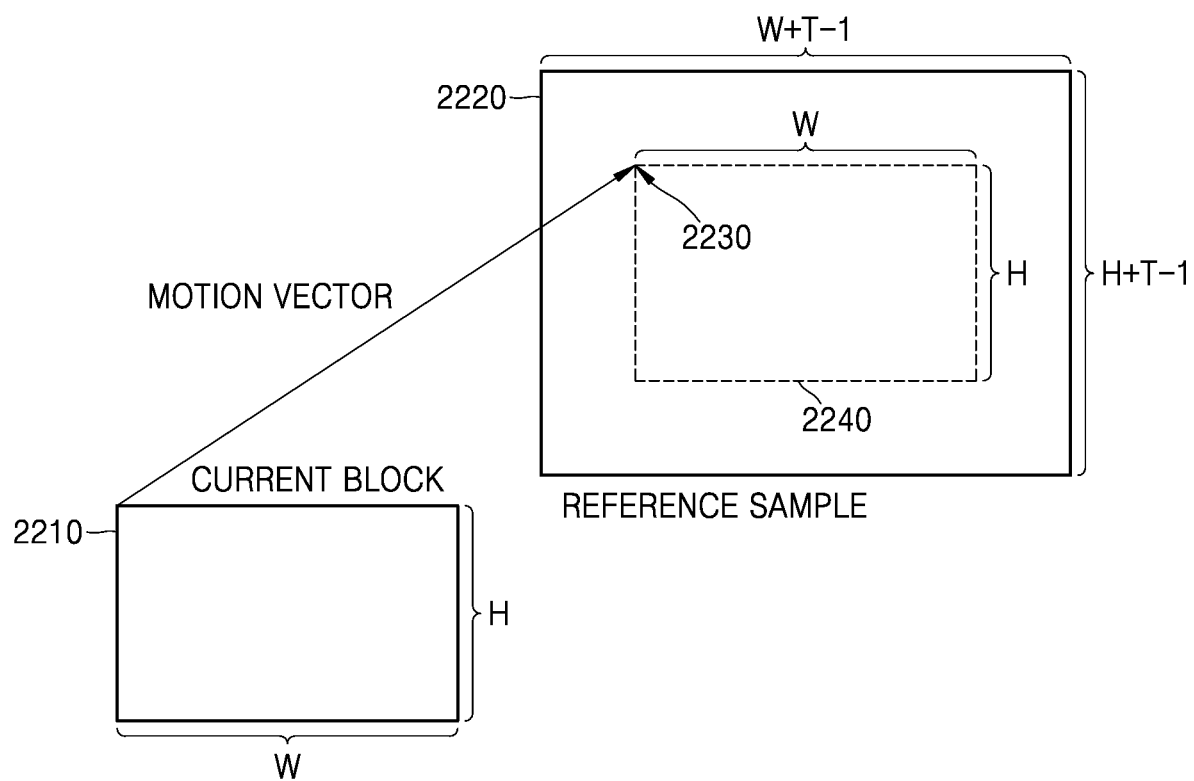
FIG. 22A illustrates reference samples required for inter prediction of a current block, according to various embodiments.

FIG. 22A illustrates reference samples required for inter prediction of a current block, according to various embodiments. FIG. 22A may be a more generalized example of the embodiments described with reference to FIGS. 21A and 21B.

In a current block 2210, a horizontal width is referred to as W and a vertical height is referred to as H. A location indicated by a motion vector in a reference picture indicated by a reference picture index of the current block 2210 may be determined as a reference sample location 2230. The reference sample location 2230 may be determined to be coordinates obtained by adding a motion vector component of the current block 2210 to top-left coordinates of the current block 2210. The reference sample location 2230 may indicate a top-left location of a reference block 2240 to be referred to by the current block 2210 during inter prediction.

An interpolation filter is configured of a separable 2-dimensional (2D) filter, i.e., a horizontal filter and a vertical filter, and it is assumed that a size of a filter is T, i.e., a T-tap filter is used. In this case, to generate a reference sample at a sub-pixel location in the reference block 2240, T adjacent reference samples at integer pixel locations are required, each vertically and horizontally. Accordingly, the number of reconstructed reference samples 2220 to be read from a reconstructed reference picture to generate all reference samples included in the reference block 2240 may be up to (W+T−1)×(H+T−1).

As a result, an average number of reference samples to be read from a reconstructed reference picture stored in a memory to predict a current sample may be represented as Equation 1.

$$\frac{(W + T - 1) \times (H + T - 1)}{W \times H} \quad \text{[Equation 1]}$$

According to various embodiments, Equation 1 may be defined as a memory bandwidth. According to Equation 1, the memory bandwidth increases as the size (W and H) of a current block decreases, and the memory bandwidth increases as a size (i.e., a number of taps T) of an interpolation filter increases. Thus, to maintain the memory bandwidth within a certain level, a number of taps of a filter may need to be decreased when a size of a current block is decreased.

According to various embodiments, the image decoding apparatus 100 may determine filter information such that the memory bandwidth is within a certain range. According to various embodiments, the image decoding apparatus 100 may adjust the memory bandwidth by determining the size of the filter according to the size of the current block. According to an embodiment, the image decoding apparatus 100 may determine to use a filter of a first number of taps when the size of the current block is equal to or greater than a certain reference value and determine to use a filter of a second number of taps smaller than the first number of taps otherwise. According to an embodiment, the certain reference value may be determined according to the inter prediction mode of the current block. According to an embodiment, the image encoding apparatus 400 or the image decoding apparatus 100 may compare the size of the current block with a plurality of reference values and determine a filter to be used among a plurality of filters based on a result of the comparison.

Figure 22B:
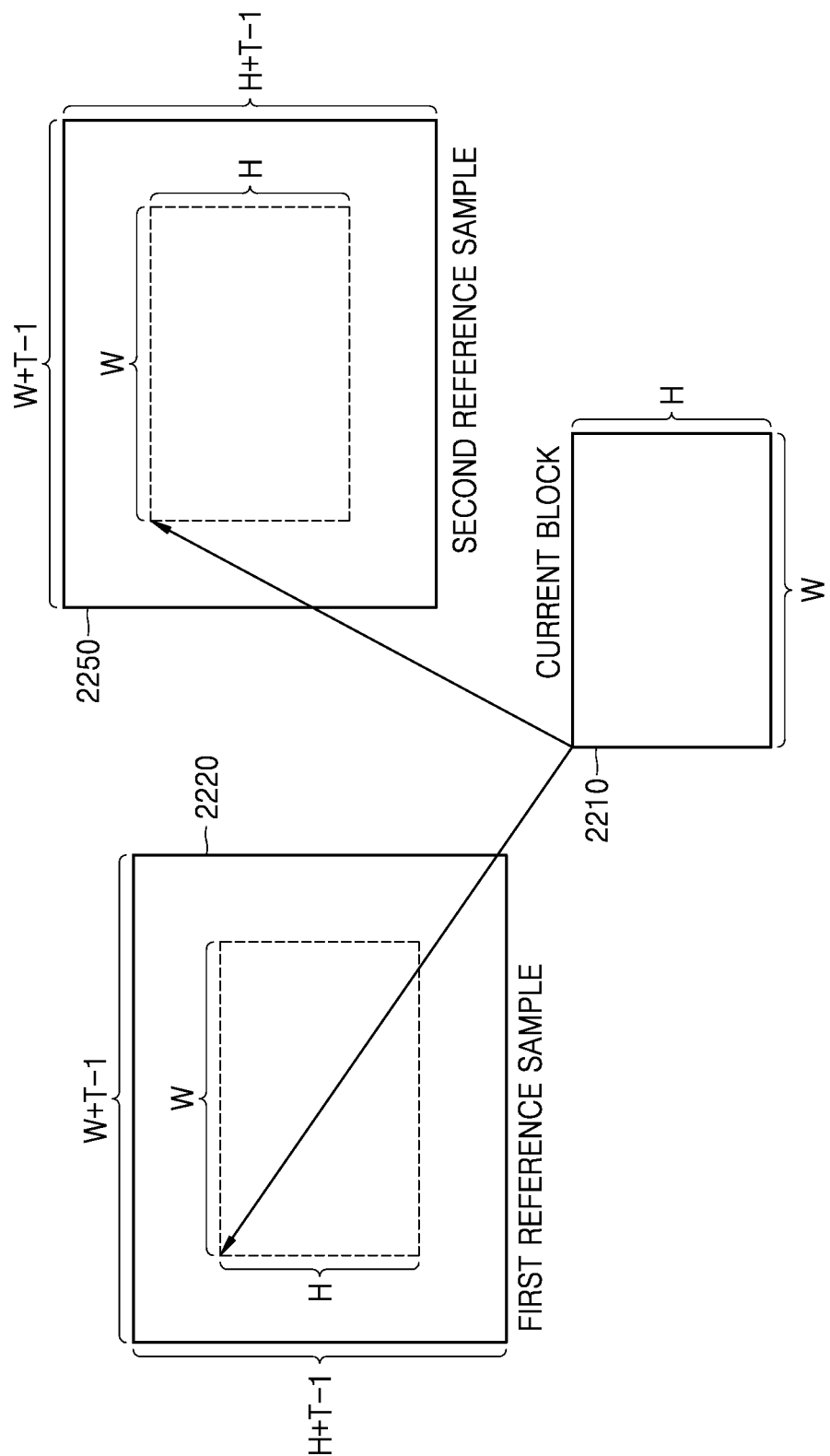
FIG. 22B illustrates reference samples required for inter prediction of a current block when the current block refers to a plurality of reference blocks, according to various embodiments.

FIG. 22B illustrates reference samples required for inter prediction of a current block when the current block refers to a plurality of reference blocks, according to various embodiments.

FIG. 22B illustrates an embodiment in which a horizontal width of the current block 2210 is referred to as W and a vertical height thereof is referred to as H, and a separable 2D T-tap filter is used as an interpolation filter as in FIG. 22A, but the current block 2210 is bidirectionally predicted unlike FIG. 22A.

When a current block is bidirectionally predicted, two motion vectors are determined for inter prediction of the current block. Accordingly, two reference sample locations indicated by the motion vectors and two reference blocks corresponding to the reference sample locations may be determined. The two reference sample locations may indicate locations in the same reference picture or indicate locations in different reference pictures. In this case, the maximum number of reconstructed reference samples 2220 and 2250 required to generate reference samples of reference blocks is 2×(W+T−1)×(H+T−1) that is two times greater than unidirectional prediction.

When the current block refers to N reference blocks, an average number of reference samples to be read from at least one reconstructed reference picture stored in a memory to predict a current sample may be calculated as Equation 2.

$$\frac{N \times (W + T - 1) \times (H + T - 1)}{W \times H} \quad \text{[Equation 2]}$$

According to various embodiments, Equation 2 may be defined as a memory bandwidth. According to Equation 2, the memory bandwidth increases as a number of reference blocks used for prediction increases, and the memory bandwidth increases as a size (i.e., a number of taps T) of an interpolation filter increases. Thus, to maintain the memory bandwidth within a certain level, a number of taps of a filter may need to be decreased when the number of reference blocks is increased.

According to various embodiments, the image decoding apparatus 100 may determine filter information such that the memory bandwidth is within a certain range. According to various embodiments, the image decoding apparatus 100 may determine the size of the filter based on whether inter prediction of the current block is unidirectional prediction or bidirectional prediction, thereby adjusting the memory bandwidth. According to an embodiment, the image decoding apparatus 100 may determine to use the first filter when the current block is unidirectionally predicted and determine to use the second filter when the current block is bidirectionally predicted. According to an embodiment, the size of the first filter may be twice larger than the size of the second filter.

According to various embodiments, the image decoding apparatus 100 may adjust the memory bandwidth by determining the size of the filter, based on the number of reference blocks referred to by the current block. According to an embodiment, the image decoding apparatus 100 may determine to use a filter of a first number of taps when the number of reference blocks referred to by the current block is lower than or equal to a certain reference value and determine to use a filter of a second number of taps smaller than the first number of taps otherwise. According to an embodiment, the image decoding apparatus 100 may compare the number of reference blocks referred to by the current block with a plurality of reference values and determine a filter to be used among the plurality of filters based on a result of the comparison.

FIG. 23 illustrates a memory bandwidth required for inter prediction of a current block, according to various embodiments.

A table 2300 of FIG. 23 shows a memory bandwidth calculated according to Equation 1 and Equation 2 when a horizontal width is referred to as W and a vertical height is referred to as H, and a separable 2D T-tap filter is used as an interpolation filter, according to the embodiment of FIG. 22A or 22B. Various examples according to a size of a current block and a number of taps are provided for a case 2310 of a luma block and a case 2320 of a chroma block sampled at 4:2:0.

In the HEVC/H.265 standard, inter prediction is not allowed for a block of a 4×4 size with respect to a luma block. When a size of a current block is 4×8 or 8×4, only unidirectional prediction is allowed. When the size of the current block is equal to or greater than 8×8, bidirectional prediction is allowed. Accordingly, referring to FIG. 23, the maximum memory bandwidth is required when the size of the current block is 8×8 and an 8-tap filter is used for bidirectional prediction among cases allowed in HEVC, and according to Equation 2, the memory bandwidth at this time is calculated to be about 7.03. Such a value may be defined as a HEVC limit.

According to various embodiments, the image decoding apparatus 100 may determine the size of a filter such that the memory bandwidth calculated according to Equation 1 or Equation 2 does not exceed a certain reference value. According to an embodiment, when the memory bandwidth according to a combination of a size of a current block, a number of taps of a filter, and unidirectional/bidirectional prediction is smaller than the certain reference value, the image decoding apparatus 100 may determine that the combination is usable in inter prediction.

For example, the certain reference value may be the same as the HEVC limit. A value of the memory bandwidth greater than the HEVC limit is indicated in bold in tables of FIG. 23 and other drawings.

In the case 2310 of luma block, according to an embodiment where the certain reference value is set to the HEVC limit, the size of the filter may be determined to be 4 taps or less in unidirectional and bidirectional prediction when the size of the current block is 4×4. According to another embodiment, when the size of the current block is 4×4, 8-tap filter may be allowed in unidirectional prediction.

In the case 2320 of a chroma block, because the number of samples included in the chroma block is ¼ of that of the luma block having the same size when the chroma block is sampled at 4:2:0, the memory bandwidth is equal to a value obtained by dividing a result of Equation 1 or Equation 2 by 4. According to an embodiment where the certain reference value is set to the HEVC limit, when a size of a current chroma block is 2×2, a size of a filter may be determined to be 8 taps or less in unidirectional prediction and a size of a filter may be determined to be 4 taps or less in bidirectional prediction.

Figure 24:
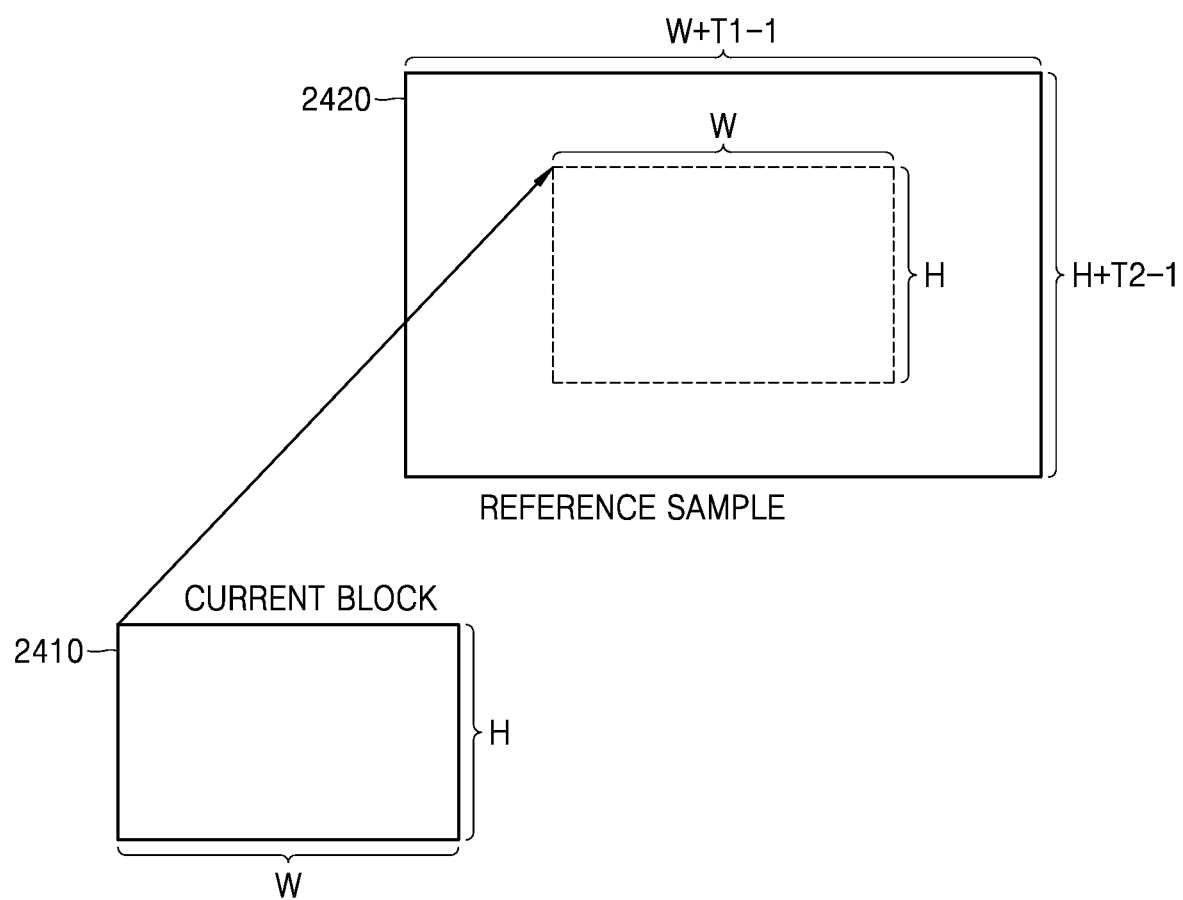
FIG. 24 illustrates reference samples required for inter prediction of a current block when different filters are used in a vertical direction and a horizontal direction, according to various embodiments.

FIG. 24 illustrates reference samples required for inter prediction of a current block when filters of different sizes are used in a vertical direction and a horizontal direction, according to various embodiments.

As assumed in FIGS. 22A through 23, a horizontal width is referred to as W and a vertical height is referred to as H in a current block 2410, and an interpolation filter for obtaining a reference sample is configured of a separable 2D filter, i.e., a horizontal filter and a vertical filter. However, unlike the previous embodiment, it is assumed that a T1-tap filter is applied in a horizontal direction and a T2-tap filter is applied in a vertical direction.

In this case, T1 horizontal adjacent reference samples at integer pixel locations and T2 vertical adjacent reference samples at integer pixel locations are required for each sub-pixel location to generate a reference sample at a sub-pixel location. Accordingly, the total number of reconstructed reference samples 2420 to be read from a reconstructed reference picture to generate all reference samples included in a reference block (shown in a broken line) corresponding to the current block 2410 is (W+T1−1)×(H+T2−1).

Accordingly, an average number of reference samples to be read from a reconstructed reference picture stored in a memory to predict a current sample, i.e., a memory bandwidth, may be defined as Equation 3.

$$\frac{N \times (W + T1 - 1) \times (H + T2 - 1)}{W \times H} \quad \text{[Equation 3]}$$

Here, N denotes the number of reference blocks to be referred to for inter prediction of a current block. N is 1 during unidirectional prediction and N is 2 during bidirectional prediction.

According to an embodiment, the image decoding apparatus 100 may independently determine a size of a horizontal filter and a size of a vertical filter such that the memory bandwidth calculated by Equation 3 is within a certain range. According to an embodiment, a number of taps T1 of a horizontal direction filter may be determined based on a horizontal width W and a number of taps T2 of a vertical direction filter may be determined based on a vertical height H. According to an embodiment, when the current block is non-square, the image decoding apparatus 100 may determine a horizontal direction filter and a vertical direction filter to be filters of different sizes.

According to an embodiment, the image decoding apparatus 100 may determine horizontal direction filter information and vertical direction filter information, based on a ratio of a horizontal width and a vertical height of a current block. For example, when the horizontal direction filter information of the current block is determined, the image decoding apparatus 100 may determine the vertical direction filter information based on the horizontal direction filter information and the ratio of the horizontal width and the vertical height of the current block. As for another example, when the vertical direction filter information of the current block is determined, the image decoding apparatus 100 may determine the horizontal direction filter information based on the vertical direction filter information and the ratio of the horizontal width and the vertical height of the current block. According to an embodiment, the image decoding apparatus 100 may determine the size of the horizontal direction filter and the size of the vertical direction filter to be in proportion to the horizontal width and the vertical height of the current block. For example, T1 and T2 may be determined such that a ratio T1:T2 of the number of taps of the horizontal direction filter and the number of taps of the vertical direction filter matches a ratio W:H of the horizontal width and the vertical height.

Figure 25A:
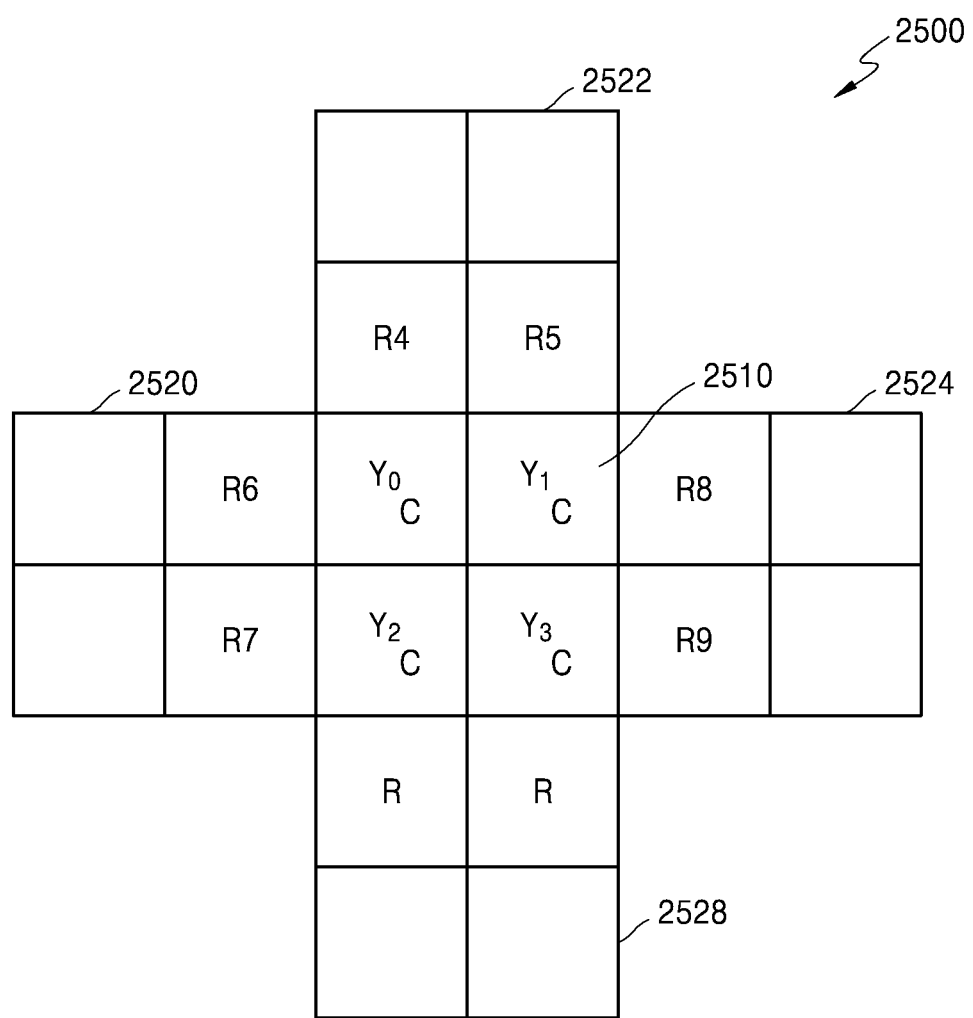
FIG. 25A illustrates a prediction method of an overlapped blocks motion compensation (OBMC) mode where a sub-block is not used, according to various embodiments.

FIG. 25A illustrates a prediction method of an OBMC mode where a sub-block is not used, according to various embodiments.

In the OBMC mode where a sub-block is not used, motion vectors of blocks 2520, 2522, 2524, and 2528 neighboring a current block 2510 may be used for motion prediction of the current block 2510. In particular, the motion vector of the block 2522 adjacent to the top of the current block 2510 may be used to predict samples $Y_0$ and $Y_1$ adjacent to a top boundary of the current block 2510, and the motion vector of the block 2528 adjacent to the bottom of the current block 2510 may be used to predict samples $Y_2$ and $Y_3$ adjacent to a bottom boundary of the current block 2510. Similarly, the motion vector of the block 2520 adjacent to the left of the current block 2510 may be used to predict samples $Y_0$ and $Y_2$ adjacent to a left boundary of the current block 2510, and the motion vector of the block 2524 adjacent to the right of the current block 2510 may be used to predict samples $Y_1$ and $Y_3$ adjacent to a right boundary of the current block 2510.

However, when the current block 2510 is decoded according to an encoding order of raster scan, the block 2528 adjacent to the bottom of the current block 2510 is not decoded, and in this case, a motion vector of the current block 2510 may be used instead of the motion vector of the block 2528 adjacent to the bottom of the current block 2510.

A plurality of prediction values are obtained by using a motion vector of a current block and motion vectors of blocks neighboring the current block. According to an embodiment, reference samples corresponding to four bottom rows R4 and R5 of the block 2522 adjacent to the top of the current block 2510, four right columns R6 and R7 of the block 2520 adjacent to the left of the current block 2510, and left four columns R8 and R9 of the block 2524 adjacent to the right of the current block 2510 may be obtained. A final prediction value of the current block may be obtained by performing weighted average on the plurality of prediction values.

Figure 25B:
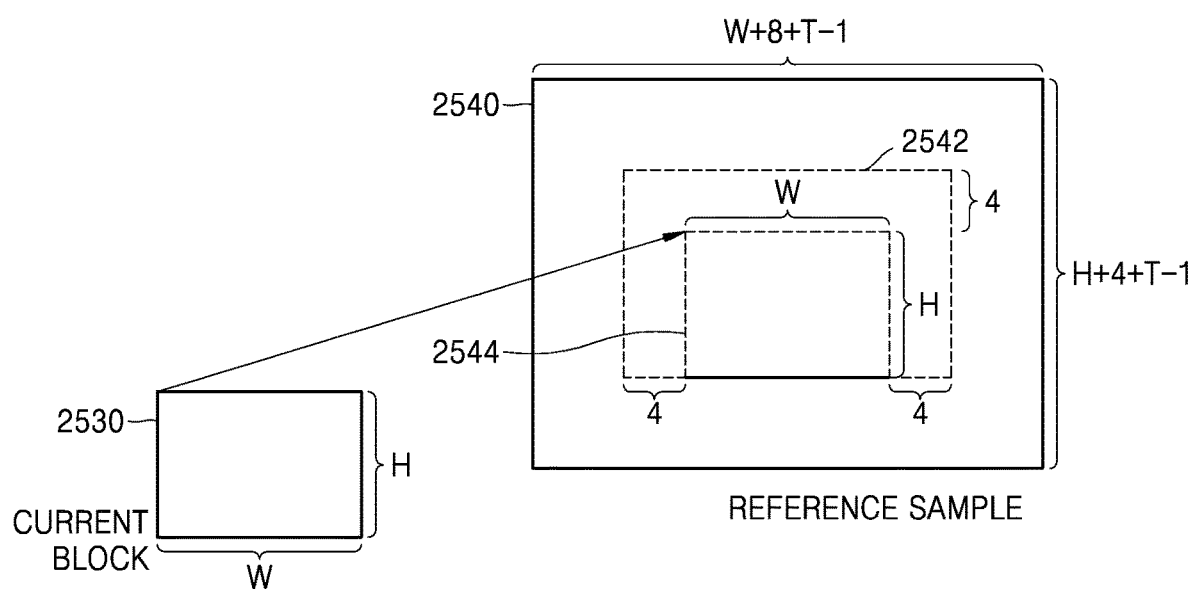
FIG. 25B illustrates reference samples required for inter prediction of a current block in an OBMC mode where a sub-block is not used, according to various embodiments.

FIG. 25B illustrates reference samples required for inter prediction of a current block in an OBMC mode where a sub-block is not used, according to various embodiments.

As shown in FIG. 25A, in the OBMC mode where a sub-block is not used, reference samples corresponding to samples of 4 pixels adjacent to each of the top, left, and right of a current block 2530 may be further used in addition to reference samples of a reference block 2544 corresponding to the current block 2530. Thus, the OBMC mode where a sub-block is not used may be referred to as performing motion compensation on a block 2542 in which the current block is expanded by 4 pixels in each of top, left, and right sides.

Here, when a horizontal width of the current block 2530 is referred to as W and a vertical height thereof is referred to as H, and a separable 2D T-tap filter is used as an interpolation filter, the total number of reconstructed reference samples 2540 to be read from a reconstructed reference picture for inter prediction of the current block 2530 is (W+8+T−1)×(H+4+T−1). Accordingly, in the OBMC mode where a sub-block is not used, an average number of reference samples to be read from a reconstructed reference picture stored in a memory to predict a current sample, i.e., a memory bandwidth may be calculated as Equation 4.

$$\frac{N \times (W + 8 + T - 1) \times (H + 4 + T - 1)}{W \times H} \quad \text{[Equation 4]}$$

Here, N denotes the number of reference blocks to be referred to for inter prediction of a current block. N is 1 during unidirectional prediction and N is 2 during bidirectional prediction.

FIG. 25C illustrates a memory bandwidth required for inter prediction of a current block in an OBMC mode where a sub-block is not used, according to various embodiments. FIG. 25C shows a memory bandwidth calculated according to Equation 4 when a horizontal width of a current block is referred to as W and a vertical height thereof is referred to as H, and a separable 2D T-tap filter is used as an interpolation filter, according to the embodiment of FIG. 25A or 25B. Various examples of a case 2560 of luma block and a case 2570 of chroma block sampled at 4:2:0 are provided.

According to various embodiments, the image decoding apparatus 100 may determine the size of a filter such that the memory bandwidth calculated according to Equation 4 does not exceed a certain reference value. According to an embodiment, the certain reference value may be determined based on the HEVC limit described above.

In the case 2560 of luma block, according to an embodiment where the certain reference value is set to the HEVC limit, the size of the filter may be determined to be 2 taps or less in bidirectional prediction and to be 8 taps or less in unidirectional prediction when the size of the current block is 8×8. When the size of the current block is 4×4, the memory bandwidth exceeds the HEVC limit even when a 2-tap filter is used, and thus the OBMC mode where a sub-block is not used may be determined not to be used for a 4×4 block. However, according to another embodiment, the increase in the memory bandwidth is small compared to the HEVC limit when a 2-tap filter is used for unidirectional prediction of a 4×4 block, the 2-tap filter may be allowed.

In the case 2570 of chroma block, because the number of samples included in the chroma block is ¼ of that of the luma block having the same size when the chroma block is sampled at 4:2:0, the memory bandwidth is equal to a value obtained by dividing a result of Equation 4 by 4. According to an embodiment of setting the certain reference value to the HEVC limit, the size of the filter may be determined to be 2 taps or less when the size of the current block is 2×2. According to another embodiment, when the size of the current block is 2×2, 4-tap filter may be allowed in unidirectional prediction.

Figure 26A:
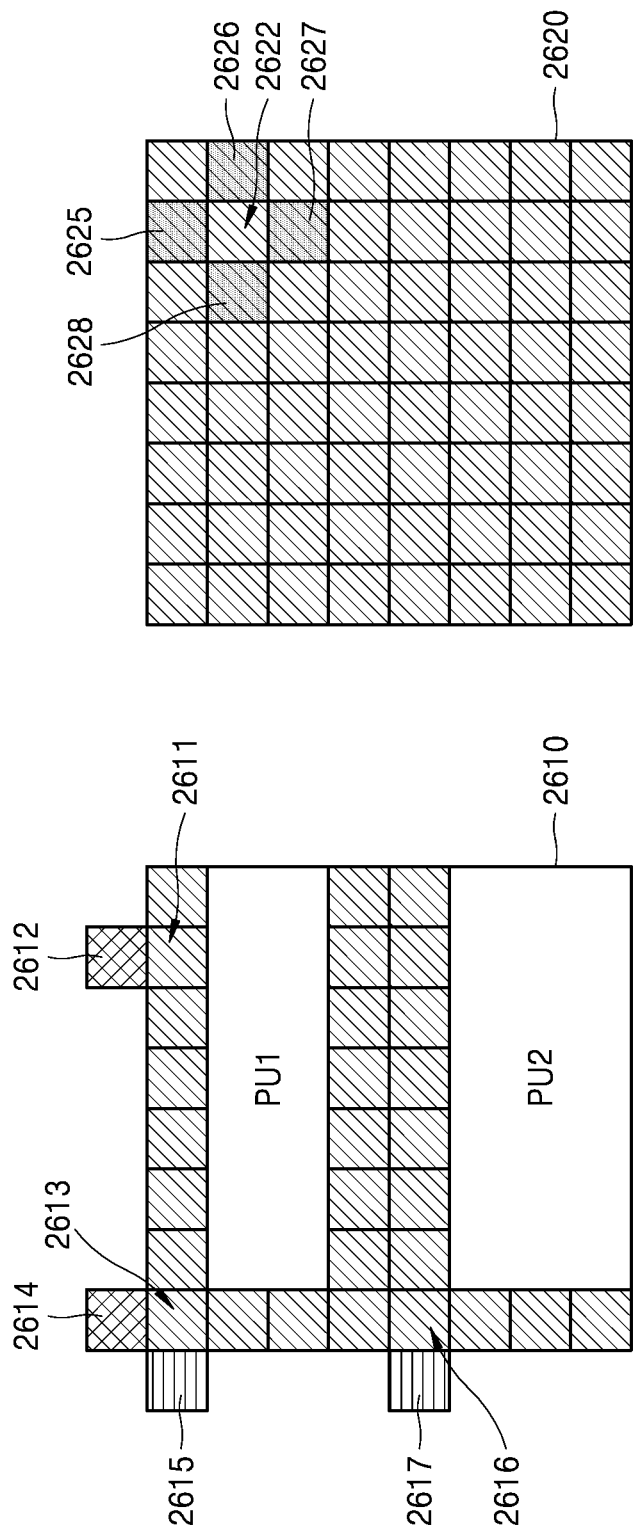
FIG. 26A illustrates a prediction method of an OBMC mode where a sub-block is used, according to various embodiments.

FIG. 26A illustrates a prediction method of an OBMC mode where a sub-block is used, according to various embodiments.

In the OBMC mode where a sub-block is used, current blocks 2610 and 2620 that are inter-predicted may be split into sub-blocks of 4×4 sizes, and motion compensation may be performed in units of the sub-blocks. Motion vectors of sub-blocks neighboring a current sub-block may be used for motion prediction of the current sub-block. According to an embodiment, a plurality of prediction values are obtained by using a motion vector of a current block and the motion vectors of the sub-blocks neighboring the current sub-block. Then, a final prediction value of the current sub-block may be obtained by performing weighted average on the plurality of prediction values.

According to various embodiments, motion compensation of a sub-block unit may be performed at a boundary of the current block 2610. According to an embodiment, a motion vector of the current block 2610 and a motion vector of a sub-block 2612 adjacent to the top of a current sub-block 2611 may be used for motion prediction of the sub-block 2611 located at a top boundary of the current block 2610. According to an embodiment, the motion vector of the current block 2610 and a motion vector of a sub-block 2617 adjacent to the left of a current sub-block 2616 may be used for motion prediction of the sub-block 2616 located at a left boundary of the current block 2610. According to an embodiment, the motion vector of the current block 2610, a motion vector of a sub-block 2615 adjacent to the left of a current sub-block 2613, and a motion vector of a sub-block 2614 adjacent to the top of the current sub-block 2613 may all be used for motion prediction of the sub-block 2613 adjacent to all of the left and top boundaries of the current block 2610.

According to various embodiments, motion compensation of a sub-block unit may be performed at a location other than a boundary of the current block 2620. According to an embodiment, a motion vector of the current block 2620 and motion vectors of sub-blocks 2625, 2626, 2627, and 2628 adjacent to the top, bottom, left, and right of a current sub-block 2622 may all be used for motion prediction of the current sub-block 2622.

Figure 26B:
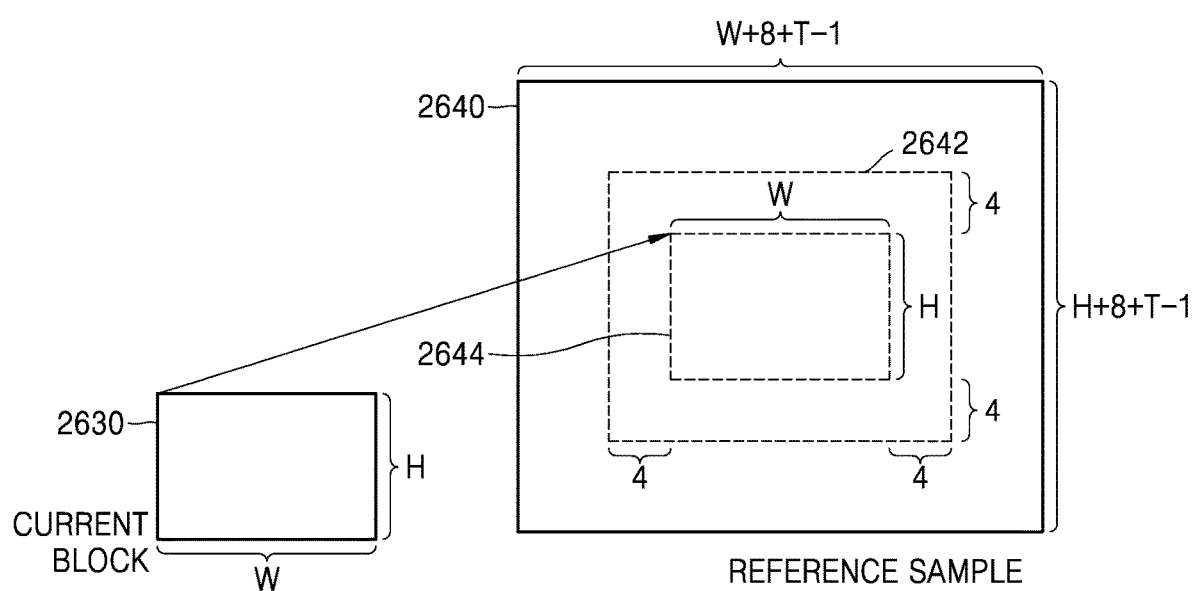
FIG. 26B illustrates reference samples required for inter prediction of a current block in an OBMC mode where a sub-block is used, according to various embodiments.

FIG. 26B illustrates reference samples required for inter prediction of a current block in an OBMC mode where a sub-block is used, according to various embodiments.

As shown in FIG. 26A, in the OBMC mode where a sub-block is used, motion prediction may be performed by using reference samples corresponding to sub-blocks of 4×4 sizes adjacent to the top, bottom, left, and right of a current block 2630 in addition to reference samples of a reference block 2644 corresponding to the current block 2630. Thus, the OBMC mode using a sub-block may be viewed as performing motion compensation on a block 2642 in which the current block is expanded by 4 pixels at each of top, bottom, left, and right sides.

Here, when a horizontal width of the current block 2630 is referred to as W and a vertical height thereof is referred to as H, and a separable 2D T-tap filter is used as an interpolation filter, the total number of reconstructed reference samples 2640 to be read from a reconstructed reference picture for inter prediction of the current block 2630 is (W+8+T−1)×(H+8+T−1). Accordingly, in the OBMC mode where a sub-block is used, an average number of reference samples to be read from a reconstructed reference picture stored in a memory to predict a current sample, i.e., a memory bandwidth may be calculated as Equation 5.

$$\frac{N \times (W + 8 + T - 1) \times (H + 8 + T - 1)}{W \times H} \quad \text{[Equation 5]}$$

Here, N denotes the number of reference blocks to be referred to for inter prediction of a current block. N is 1 during unidirectional prediction and N is 2 during bidirectional prediction.

Figure 26C:
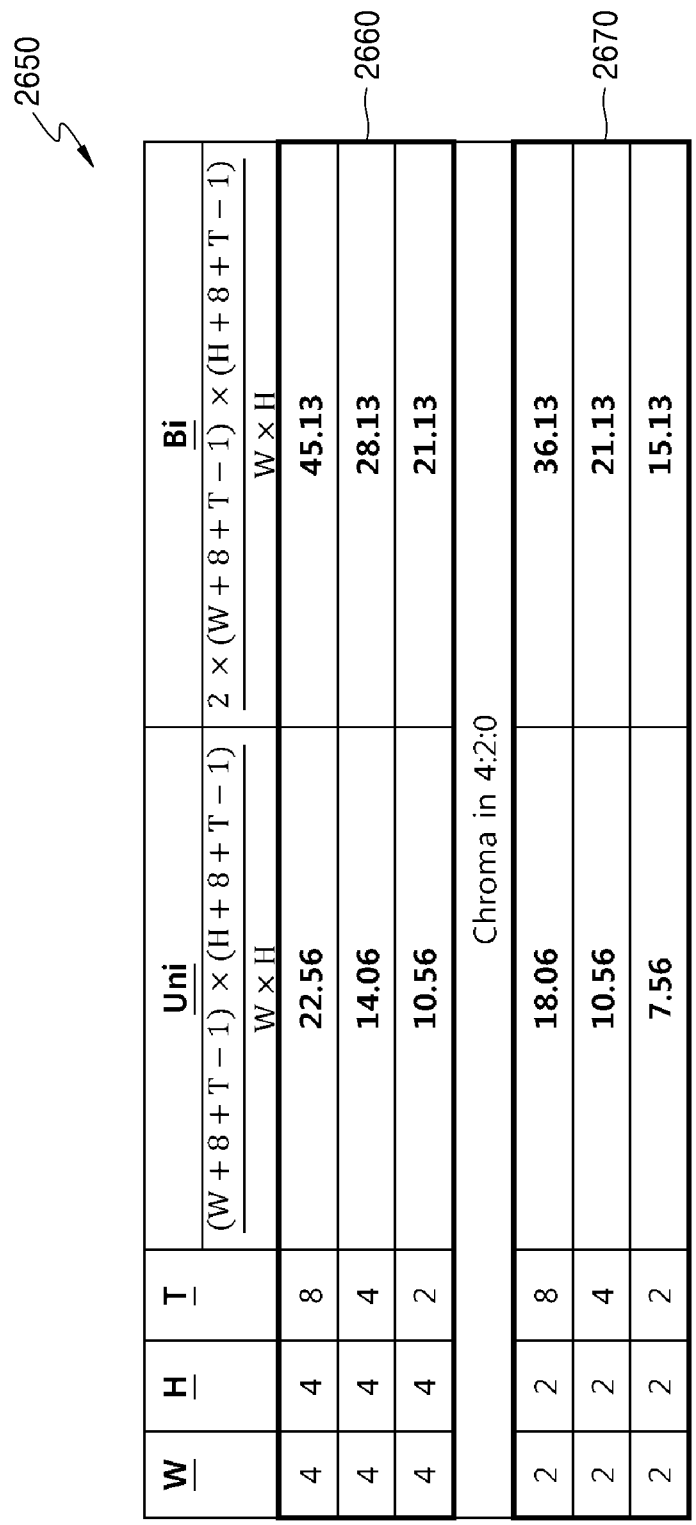
FIG. 26C illustrates a memory bandwidth required for inter prediction of a current block in an OBMC mode where a sub-block is used, according to various embodiments.

FIG. 26C illustrates a memory bandwidth required for inter prediction of a current block in an OBMC mode where a sub-block is used, according to various embodiments. FIG. 26C shows a memory bandwidth calculated according to Equation 5 when a horizontal width of a current block is referred to as W and a vertical height thereof is referred to as H, and a separable 2D T-tap filter is used as an interpolation filter, according to the embodiment of FIG. 26A or 26B. Various examples of a case 2660 of luma block and a case 2670 of chroma block sampled at 4:2:0 are provided.

According to various embodiments, the image decoding apparatus 100 may determine the size of a filter such that the memory bandwidth calculated according to Equation 5 does not exceed a certain reference value. According to an embodiment, the certain reference value may be determined based on the HEVC limit described above.

In the case 2660 of luma block, when the size of the current block is 4×4, the memory bandwidth exceeds the HEVC limit even when a 2-tap filter is used. Thus, according to an embodiment of setting the certain reference value to the HEVC limit, the OBMC mode where a sub-block is used may be determined not to be used for a 4×4 block. According to another embodiment, when the size of the current block is 4×4, the size of the filter may be determined to be 2 taps or less.

In the case 2670 of chroma block, because the number of samples included in the chroma block is ¼ of that of the luma block having the same size when the chroma block is sampled at 4:2:0, the memory bandwidth is equal to a value obtained by dividing a result of Equation 5 by 4. According to another embodiment, when the size of the current block is 2×2, the size of the filter may be determined to be 2 taps or less. According to another embodiment, when the size of the current block is 2×2, the memory bandwidth exceeds the HEVC limit even when a 2-tap filter is used, and thus the OBMC mode where a sub-block is used may be determined not to be used for a 2×2 block.

FIGS. 27A through 28D illustrate a prediction method of a DMVR mode, according to various embodiments.

Figure 27A:
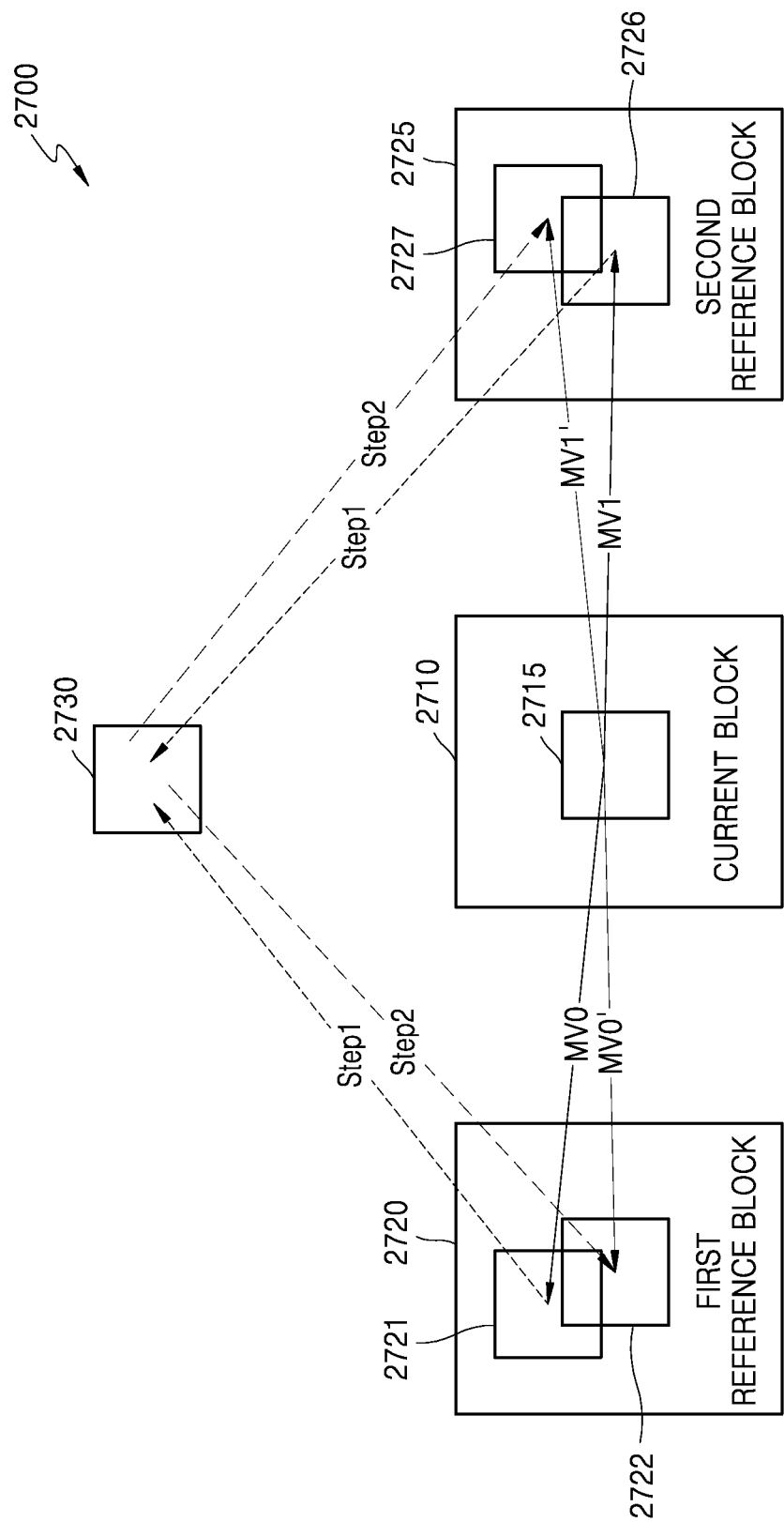
FIG. 27A illustrates a prediction method of a decoder-side motion vector refinement (DMVR) mode, according to various embodiments.

In the DMVR mode, a motion vector used for inter prediction may be adjusted via template matching. FIG. 27A illustrates a method of adjusting a motion vector in bidirectional prediction.

In the bidirectional prediction, two original prediction blocks 2721 and 2726 are obtained by two original motion vectors MV0 and MV1 of a current block 2715. A template 2730 may be generated by performing weighted average on the original prediction blocks 2721 and 2726 (step 1). The image decoding apparatus 100 performs template matching of searching for updated prediction blocks 2722 and 2726 in which a difference with the template 2730 is the minimum in reference pictures 2720 and 2725 (step 2). Updated motion vectors MV0' and MV1' indicating the updated prediction blocks 2722 and 2726 may be determined via the template matching. A final prediction value of the current block 2715 is obtained from the updated prediction blocks 2722 and 2726.

According to various embodiments, the number of motion vector candidates for searching for the updated prediction blocks 2722 and 2726 in the reference pictures 2720 and 2725 may be limited during the template matching. For example, the image decoding apparatus 100 may determine up to M motion vector candidates. The image decoding apparatus 100 may compare the template 2730 with a plurality of prediction block candidates indicated by the motion vector candidates in a reference picture, and determine prediction block candidates with the smallest difference as the updated prediction blocks 2722 and 2726.

According to various embodiments, a search region for searching for the updated prediction blocks 2722 and 2726 in the reference pictures 2720 and 2725 may be limited. For example, the image decoding apparatus 100 may search for the updated prediction blocks 2722 and 2726 in a region where the original prediction blocks 2721 and 2726 are expanded by L pixels each in top, bottom, left, and right sides.

According to an embodiment, the image decoding apparatus 100 may search for an updated prediction block in a region where an original prediction block is expanded by 1 pixel each at top, bottom, left, and right sides. According to an embodiment, the image decoding apparatus 100 may determine an original motion vector and 8 motion vectors obtained by moving the original motion vector by 1 pixel each at top, bottom, left, right, top-left, bottom-left, top-right, and bottom-right sides, as motion vector candidates. The image decoding apparatus 100 may compare the template 2730 with the prediction block candidates indicated by the motion vector candidates, and determine prediction block candidates with the smallest difference as the updated prediction blocks 2722 and 2726.

Only the bidirectional prediction is shown in FIG. 27A, but an embodiment is not limited thereto and one of ordinary skill in the art would understand that the DMVR mode may be used by applying the above method even for unidirectional prediction or multi-prediction using three or more references.

Figure 27B:
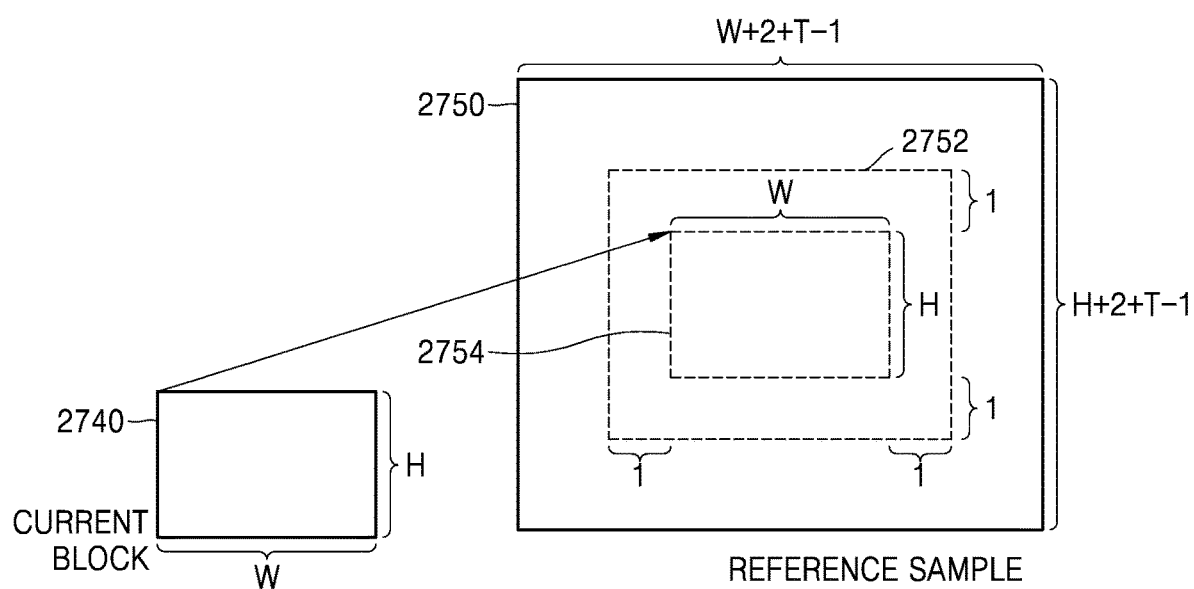
FIG. 27B illustrates reference samples required for inter prediction of a current block in a DMVR mode, according to various embodiments.

FIG. 27B illustrates reference samples required for inter prediction of a current block in a DMVR mode, according to various embodiments.

As shown in FIG. 27B, an original prediction block 2754 is determined based on a motion vector from a reference picture indicated by a reference picture index of a current block 2740. According to an embodiment, a search region for template matching may be limited to a region 2752 where the original prediction block 2754 is expanded by 1 pixel in each of top, bottom, left, and right sides.

Here, when a horizontal width of the current block 2740 is referred to as W and a vertical height thereof is referred to as H, and a separable 2D T-tap filter is used as an interpolation filter, the total number of reconstructed reference samples 2750 to be read from a reconstructed reference picture for inter prediction of the current block 2740 is (W+2+T−1)×(H+2+T−1). Accordingly, an average number of reference samples to be read from a reconstructed reference picture stored in a memory to predict a current sample, i.e., a memory bandwidth, may be represented as Equation 6.

$$\frac{N \times (W + 2 + T - 1) \times (H + 2 + T - 1)}{W \times H} \qquad \text{[Equation 6]}$$

Here, N denotes the number of reference blocks to be referred to for inter prediction of a current block. N is 1 during unidirectional prediction and N is 2 during bidirectional prediction.

FIG. 27C illustrates memory bandwidth required for inter prediction of a current block in a DMVR mode, according to various embodiments. FIG. 27C shows a memory bandwidth calculated according to Equation 6 when a horizontal width of a current block is W, a vertical height thereof is H, a separable 2D T-tap filter is used as an interpolation filter, and a search region for template matching is a region where an original prediction block is expanded by 1 pixel each at top, bottom, left, and right sides, according to the embodiment of FIGS. 27A and 27B. Various examples of a case 2770 of luma block and a case 2780 of chroma block sampled at 4:2:0 are provided.

According to various embodiments, the image decoding apparatus 100 may determine the size of a filter such that the memory bandwidth calculated according to Equation 6 does not exceed a certain reference value. According to an embodiment, the certain reference value may be determined based on the HEVC limit described above.

In the case 2770 of luma block, according to an embodiment where the certain reference value is set to the HEVC limit, the size of the filter may be determined to be 4 taps or less in bidirectional prediction and to be 8 taps or less in unidirectional prediction when the size of the current block is 8×8. According to an embodiment where the certain reference value is set to the HEVC limit, when a size of a current block is 4×4, a size of a filter may be determined to be 2 taps or less in bidirectional prediction and a size of a filter may be determined to be 4 taps or less in unidirectional prediction. According to another embodiment, an 8-tap filter may be allowed in bidirectional prediction of an 8×8 block.

In the case 2780 of chroma block, because the number of samples included in the chroma block is ¼ of that of the luma block having the same size when the chroma block is sampled at 4:2:0, the memory bandwidth is equal to a value obtained by dividing a result of Equation 6 by 4. According to an embodiment of setting the certain reference value to the HEVC limit, the size of the filter may be determined to be 4 taps or less when the size of the current block is 2×2. According to an embodiment, when the size of the current block is 2×2, an 8-tap filter may be allowed in unidirectional prediction.

Figure 28A:
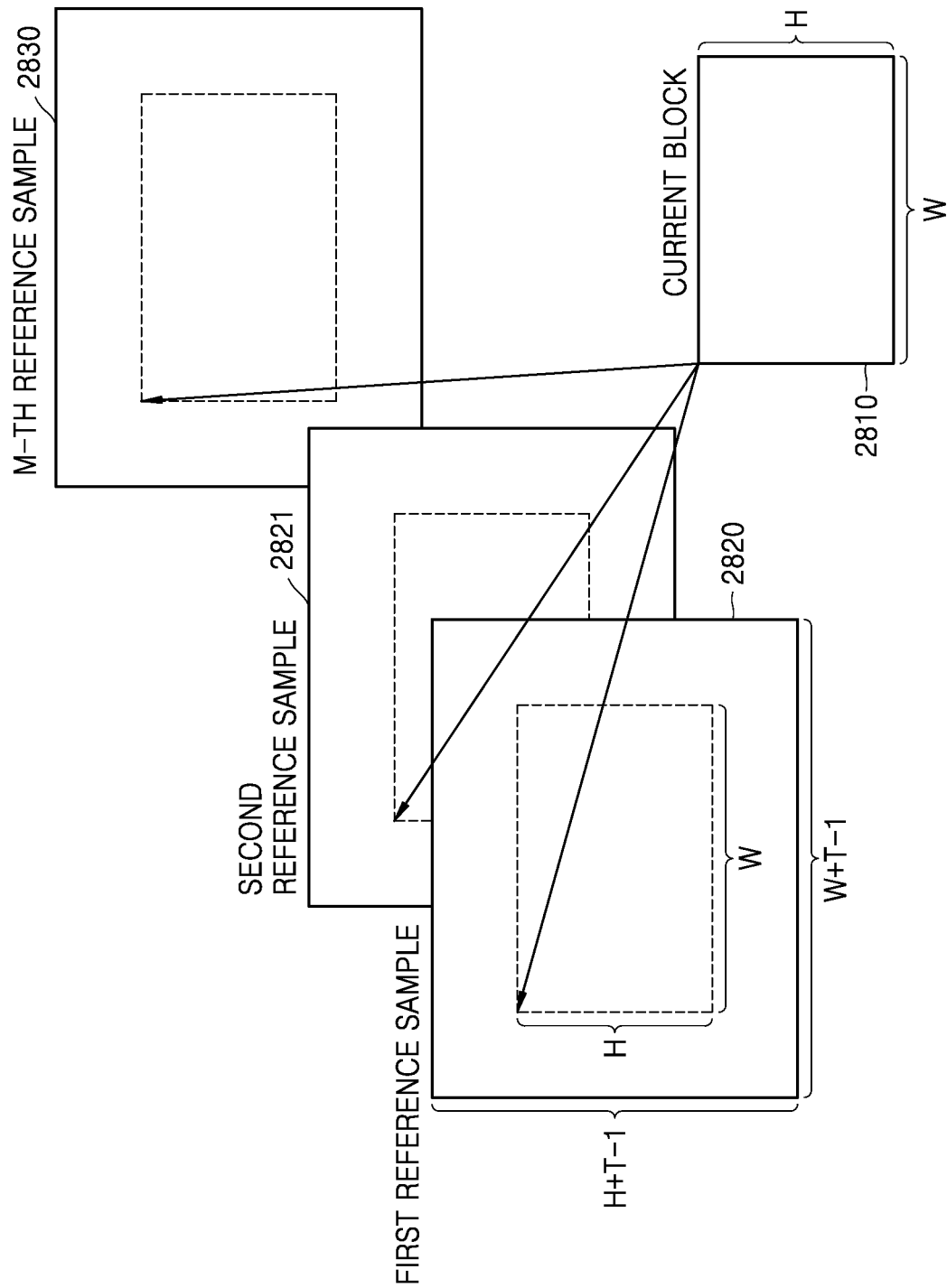
FIG. 28A illustrates reference samples required for inter prediction of a current block in a DMVR mode where a plurality of motion vector candidates are used, according to various embodiments.

FIG. 28A illustrates reference samples required for inter prediction of a current block in a DMVR mode where a plurality of motion vector candidates are used, according to various embodiments.

As described above, according to various embodiments, the number of motion vector candidates for searching for an updated prediction block in a reference picture during template matching in a DMVR mode may be limited. According to an embodiment, the image decoding apparatus 100 may determine up to M motion vector candidates, and in this case, M prediction block candidates (shown in broken lines) indicated by the motion vector candidates may be determined.

A horizontal width of a current block 2810 is referred to as W and a vertical height thereof is referred to as H, and it is assumed that a separable 2D T-tap filter is used as an interpolation filter. In this case, the number of reconstructed reference samples 2820, 2821, and 2830 required to generate reference samples of each of the prediction block candidates is (W+T−1)×(H+T−1) as described with reference to FIG. 22A. Accordingly, the maximum number of reconstructed reference samples 2820, 2821, and 2830 to be read from a reconstructed reference picture for inter prediction of the current block 2810 may be indicated as M×(W+T−1)×(H+T−1). As a result, an average number of reference samples to be read from a reconstructed reference picture stored in a memory to predict a current sample, i.e., a memory bandwidth, may be represented as Equation 7.

$$\frac{M \times N \times (W + T - 1) \times (H + T - 1)}{W \times H} \quad \text{[Equation 7]}$$

Here, N denotes the number of reference blocks to be referred to for inter prediction of a current block. N is 1 during unidirectional prediction and N is 2 during bidirectional prediction.

According to Equation 7, the memory bandwidth increases as a number of motion vector candidates increases, and the memory bandwidth increases as a size (i.e., a number of taps T) of an interpolation filter increases. Thus, to maintain the memory bandwidth at a uniform level, a number of taps of a filter may need to be decreased when the number of motion vector candidates is increased.

FIG. 28B illustrates a memory bandwidth required for inter prediction of a current block in a DMVR mode where a plurality of motion vector candidates are used, according to various embodiments. FIG. 28B shows a memory bandwidth calculated according to Equation 7 when a horizontal width of a current block is W, a vertical height thereof is H, a separable 2D T-tap filter is used as an interpolation filter, and a number of motion vector candidates is limited to M at most during template matching, according to the embodiment of FIGS. 27A and 27B. Table 2850 provides various examples of a case of luma block.

According to various embodiments, the image decoding apparatus 100 may determine the size of a filter such that the memory bandwidth calculated according to Equation 7 does not exceed a certain reference value. According to an embodiment, the certain reference value may be determined based on the HEVC limit described above.

When the number of motion vector candidates is limited to 3 at most, according to an embodiment where the certain reference value is set to the HEVC limit, a size of a filter may be determined to be 2 taps or less during unidirectional prediction when a size of a current block is 8×8 or less. However, during bidirectional prediction, the memory bandwidth exceeds the HEVC limit even when a 2-tap filter is used. Thus, according to an embodiment of setting the certain reference value to the HEVC limit, the DMVR mode where a plurality of motion vector candidates are used may be determined not to be used in bidirectional prediction. According to another embodiment, when the size of the current block is 8×8 or less, a 2-tap filter may be allowed in bidirectional prediction.

When a number of motion vector candidates is limited to 4 at most, according to an embodiment where the certain reference value is set to the HEVC limit, a size of a filter may be determined to be 2 taps or less during unidirectional prediction when a size of a current block is 8×8 or less. However, during bidirectional prediction, the memory bandwidth exceeds the HEVC limit even when a 2-tap filter is used. Thus, according to an embodiment of setting the certain reference value to the HEVC limit, the DMVR mode where a plurality of motion vector candidates are used may be determined not to be used in bidirectional prediction. According to another embodiment, when the size of the current block is 8×8 or less, a 2-tap filter may be allowed in bidirectional prediction.

When the number of motion vector candidates is 5 or more, according to an embodiment, the memory bandwidth exceeds the HEVC limit even when a 2-tap filter is used in unidirectional prediction when the size of the current block is 4×4, and thus the DMVR mode may be determined not to be used for a 4×4 block. According to another embodiment, when 5 or more motion vector candidates are allowed, a 2-tap filter may be determined to be used for a 4×4 block.

Figure 28C:
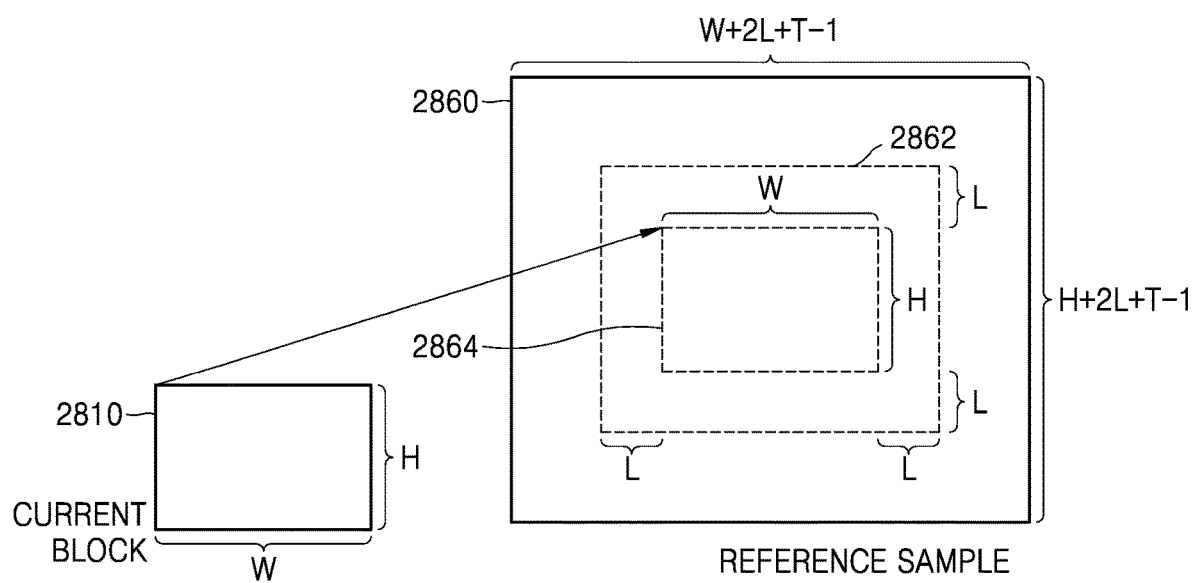
FIG. 28C illustrates reference samples required for inter prediction of a current block in a DMVR mode where a search range is limited, according to various embodiments.

FIG. 28C illustrates reference samples required for inter prediction of a current block in a DMVR mode where a search range is limited, according to various embodiments.

As described above, according to various embodiments, a search region for searching for an updated prediction block in a reference picture during template matching in a DMVR mode may be limited. According to an embodiment, the search region for template matching may be limited to a region 2862 where an original prediction block 2864 is expanded by L pixels in each of top, bottom, left, and right sides.

Here, when a horizontal width of the current block 2810 is referred to as W and a vertical height thereof is referred to as H, and a separable 2D T-tap filter is used as an interpolation filter, the total number of reconstructed reference samples 2860 to be read from a reconstructed reference picture for inter prediction of the current block 2810 is (W+2L+T−1)×(H+2L+T−1). Accordingly, an average number of reference samples to be read from a reconstructed reference picture stored in a memory to predict a current sample, i.e., a memory bandwidth, may be represented as Equation 8.

$$\frac{N \times (W + 2L + T - 1) \times (H + 2L + T - 1)}{W \times H} \quad \text{[Equation 8]}$$

Here, N denotes the number of reference blocks to be referred to for inter prediction of a current block. N is 1 during unidirectional prediction and N is 2 during bidirectional prediction.

According to Equation 8, the memory bandwidth increases as a search region for searching for an updated prediction block increases, and the memory bandwidth increases as a size (i.e., a number of taps T) of an interpolation filter increases. Thus, to maintain the memory bandwidth at a uniform level, a number of taps of a filter may need to be decreased when the search region is increased.

FIG. 28D illustrates a memory bandwidth required for inter prediction of a current block in a DMVR mode where a search range is limited, according to various embodiments. FIG. 28D shows a memory bandwidth calculated according to Equation 7 when a horizontal width of a current block is W, a vertical height thereof is H, a separable 2D T-tap filter is used as an interpolation filter, and a search region is limited to a region where an original prediction block is expanded by L pixels each at top, bottom, left, and right sides during template matching, according to the embodiment of FIGS. 27A and 28C.

Table 2870 provides various examples of a case of luma block. Although a case of chroma block is not shown, because the number of samples included in the chroma block is ¼ of that of the luma block having the same size when the chroma block is sampled at 4:2:0, the memory bandwidth is equal to a value obtained by dividing a result of Equation 8 by 4.

When the search region is limited to a region where the original prediction block is expanded by 2 pixels each at top, bottom, left, and right sides, according to an embodiment of setting a certain reference value to the HEVC limit, a size of a filter may be determined to be 4 taps or less during unidirectional prediction and to be 2 taps or less during bidirectional prediction when the size of a current block is 4×4. According to an embodiment where the certain reference value is set to the HEVC limit, when the size of the current block is 8×8, the size of the filter may be determined to be 8 taps or less in unidirectional prediction and to be 4 taps or less in bidirectional prediction.

When the search region is limited to a region where the original prediction block is expanded by 3 pixels each at top, bottom, left, and right sides, according to an embodiment of setting the certain reference value to the HEVC limit, the size of the filter may be determined to be 2 taps or less during unidirectional prediction when the size of a current block is 4×4. According to an embodiment, the size of the filter may be determined to be 4 taps or less during unidirectional prediction when the size of the current block is 8×8. According to another embodiment, a 4-tap filter may be allowed in unidirectional prediction of a 4×4 block.

However, during bidirectional prediction, the memory bandwidth exceeds the HEVC limit even when a 2-tap filter is used. Thus, according to an embodiment of setting the certain reference value to the HEVC limit, the DMVR mode where the search region is the region where the original prediction block is expanded by 3 pixels or more each at top, bottom, left, and right sides may be determined not to be used in the bidirectional prediction. According to another embodiment, a 2-tap filter may be allowed during the bidirectional prediction in the DMVR mode where the search region is the region where the original prediction block is expanded by 3 pixels or more each at top, bottom, left, and right sides.

When the search region is a region where the original prediction block is expanded by 4 pixels or more each at top, bottom, left, and right sides, according to an embodiment of setting the certain reference value to the HEVC limit, the size of the filter may be determined to be 2 taps or less during unidirectional prediction. According to another embodiment, a 4-tap filter may be allowed in unidirectional prediction of an 8×8 block.

Figure 29A:
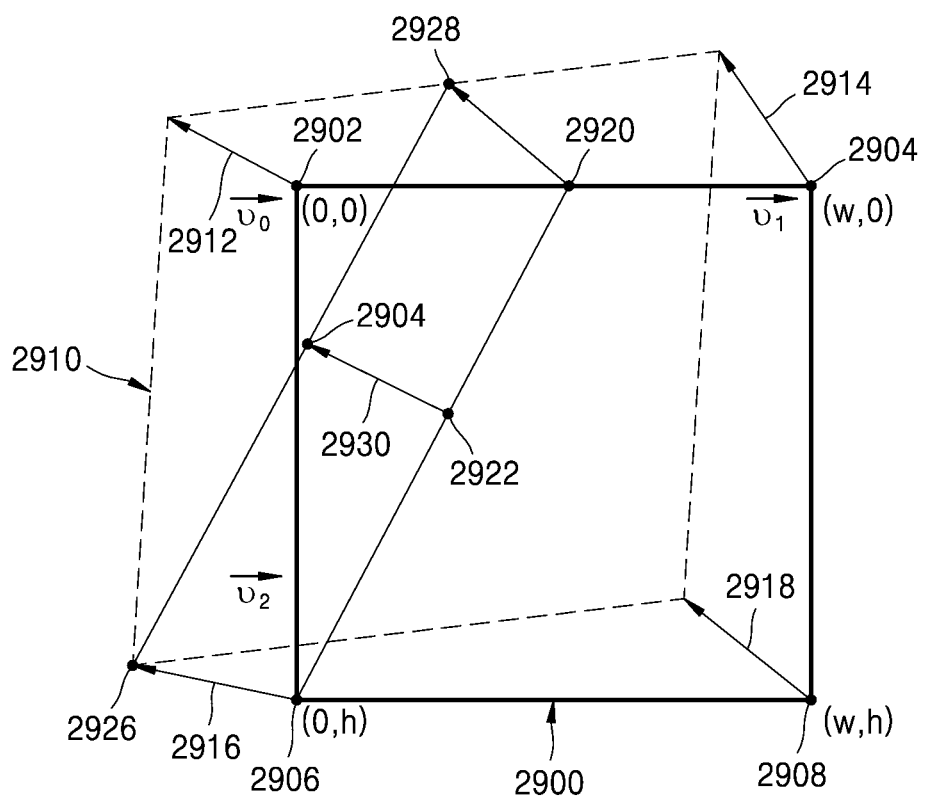
FIG. 29A illustrates a prediction mode of an affine mode, according to various embodiments.

FIG. 29A illustrates a prediction mode of an affine mode, according to various embodiments.

Four vertices 2902, 2904, 2906, and 2908 of a current block 2900 respectively correspond to motion vectors 2912, 2914, 2916, and 2918. An affine transform block 2910 is generated when the current block 2900 is affine-transformed by the motion vectors 2912, 2914, 2916, and 2918. Samples located at the current block 2900 may be matched to samples of the affine transform block 2910.

For example, a sample 2924 obtained by affine-transforming a sample 2922 located on a line connecting the vertex 2906 and a sample 2920 located at the center of the top of the block 2900 is located on a line connecting a sample 2926 of the affine transform block 2910 indicated by the motion vector 2916 of the vertex 2906 and a sample 2928 of the affine transform block 2910 indicated by a motion vector 2930 of the sample 2920. The location of the affine-transformed sample 2924 may be determined by the motion vector 2930 obtained by performing linear interpolation on the motion vectors 2912, 2914, 2916, and 2918 according to the location of the sample 2922. Similarly, other samples of the current block 2900 may be affine-transformed to be matched to samples of the affine transform block 2910. As described with reference to FIG. 29A, all samples of a block may be inter-predicted by using a motion vector generated for affine transform.

FIG. 29B illustrates a memory bandwidth required for inter prediction of a current block in an affine mode, according to various embodiments.

As described with reference to FIG. 29A, because affine-transformed samples are generated by using a motion vector of a current block, a maximum number of reconstructed reference samples required to generate affine-transformed samples of an affine transform block may be indicated in the same manner as that described with reference to FIG. 22A. Accordingly, an average number of reference samples to be read from at least one reconstructed reference picture stored in a memory, i.e., the memory bandwidth, is identical to Equation 2.

A table 2940 of FIG. 29B shows a memory bandwidth calculated according to Equation 1 and Equation 2 when a horizontal width is referred to as W and a vertical height is referred to as H, and a separable 2D T-tap filter is used as an interpolation filter, according to the embodiment of FIGS. 29A and 22A. Various examples according to a number of taps are provided for a case of a 4×4 luma block and a case of a 2×2 chroma block sampled at 4:2:0.

In the case of luma block, according to an embodiment where a certain reference value is set to the HEVC limit, a size of a filter may be determined to be 4 taps or less in unidirectional and bidirectional prediction when a size of the current block is 4×4. According to another embodiment, when the size of the current block is 4×4, 8-tap filter may be allowed in unidirectional prediction.

In the case of chroma block, because the number of samples included in the chroma block is ¼ of that of the luma block having the same size when the chroma block is sampled at 4:2:0, the memory bandwidth is equal to a value obtained by dividing a result of Equation 1 or Equation 2 by 4. According to an embodiment where the certain reference value is set to the HEVC limit, when a size of a current chroma block is 2×2, a size of a filter may be determined to be 8 taps or less in unidirectional prediction and a size of a filter may be determined to be 4 taps or less in bidirectional prediction.

Figure 29C:
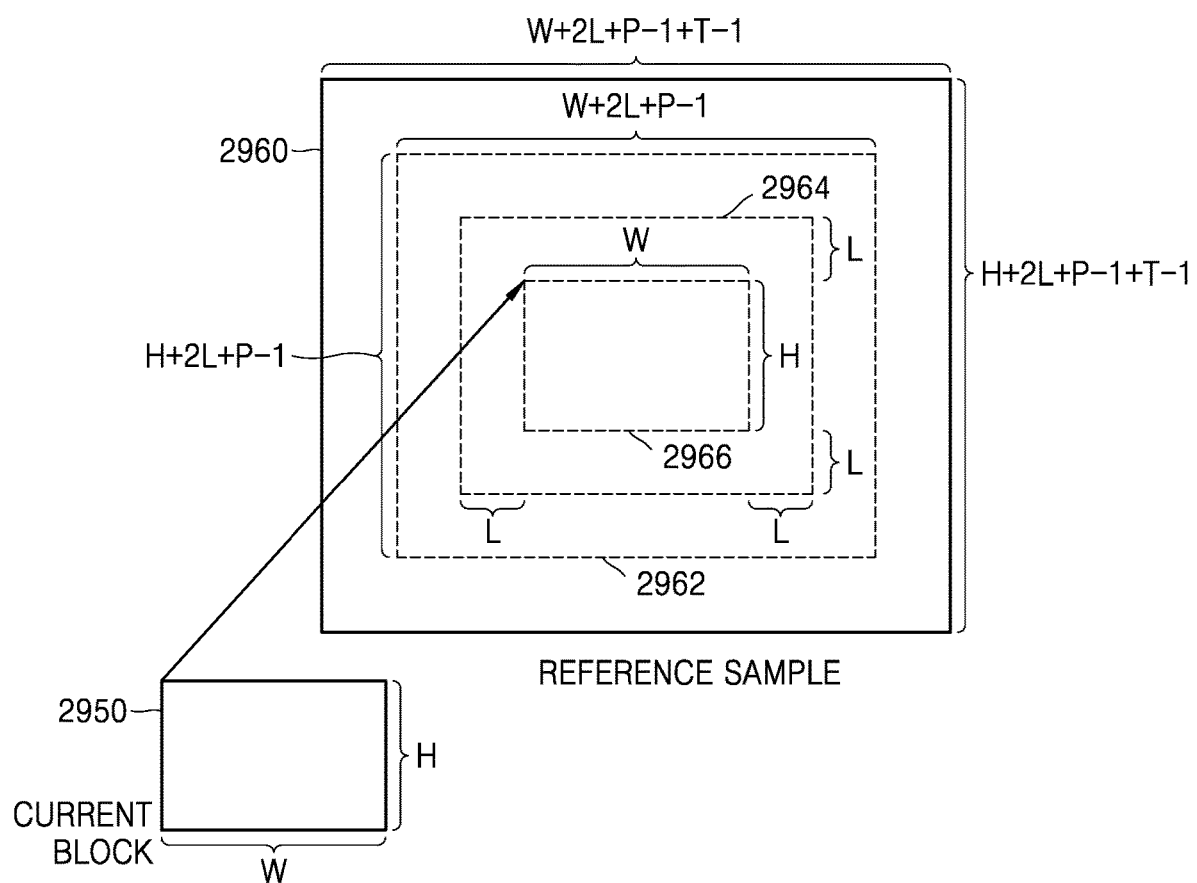
FIG. 29C illustrates reference samples required for inter prediction of a current block in an affine mode, according to various embodiments.

FIG. 29C illustrates reference samples required for inter prediction of a current block in an affine mode, according to various embodiments.

As shown in FIG. 29A, an affine transform block is determined based on a motion vector of a current block 2950. Because affine transform includes not only translation and rotation, but also enlargement/contraction, a size of a reference sample 2964 corresponding to the affine transform block in a reference picture may be greater than a size of the current block 2950. The size of the reference sample 2964 corresponding to the affine transform block compared to the size of the current block 2950 may indicate a ratio of enlargement/contraction in affine transform. For example, in affine mode inter prediction of a current block of a 4×4 size, when the size of the reference sample 2964 corresponding to the affine transform block is 8×8, the affine transform block may be obtained by enlarging the current block up to two times.

According to an embodiment, a maximum enlarging/contraction ratio of affine transform may be limited to be less than or equal to a certain value. According to an embodiment, the size of the reference sample 2964 corresponding to the affine transform block may be limited to be less than or equal to a size in which a horizontal width and a vertical height of the current block 2950 are each expanded by 2L pixels. According to an embodiment, the reference sample 2964 corresponding to the affine transform block may be searched for in a region where a block 2966 indicated by the motion vector of the current block 2950 is expended by L pixels each at top, bottom, left, and right sides. For example, when enlargement/contraction of up to 1.5 times is possible in affine transformation during affine mode inter prediction of a current block of a 4×4 size, L may be limited to 1 because the size of the reference sample 2964 corresponding to the affine transform block is 6×6 at most.

According to an embodiment, a P-tap warping filter may be additionally applied to reference samples of a reference picture to generate each affine-transformed sample of an affine transform block.

FIG. 29C illustrates reconstructed reference samples 2960 to be read from a reconstructed reference picture for inter prediction of the current block 2950 when a horizontal width of the current block 2950 is referred to as W, a vertical height thereof is referred to as H, the affine transform block is determined in the region 2964 where the block 2966 indicated by the motion vector of the current block 2950 is expanded by L pixels each at top, bottom, left, and right sides, a separable 2D T-tap filter is used as an interpolation filter, and a P-tap warping filter is additionally applied. In this case, the total number of reconstructed reference samples 2960 is (W+2L+P−1+T−1)×(H+2L+P−1+T−1). Accordingly, an average number of reference samples to be read from a reconstructed reference picture stored in a memory to predict a current sample, i.e., a memory bandwidth, may be represented as Equation 9.

$$\frac{N \times (W + 2L + P - 1 + T - 1) \times (H + 2L + P - 1 + T - 1)}{W \times H}$$ [Equation 9]

Here, N denotes the number of reference blocks to be referred to for inter prediction of a current block. N is 1 during unidirectional prediction and N is 2 during bidirectional prediction.

FIG. 29D illustrates a memory bandwidth required for inter prediction of a current block in an affine mode, according to various embodiments. FIG. 29D illustrates a memory bandwidth calculated according to Equation 9 when a horizontal width of a current block is referred to as W, a vertical height thereof is referred to as H, an affine transform block is determined in the region 2964 where the block 2966 indicated by the motion vector of the current block is expanded by L pixels each at top, bottom, left, and right sides, a separable 2D T-tap filter is used as an interpolation filter, and a P-tap warping filter is additionally applied.

Table 2970 provides various examples of a case of luma block. Although a case of chroma block is not shown, because the number of samples included in the chroma block is ¼ of that of the luma block having the same size when the chroma block is sampled at 4:2:0, the memory bandwidth is equal to a value obtained by dividing a result of Equation 9 by 4.

According to an embodiment of setting a certain reference value to the HEVC limit, when a size of a current block is 8×8, bidirectional prediction may use an affine mode where 5-tap warping filter is used and up to 1.5 times enlargement (i.e., L=1) is possible. Alternatively, an affine mode where 3-tap warping filter is used and up to 2 times enlargement (i.e., L=2) is possible may be used.

According to an embodiment of setting the certain reference value to the HEVC limit, when the size of the current block is 4×4, unidirectional prediction may use an affine mode where 5-tap warping filter is used and up to 1.5 times enlargement (i.e., L=1) is possible or an affine mode where 3-tap warping filter is used and up to 2 times enlargement (i.e., L=2) is possible. However, in the illustrated combination of bidirectional prediction, because all memory bandwidths exceed the HEVC limit, it may be determined not to use an affine mode using a warping filter in bidirectional prediction. According to another embodiment, when the size of the current block is 4×4, bidirectional prediction may use an affine mode where a 3-tap warping filter is used and up to 1.25 times enlargement (i.e., L=0.5) is possible.

Figure 30:
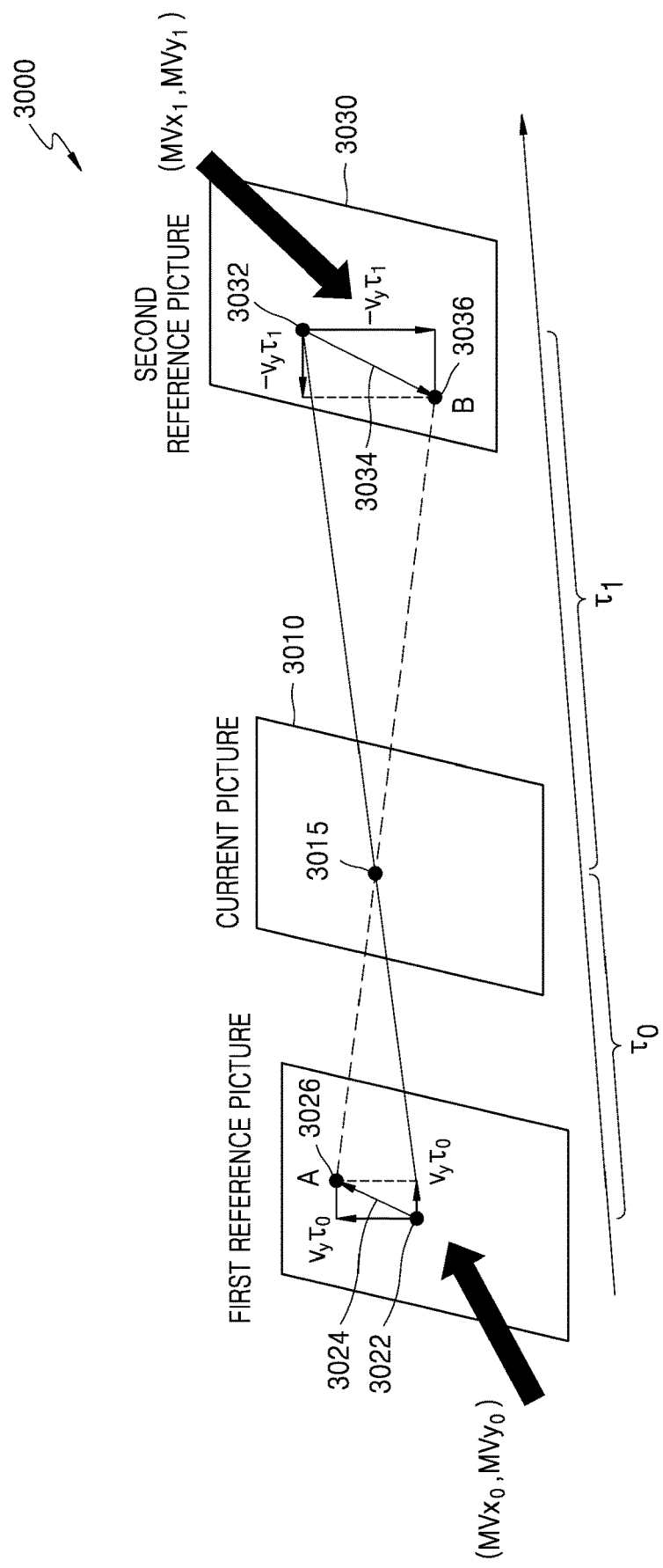
FIG. 30 illustrates a prediction mode of a bidirectional optical flow (BIO) mode, according to various embodiments.

FIG. 30 illustrates a prediction mode of a BIO mode, according to various embodiments.

In the BIO mode, a motion vector of a current block may be adjusted for each sample 3015 of a current picture. FIG. 30 illustrates a method of adjusting a motion vector in bidirectional prediction.

A reference block corresponding to a current block may be determined by motion vectors ($MV_{x0}$, $MV_{y0}$) and ($MV_{x1}$, $MV_{y1}$) of the current block, and reference samples 3022 and 3032 of the reference block corresponding to the current sample 3015 may be determined in the reference block. A motion vector ($v_x$, $v_y$) of the current sample 3015 is estimated based on an amount of spatial/temporal change in values of the reference samples 3022 and 3032. Final prediction samples 3026 and 3036 are obtained by using a motion vector of the current block and a motion vector of the current sample.

The amount of spatial change in the values of the reference samples 3022 and 3032 may be calculated from differences between the values of reference samples 3022 and 3032 and values of samples adjacent to the reference samples 3022 and 3032. According to an embodiment, an interpolation filter may be applied to samples at integer pixel locations adjacent to reference samples so as to obtain values of samples at sub-pixel locations adjacent to the reference samples. According to an embodiment, interpolation filtering for calculating an amount of spatial change in a value of a reference sample may be performed simultaneously with interpolation filtering for motion compensation.

When a size of an interpolation filter for calculating an amount of spatial change in a value of a reference sample is not greater than a size of an interpolation filter for motion compensation, a number of reconstructed reference samples required to generate all reference samples in a reference block in a BIO mode may be the same as that described with reference to FIGS. 22A and 22B. Thus, in this case, the BIO mode does not require an additional memory bandwidth and a required memory bandwidth may be calculated according to Equation 2.

A memory bandwidth required for inter prediction in the BIO mode may be referred to FIG. 23. However, in this case, the number of taps T of a filter may denote a larger size among a size of an interpolation filter for calculating an amount of spatial change in a value of a reference sample and a size of an interpolation filter for motion compensation.

In the embodiments described above with reference to FIGS. 21A through 30, the image decoding apparatus 100 determines the filter information, but an embodiment is not limited thereto. According to various embodiments, filter information according to an inter prediction mode of a current block, a size of the current block, whether the current block is a luma block or a chroma block, and whether the current block is unidirectionally predicted or bidirectionally predicted may be pre-determined and stored in the memories 120 and 420 of the image encoding apparatus 400 and image decoding apparatus 100. According to various embodiments, the image encoding apparatus 400 may determine the filter information based on the inter prediction mode of the current block, the size of the current block, whether the current block is a luma block or a chroma block, and whether the current block is unidirectionally predicted or bidirectionally predicted, and transmit the filter information to the image decoding apparatus 100 by including the filter information in a bitstream. The image decoding apparatus 100 may extract the filter information from the bitstream. According to various embodiments, the image encoding apparatus 400 and the image decoding apparatus 100 may each determine the filter information according to the inter prediction mode of the current block, the size of the current block, whether the current block is a luma block or a chroma block, and whether the current block is unidirectionally predicted or bidirectionally predicted.

Image data in a spatial domain is encoded for each of coding units of a tree structure according to a video encoding technique based on the coding units of the tree structure described with reference to FIGS. 1 through 30, and the image data in the spatial domain is reconstructed when decoding is performed for each largest coding unit according to a video decoding technique based on the coding units of the tree structure, and thus a picture and a video that is a picture sequence may be reconstructed. The reconstructed video may be reproduced by a reproducing apparatus, stored in a storage medium, or transmitted via a network.

Meanwhile, the above-described embodiments of the disclosure may be written as a program executable on a computer, and may be implemented in a general-purpose digital computer operating a program using a computer-readable recording medium.

While the disclosure has been described in connection with specific best embodiments thereof, other inventions in which substitutions, modifications, and variations are applied to the invention will be apparent to one of ordinary skill in the art in view of the above description. In other words, the claims are intended to cover all such substitutions, modifications and variations of the invention. Therefore, all content described in this specification and drawings should be interpreted in an illustrative and non-limiting sense.

The invention claimed is:

1. A video decoding method comprising:
when an inter prediction mode of a current block is an affine mode:
determining a first reference sample location to be referred to for decoding the current block using at least two motion vector predictors for at least two vertices among a plurality of vertices of the current block;
when it is identified that an inter prediction mode of a sub block included in the current block is the affine mode based on the inter prediction mode of the current block, determining a first interpolation filter among a plurality of interpolation filters corresponding to a size of the sub block, wherein a number of filter coefficients of the first interpolation filter is eight;
applying the first interpolation filter to a reconstructed reference sample corresponding to the first reference sample location to generate a prediction sample of the sub block; and
decoding the current block using the prediction sample of the sub block; and
when the inter prediction mode of the current block is a decoder side motion vector refinement (DMVR) mode:
determining a second reference sample location to be referred to for decoding the current block;
determining a second interpolation filter among a plurality of interpolation filters corresponding to the DMVR mode, wherein a number of filter coefficients of the second interpolation filter is two;
applying the second interpolation filter to a reconstructed reference sample corresponding to the second reference sample location to generate a prediction sample of the current block; and
decoding the current block using the prediction sample of the current block.

2. A video decoding apparatus comprising:
at least one processor; and
a memory,
wherein the memory stores at least one instruction configured to be executable by the at least one processor, and
the at least one instruction is configured to, when executed, cause the at least one processor to:
when an inter prediction mode of a current block is an affine mode:
determine a first reference sample location to be referred to for decoding the current block using at least two motion vector predictors for at least two vertices among a plurality of vertices of the current block;
when it is identified that an inter prediction mode of a sub block included in the current block is the affine mode based on the inter prediction mode of the current block, determine a first interpolation filter among a plurality of interpolation filters corresponding to a size of the sub block, wherein a number of filter coefficients of the first interpolation filter is eight;

apply the first interpolation filter to a reconstructed reference sample corresponding to the first reference sample location to generate a prediction sample of the sub block; and decode the current block using the prediction sample of the sub block; and when the inter prediction mode of the current block is a decoder side motion vector refinement (DMVR) mode:

determine a second reference sample location to be referred to for decoding the current block;

determine a second interpolation filter among a plurality of interpolation filters corresponding to the DMVR mode, wherein a number of filter coefficients of the second interpolation filter is two;

apply the second interpolation filter to a reconstructed reference sample corresponding to the second reference sample location to generate a prediction sample of the current block; and decode the current block using the prediction sample of the current block.

3. A video encoding method comprising:

when an inter prediction mode of the current block is an affine mode:

determining a first reference sample location to be referred to for predicting the current block using at least two motion vector predictors for at least two vertices among a plurality of vertices of the current block;

when it is identified that an inter prediction mode of a sub block included in the current block is the affine mode based on the inter prediction mode of the current block, determining a first interpolation filter among a plurality of interpolation filters corresponding to a size of the sub block, wherein a number of filter coefficients of the first interpolation filter is eight;

applying the first interpolation filter to a reconstructed reference sample corresponding to the first reference sample location to generate a prediction sample of the sub block; and encoding the current block using the prediction sample of the sub block; and when the inter prediction mode of the current block is a decoder side motion vector refinement (DMVR) mode:

determining a second reference sample location to be referred to for predicting the current block;

determining a second interpolation filter among a plurality of interpolation filters corresponding to the DMVR mode, wherein a number of filter coefficients of the second interpolation filter is two;

applying the second interpolation filter to a reconstructed reference sample corresponding to the second reference sample location to generate a prediction sample of the current block; and encoding the current block using the prediction sample of the current block.

* * * * *